United States Patent
Thompson et al.

(10) Patent No.: US 10,620,338 B2
(45) Date of Patent: *Apr. 14, 2020

(54) ELECTROSEISMIC SURVEYING IN EXPLORATION AND PRODUCTION ENVIRONMENTS

(71) Applicant: ES Xplore, L.L.C., Dallas, TX (US)

(72) Inventors: Arthur Thompson, Houston, TX (US); Alan Katz, Dallas, TX (US); Robert England, Flower Mound, TX (US); Todd W. Benson, Dallas, TX (US); Mark Griffin, Dallas, TX (US)

(73) Assignee: ES Xplore, L.L.C., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,237

(22) Filed: Jan. 15, 2016

(65) Prior Publication Data

US 2016/0131799 A1 May 12, 2016

Related U.S. Application Data

(63) Continuation of application No. 14/512,900, filed on Oct. 13, 2014, now Pat. No. 9,239,396.

(Continued)

(51) Int. Cl.
*G01V 11/00* (2006.01)
*G01V 1/20* (2006.01)
(Continued)

(52) U.S. Cl.
CPC ............ *G01V 11/007* (2013.01); *E21B 49/00* (2013.01); *G01V 1/181* (2013.01); *G01V 1/20* (2013.01);

(Continued)

(58) Field of Classification Search
USPC .......................................................... 367/14
See application file for complete search history.

(56) References Cited

U.S. PATENT DOCUMENTS

| | | | |
|---|---|---|---|
| 4,815,837 A | 3/1989 | Jones | |
| 4,969,130 A | 11/1990 | Wason et al. | |

(Continued)

FOREIGN PATENT DOCUMENTS

| | | |
|---|---|---|
| CN | 1043792 A | 7/1990 |
| CN | 1636108 A | 7/2005 |

(Continued)

OTHER PUBLICATIONS

International Search Report and Written Opinion issued in PCT Application No. PCT/US2014/060388, dated Jan. 28, 2015, 11 pages.

(Continued)

*Primary Examiner* — James R Hulka
(74) *Attorney, Agent, or Firm* — Baker Botts L.L.P.

(57) ABSTRACT

Systems, methods, and computer programs for monitoring a drilling operation in a subterranean formation include receiving, from a first sensor array, one or more seismic signals caused, at least in part, by the drilling operation in the subterranean formation; receiving, from the first sensor array, one or more electromagnetic signals generated by an electroseismic or seismoelectric conversion of the one or more seismic signals caused, at least in part, by the drilling operation in the subterranean formation; and determining a property of one or more of the drillstring and the subterranean formation based, at least in part, on the seismic signals and the corresponding electromagnetic signals received from the first sensor array. The first sensor array is arranged to monitor the drilling operation.

13 Claims, 23 Drawing Sheets

Related U.S. Application Data

(60) Provisional application No. 61/890,682, filed on Oct. 14, 2013, provisional application No. 61/891,096, filed on Oct. 15, 2013.

(51) Int. Cl.
| | | |
|---|---|---|
| *G01V 1/28* | (2006.01) | |
| *G01V 1/18* | (2006.01) | |
| *E21B 49/00* | (2006.01) | |
| *G01V 1/30* | (2006.01) | |
| *G01V 1/40* | (2006.01) | |

(52) U.S. Cl.
CPC ............... *G01V 1/28* (2013.01); *G01V 1/306* (2013.01); *G01V 1/40* (2013.01); *G01V 2210/32* (2013.01); *G01V 2210/62* (2013.01); *G01V 2210/624* (2013.01); *G01V 2210/6224* (2013.01); *G01V 2210/6244* (2013.01); *G01V 2210/6246* (2013.01)

(56) References Cited

U.S. PATENT DOCUMENTS

| | | | |
|---|---|---|---|
| 5,382,760 | A | 1/1995 | Staron |
| 6,131,658 | A | 10/2000 | Minear |
| 6,462,549 | B1 | 10/2002 | Curtis et al. |
| 6,476,608 | B1 | 11/2002 | Dong |
| 6,614,360 | B1 | 9/2003 | Leggett, III et al. |
| 6,614,717 | B1 | 9/2003 | Khan |
| 6,664,788 | B2 | 12/2003 | Hornbostel et al. |
| 7,255,173 | B2 | 8/2007 | Hosie et al. |
| 7,475,732 | B2 | 1/2009 | Hosie et al. |
| 8,566,037 | B2 | 10/2013 | Thompson et al. |
| 8,589,079 | B2 * | 11/2013 | Thompson ............ G01V 11/007 324/323 |
| 9,239,396 | B2 * | 1/2016 | Thompson ............... G01V 1/20 |
| 2004/0129424 | A1 | 7/2004 | Hosie et al. |
| 2006/0047431 | A1 | 3/2006 | Gieser |
| 2007/0064532 | A1 | 3/2007 | Haldorsen |
| 2007/0205000 | A1 | 9/2007 | Hosie et al. |
| 2007/0209799 | A1 | 9/2007 | Vinegar |
| 2007/0221407 | A1 | 9/2007 | Bostick et al. |
| 2007/0294036 | A1 | 12/2007 | Strack |
| 2009/0261832 | A1 | 10/2009 | Depavia |
| 2010/0286919 | A1 | 11/2010 | Lee |
| 2011/0272147 | A1 | 11/2011 | Beasley et al. |
| 2012/0014217 | A1 | 1/2012 | Houck |
| 2012/0220411 | A1 | 8/2012 | Yang |
| 2012/0253680 | A1 | 10/2012 | Thompson et al. |
| 2013/0069654 | A1 | 3/2013 | Thompson |
| 2013/0116926 | A1 | 5/2013 | Rodney et al. |
| 2013/0119993 | A1 | 5/2013 | Thompson et al. |
| 2013/0133880 | A1 | 5/2013 | Thompson et al. |
| 2013/0215712 | A1 | 8/2013 | Geiser |
| 2013/0265851 | A1 | 10/2013 | Faber |
| 2016/0131798 | A1 | 5/2016 | Thompson |
| 2017/0261643 | A1 | 9/2017 | Thompson |

FOREIGN PATENT DOCUMENTS

| | | |
|---|---|---|
| CN | 101535840 A | 9/2009 |
| CN | 102089497 A | 6/2011 |
| CN | 103250072 A | 8/2013 |
| EP | 2506041 A1 | 10/2012 |
| WO | 2011043851 A1 | 3/2013 |

OTHER PUBLICATIONS

International Search Report and Written Opinion issued in PCT Application No. PCT/US2014/060387, dated Jan. 28, 2015, 12 pages.

International Search Report and Written Opinion issued in PCT Application No. PCT/US2014/060390, dated Jan. 27, 2015, 11 pages.

State Intellectual Property Office of the People's Republic of China, First Office Action for Chinese Patent Application No. 201480049576. 5, dated Feb. 3, 2017.

Gharibi, Mehran, Laurence R. Bentley, and Robert R. Stewart. Seismoelectric monitoring of producing oilfields: A review. Research Report for the Consortium for Research in Elastic Wave Exploration Seismology (CREWES), 15, 13, 2003.

European Patent Office; Supplemental Partial Search Report issued for related European Patent Application No. 14854508.0, dated Apr. 3, 2017.

IP Australia, Examination Report issued for Australian Patent Application No. 2014334535, dated Aug. 9, 2017.

European Patent Office; Supplemental Partial Search Report issued for related European Patent Application No. 14853489.4, dated Apr. 3, 2017.

European Patent Office; Supplemental Partial Search Report issued for related European Patent Application No. 14854047.9, dated Apr. 3, 2017.

IP Australia; Examination Report No. 1 issued for Australian Patent Application No. 2014334538, dated Aug. 8, 2017.

IP Australia, first Examination Report issued for Australian Patent Application No. 2014334536, dated Aug. 10, 2017.

Extended European Search Report issued in related European Patent Application No. 14854047.9 dated Aug. 24, 2017, 20 pages.

Extended European Search Report issued in related European Patent Application No. 14853489.4 dated Sep. 29, 2017, 23 pages.

Gharibi, Mehran, Lawrence R. Bentley, and Robert R. Stewart. Seismoelectric monitoring of producing oilfields: A review. Research Report for the Consortium for Research in Elastic Wave Exploration Seismology (CREWES), 15, 13, 2003.

State Intellectual Property Office of the People's Republic of China; Notification of First Office Action issued for Chinese Patent Application No. 201480048150.8; dated Mar. 11, 2018.

State Intellectual Property Office of the People's Republic of China; Notification of Second Office Action issued for Chinese Patent Application No. 201480049576.5, dated Mar. 26, 2018.

State Intellectual Property Office of the People's Republic of China; Notification of First Office Action issued for Chinese Patent Application No. 201480047094.6, dated Mar. 5, 2018.

* cited by examiner

ELECTROSEISMIC SURVEYING IN EXPLORATION AND PRODUCTION ENVIRONMENTS

CROSS-REFERENCE TO RELATED APPLICATIONS

This application is a continuation of U.S. application Ser. No. 14/512,900 filed Oct. 13, 2014 and entitled "Electroseismic Surveying in Exploration and Production Environments" which claims priority to U.S. Provisional Application No. 61/890,682 entitled "Electroseismic Surveying in Exploration and Production Environments" filed on Oct. 14, 2014, and also claims priority to U.S. Provisional Application No. 61/891,096 entitled "Electroseismic Surveying in Production Environments" filed on Oct. 15, 2014, the contents of which are hereby incorporated by reference.

BACKGROUND OF THE INVENTION

Conventional techniques for the control of down-hole operations may rely on various models, sensors, heuristics, and operator judgment to determine, for example, the location of a drill bit in a subsurface formation or the propagation of fractures in the subsurface formation. These conventional surveying technologies, however, suffer from certain limitations that may prevent a full understanding of the location and extent of down-hole operations. For example, particular surveying techniques may require the use of expensive and/or time consuming surveying equipment and methods that may limit the economic viability of surveying a particular prospective region. In addition, particular technologies may be able to provide information regarding one or more geophysical properties of a subsurface region, but may not be able to provide information on other geophysical properties. Such limitations may lead to the identification of prospective regions for drilling or exploration based on an incomplete and/or incorrect understanding of the prospective region, which may cause unnecessary time and/or expenses to be incurred exploring or drilling regions that do not have the desired geophysical properties. For example, based on incomplete or incorrect geophysical surveying, a drilling operation may drill a dry hole or drill into an unintended portion of the formation.

SUMMARY

In accordance with the teachings of the present disclosure, disadvantages and problems associated with conventional techniques of drilling a wellbore, propagating fractures, and producing a reservoir may be reduced and/or eliminated. For example, a surveying system may be provided using passive electroseismic or seismoelectric surveying techniques for well drilling, formation enhancement, and reservoir production. The surveying system may utilize survey data from passive electroseismic or seismoelectric surveying to monitor or control well operations.

In accordance with one embodiment of the present disclosure, a method for monitoring a drilling operation in a subterranean formation includes receiving, from a first sensor array, one or more seismic signals caused, at least in part, by the drilling operation in the subterranean formation. The method further includes receiving, from the first sensor array, one or more electromagnetic signals generated by an electroseismic or seismoelectric conversion of the one or more seismic signals caused, at least in part, by the drilling operation in the subterranean formation. The method further includes determining a property of one or more of the drillstring and the subterranean formation based, at least in part, on the seismic signals and the corresponding electromagnetic signals received from the first sensor array. The first sensor array is arranged to monitor the drilling operation.

receiving, from a first sensor array, one or more seismic signals caused, at least in part, by the drilling operation in the subterranean formation. The method further includes receiving, from the first sensor array, one or more electromagnetic signals generated by an electroseismic or seismoelectric conversion of passive source seismic signals caused by the drilling operation in the subterranean formation. The method further includes determining a drill bit location based, at least in part, on the signals received from the first sensor array. The first sensor array of seismic sensors are arranged to monitor the drilling operation. The first sensor array of electromagnetic sensors are also arranged to monitor the drilling operation.

Technical advantages of certain embodiments of the present invention include the ability to perform passive electroseismic or seismoelectric surveying. Such surveying may detect an electromagnetic signal generated in response to electroseismic or seismoelectric conversions caused by well processes, such as drilling, production enhancement operations, e.g., fracturing, or reservoir production. Similarly, such surveying may detect a seismic signal generated in response to electroseismic or seismoelectric conversions caused by well processes. The electroseismic or seismoelectric conversion may take place in a subsurface earth formation. Using such techniques, geophysical surveying may be performed without the requirement for expensive active sources of electromagnetic or seismic energy, which may improve site safety and reduce environmental impacts. The reduction in the amount of equipment and power, along with the corresponding reduced footprint at the measurement site, may be an advantage over other surveying systems and methods. From an environmental and health perspective, the reduction in transportation, site preparation, and high energy sources may improve the overall health and safety of the workers operating the equipment. In addition, the electromagnetic field generated by well operations comprises a broad spectrum of frequencies, from sub-hertz frequencies to tens of thousands of hertz frequencies. This broad spectrum allows for a broad range of penetration depths from tens of meters to tens of kilometers. This broad spectrum also permits high spatial and depth resolution. Accordingly, the electromagnetic and/or seismic signals detected may be processed to identify various properties of the subsurface earth formation and the well operation.

Other technical advantages of the present disclosure will be readily apparent to one of ordinary skill in the art from the following figures, description, and claims. Moreover, other specific advantages of particular surveying techniques and combinations are discussed below. Moreover, while specific advantages are explained in the present disclosure, various embodiments may include some, all, or none of those advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 1:
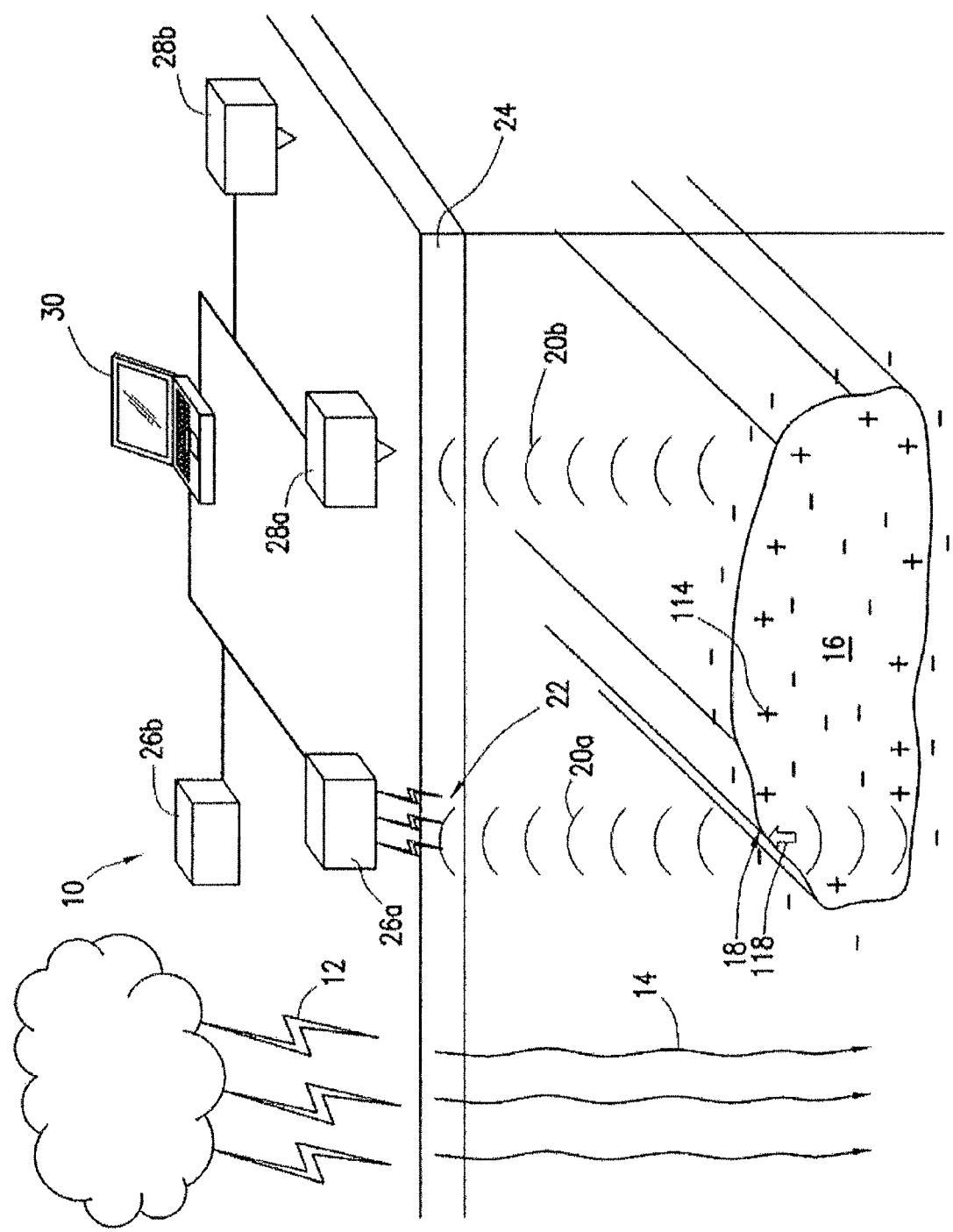
FIG. 1 is a perspective diagram illustrating an example system for passive electroseismic and seismoelectric surveying.

The example embodiments herein may utilize electroseismic and/or seismoelectric sensors to detect the electric fields and/or seismic waves generated passively by well operation. Certain embodiments discussed herein may use, at least in part, passive surveying techniques that utilize passive sources, such as naturally occurring electromagnetic fields and/or seismic waves, and the interactions of electromagnetic or seismic signals generated by those sources with subsurface formations through electroseismic and/or seismoelectric conversions to identify features and/or properties of subsurface earth formations. Such surveying may be useful for a variety of purposes, including the identification of subsurface water and minerals. While passive surveying may be suitable for use as a standalone method of geophysical surveying, passive surveying may, in some embodiments, be performed in conjunction with other geophysical surveying methods to identify properties of subsurface earth formations. The teachings of the present disclosure are intended to encompass embodiments that employ passive surveying as a standalone surveying technique as well as embodiments that use passive surveying in conjunction with one or more other methods of geophysical surveying.

A passive source may be utilized to provide the energy for generating electroseismic and/or seismoelectric conversions in a subsurface formation or structural feature. For example, the earth's electromagnetic field and/or environmental seismic energy may induce electroseismic or seismoelectric conversions in a subsurface earth formation that holds hydrocarbons or other minerals. As used herein, a "passive source" may include any source that is not being actively initiated by a surveying operation to actively generate a source of seismic and/or electromagnetic energy. Although a passive source generally includes a natural source of electromagnetic energy and/or seismic energy such as the earth's natural electromagnetic field, other man-made sources of electromagnetic and/or seismic radiation such as electrical power lines or mechanical equipment may also be included as passive sources in particular embodiments. While certain man-made sources may induce an electromagnetic field or seismic wave, they are distinguishable from an "active source" such as a seismic generator, explosives, electric field generators, and the like in that such sources are generally initiated by and/or are associated with a surveying operation to facilitate surveying a subterranean formation. As used herein, "passive surveying," "passive electroseismic surveying," and "passive seismoelectric surveying" may refer to surveying that utilizes a passive source as opposed to an active source. Passive surveying may detect the generation of secondary seismic waves through coupling of the electromagnetic source field to various rock formations (electroseismic effect) and subsequent generations of secondary electromagnetic fields through coupling of the generated seismic waves with various rock formations (seismoelectric effect) to probe those formations and the fluids they contain. Alternatively or in addition, passive surveying may detect the generation of secondary electromagnetic fields through coupling of a seismic source field to various rock formations (seismoelectric effect) and subsequent generations of secondary seismic waves through coupling of the generated electromagnetic fields with various rock formations (electroseismic effect) to probe those formations and the fluids they contain. Generation of tertiary and higher order electromagnetic fields and seismic waves can also result from additional couplings as the fields propagate towards the surface of the earth.

Other surveying techniques such as controlled-source electroseismic or seismoelectric surveying typically reject signals generated by such passively-generated conversions as background noise. Utilizing the teachings of the present disclosure, however, electromagnetic and seismic signals generated by seismoelectric and electroseismic conversions in response to a passive source of energy may be detected and processed using various data processing techniques to identify properties of the subsurface earth formation. For example, a generated seismic signal may be identified by detecting the characteristic time lags or frequencies associated with the seismic travel time using a time-selective method and determining the depth of origin of the seismic signal from said time selective method.

Electromagnetic and/or seismic signals generated as a result of electroseismic or seismoelectric conversions may be detected in any appropriate manner. For example, various sensors may be utilized to detect one or more of an electromagnetic signal and a seismic signal that are generated by a subsurface earth formation in response to a passive-source electromagnetic or seismic signal, wherein the electromagnetic signal is generated by an electroseismic or seismoelectric conversion of the passive-source electromagnetic or seismic signal. In some embodiments, arrays of sensors may be utilized. Data processing may be utilized to process signals to facilitate identification of one or more of the subsurface earth formation properties discussed above.

Using these techniques, various properties of the subsurface earth formation may be identified. For example, processing the detected signal may indicate the presence of fluids such as hydrocarbons and aqueous fluid such as potable water, fresh water, and brine water in the subterranean formation. In some embodiments, the teachings of the present disclosure may be utilized to identify additional properties of the subsurface earth formation, including but not limited to the existence of the subsurface earth formation, depth of the subsurface formation, porosity and/or fluid permeability of the subsurface earth formation, the composition of one or more fluids within the subsurface earth formation, a spatial extent of the subsurface earth formation, an orientation of the boundaries of the subsurface earth formation, and resistivity of the subsurface earth formation. Based on the identified properties, models may be developed of the subsurface earth formation, including three-dimensional structural and time-dependent models. In addition or in the alternative, the techniques of the present disclosure may be utilized to identify the presence of and/or migration of various pollutants, gasses, flooding in hydrocarbon production, fault movement, aquifer depth, water use, the presence of and/or migration of magma, and hydrofracturing properties.

In some embodiments, passive survey data obtained and/or collected as a result of passive surveying may be processed with geophysical survey data obtained and/or collected using various other surveying techniques. Processing passive survey data and other available sources of geophysical survey data may provide various technical benefits. For example, such processing may allow additional information, more complete information, and/or confirmation of information regarding subsurface earth formations. Such processing may take advantage of particular strengths of other survey methods to establish a baseline for comparison and/or determine particular properties for which those methods are well-suited. As a result, passive surveying techniques combined with other available surveying techniques may result in a more complete understanding of the subsurface formation than would otherwise have been available if the individual techniques were used alone.

While specific advantages have been enumerated above, various embodiments may include all, some, or none of the enumerated advantages. Embodiments of the present disclosure and its advantages are best understood by referring to FIGS. 1 through 9, wherein like numerals refer to like and corresponding parts of the various drawings.

Example embodiment of the present disclosure may include passive electroseismic surveying. Example embodiments of passive electroseismic surveying utilize naturally occurring electromagnetic fields (e.g., the earth's background electromagnetic field) and their interactions with subsurface formations through electroseismic and/or seismoelectric conversions. Passive surveying uses sources of electrical power that are not specifically generated for the surveying method. Electric fields originating at the surface of the earth penetrate deeply into the subsurface where they interact with certain rock formations to generate seismic waves. These seismic waves propagate back to the Earth's surface where they are detected with one or both of seismic or electromagnetic sensors. Detecting the characteristic time lags or frequencies associated with the seismic travel time determines the depth of origin of the seismic signal. The amplitude of the returning seismic signal may be indicative of one or more properties of the subsurface formation, including, for example the fluid content of a subsurface formation.

Passive-source electroseismic surveying (PSES) may provide information about a subterranean formation that is not available from other methods. With seismic resolution, passive electroseismic surveying can yield information about formation porosity, fluid permeability, fluid composition, resistivity, depth, and lateral extent of a fluid-bearing formation. Although PSES provides information about many useful formation properties, it may not independently measure electrical and seismic properties. A complementary measure of seismic and electromagnetic properties might yield additional useful information.

An understanding of the passive electromagnetic and seismic effects that is useful in passive surveying begins with an understanding of the electromagnetic field within the earth, at least a portion of which may comprise the naturally occurring background electromagnetic field of the earth. The earth's naturally occurring electromagnetic field includes a broad spectrum of frequencies, from sub-hertz frequencies to tens of thousands of hertz frequencies, having a broad coverage over the surface of the earth. This broad spectrum allows for a broad range of penetration depths from tens of meters to tens of kilometers. The various electromagnetic frequencies in the earth may result from various natural events such as electromagnetic fluctuations in the ionosphere and/or naturally occurring electromagnetic discharges in the atmosphere (e.g., lightning).

The earth's electromagnetic field propagates as an electromagnetic modulation that, unlike an acoustic wave, travels at the speed of an electromagnetic wave in the subsurface, which is less than the speed of an electromagnetic wave in a vacuum or air. The electromagnetic wave may typically travel in the subsurface of the earth at a speed of about one hundred times greater than the speed of propagation of an acoustic wave in the seismic frequency band of about 1-100 Hz. Due to the relative speed of the electromagnetic wave when compared to the seismic signal, the travel time of the electromagnetic wave into the subsurface earth formation is generally neglected for purpose of processing electroseismic and seismoelectric data.

Passive electromagnetic and passive seismic surveying make use of two properties of subsurface electromagnetic propagation neglected in many other surveying methods. In the first instance, an electromagnetic modulation with an electric field perpendicular to the surface of the Earth attenuates weakly. Such waves of high frequency can propagate and interact with formations from the surface to several km in depth and are not used in magnetotellurics. The high-frequency character of these modulations permits measurement of the electromagnetic travel time from the surface to a formation of interest. In certain example embodiments, this transit time measurement might be used to accurately determine the depth. In the second instance, an electromagnetic modulation entering the Earth's surface interacts with near-surface formations by electroseismic conversion. Electroseismic conversion creates seismic waves that propagate downward into the Earth and might reflect from reservoir rock or other formations of interest. The transit time for the seismic wave to travel downward from the earth's surface and back from a layer of interest accurately determines the depth where the reflection occurs.

Electromagnetic modulations from the atmosphere impinge uniformly on the earth over large areas. The atmospheric field subsequently converts to a uniform electric field in the Earth's subsurface. That field rotates to a vertical orientation and travels to substantial depth where it might reflect from contrasts in resistivity or polarization. The feasibility of passive electromagnetic surveying is enhanced by the uniform electric field that creates plane wave propagation in the subsurface. It is known that plane waves travel to greater depth than waves generated at a point or from a finite source of any shape.

In a similar fashion, passive seismic generation at the Earth's surface can be used to image the subsurface. Seismic waves might be generated at the Earth's surface by several mechanisms. First, the atmospheric electric field generates electroseismic conversions at the surface. Second, atmospheric disturbances, such as thunder, create pressure changes at the surface that also create seismic responses. Third, anthropomorphic pressure and ground level noises are created by human activity such as trucks, trains, and machinery. All of these sources of seismic energy in the Earth are potential sources for imaging the subsurface by seismic reflection or refraction.

Plane waves of seismic origin will penetrate most deeply into the subsurface. Then sources of seismic energy that are uniform over large distances are most promising for subsurface imaging. Sources that originate in the atmospheric electric field or in large scale pressure fluctuations, such as created by thunder, are most likely to be uniform and penetrate deeply.

A vertical electric field is attenuated slowly with depth and vertically-propagating seismic p-wave attenuation and scattering are also attenuated slowly. Seismic attenuation calculations suggest that frequencies up to the kilo-Hertz range might be useful to depths of thousands feet.

The systems and methods disclosed herein advantageously utilize signals that have heretofore been neglected and/or not detected. Magnetotelluric surveying generally involves the use of the natural electromagnetic fields that originate in the earth's atmosphere. In magnetotelluric surveying, naturally-occurring electromagnetic fields propagate into the subsurface where they encounter rock formations of differing electrical conductivity. When the electromagnetic fields contact a formation of low conductivity, such as is typical of hydrocarbon reservoirs, the electromagnetic field measured at the surface of the earth changes. Spatially-dependent electromagnetic fields measured on the earth's surface can be used to indicate the presence of low-conductivity formations that might contain hydrocarbons. Magnetotelluric surveying has several limitations. Only low-frequency, long-wavelength electromagnetic stimulation may reach prospective reservoirs because the high-frequency, horizontal electric fields are rapidly attenuated by the conducting earth. Long-wavelength electromagnetic waves limit the spatial resolution of magnetotellurics making reservoir delineation difficult. Additionally, magnetotelluric surveying only provides information about formation electrical conductivity and does not yield data revealing information about porosity, permeability, or reservoir structure.

In contrast to magnetotelluric surveying methods, the passive electromagnetic surveying method makes use of the time it takes an electromagnetic wave to travel from the surface to the target formation and the time it takes to return to the surface. The transit time measurement yields an accurate measure of the depth of a formation. Additionally, passive electromagnetic surveying uses the vertical component of the passive electric field. It is known that the vertical component of the electric field penetrates deeply into the earth at frequencies that are higher than possible with magnetotellurics.

In general, active-source seismic surveying uses frequencies well below 1000 Hz. A typical seismic survey for 3D imaging might be restricted to frequencies below 200 Hz and more often to frequencies below 100 Hz. The restriction on frequency is limited by several factors. First, the seismic sources couple poorly to the ground. High frequencies are attenuated at the source. Second, geophones used to detect seismic energy couple poorly to the surface. Third, the seismic source and receivers are point sources and receivers. Energy propagates rapidly away from point sources with geometric spreading. It is then difficult to detect frequencies above 100 Hz at target depths of thousands of feet.

Passive measurements of seismic energy can overcome the frequency limitations of conventional seismic studies. In particular, passive seismic measurements detect the Earth's electric field that then creates a seismic wave by electroseismic conversion in the near-surface. An electromagnetic detector is not limited to the ground coupling problems associated with seismic sources and sensors. Additionally, an electromagnetic source in the atmosphere can consist of elements of arbitrarily high frequencies. Acoustic sources such as thunder and anthropomorphic sources are less likely to have high frequency components. These considerations mediate against using seismic sources and receivers to study passive seismology.

Example embodiments of passive seismic surveying use an electromagnetic detector of the same kind used in electroseismology. The significant difference between the two measurements is that the passive seismic signal is generated by reflections from subsurface boundaries, it does not involve electroseismic conversion at target depths, and it arrives at twice a seismic travel time. That is, the seismic signal arrives at double the electroseismic arrival time.

In some example embodiments, a single sensor type, an electric or magnetic field sensor, can be used to detect high-frequency, passive, seismic energy and high-frequency passive electromagnetic energy that are useful as complementary measurements to passive electroseismology.

Passive electromagnetic and seismic surveying can be used alone or in combination to overcome limitations of present technologies for hydrocarbon exploration and production surveying. In the absence of high power sources of electrical or seismic energy, the costs, environmental, and safety concerns are reduced. Example implementations of the methods may yield high spatial resolution of hydrocarbon or aquifer formations. Example implementations of the methods may provide a measure of electrical resistivity and seismic properties including velocities of seismic and electromagnetic waves.

Figure 2:
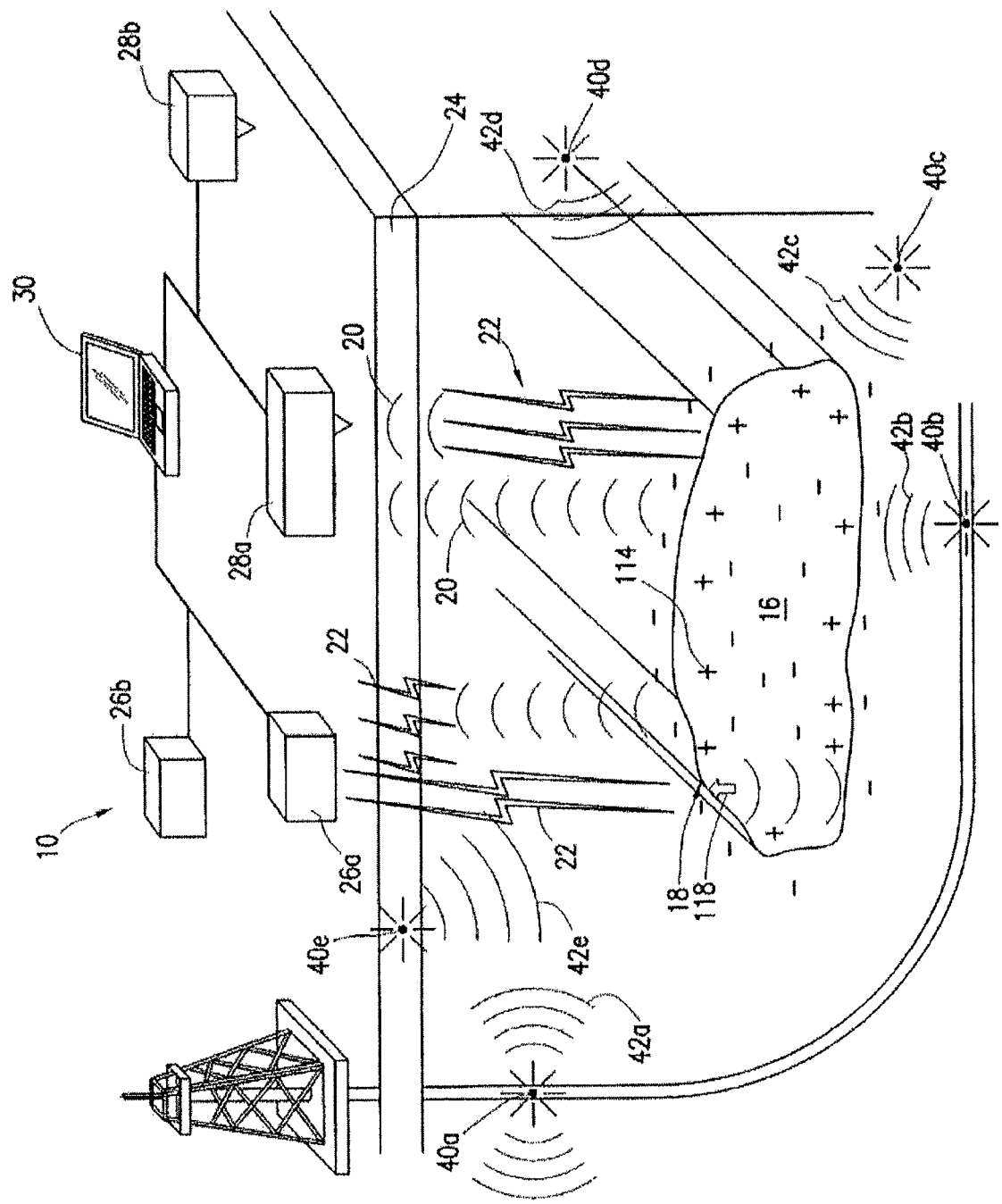
FIG. 2 is a perspective diagram illustrating an example system for passive electroseismic and seismoelectric surveying.

FIGS. 1 and 2 are perspective diagrams illustrating an example system 10 for electroseismic and seismoelectric surveying. Example system 10 includes electromagnetic sensors 26, seismic sensors 28, and computing system 30. FIG. 1 illustrates an embodiment in which system 10 is generally configured to utilize signals 14 propagated by a passive electromagnetic source 12 of electromagnetic energy to perform geophysical surveying. FIG. 2 illustrates an embodiment in which system 10 is generally configured to utilize signals 20 and/or 22, which may be propagated by a passive seismic source 40.

As illustrated in FIG. 1, sensors 26 and/or 28 generally detect signals generated by subsurface earth formation 16 in response to a electromagnetic signal 14 propagated from passive electromagnetic source 12. Computing system 30 may then process detected signals using various signal processing techniques to identify properties and/or features of subsurface earth formation 16. System 10 may detect seismic signals 20 generated due to the electroseismic interactions between the electromagnetic signal 14 and the subsurface formation 16, either alone or in combination with detecting electromagnetic signal 22, which may be generated as a result of seismoelectric conversions of seismic signals 20. One or more of the detected signals may then be processed to determine one or more properties of the subsurface earth formation.

Passive electromagnetic source 12 represents any appropriate passive source of electromagnetic energy. In certain example embodiments, passive electromagnetic source 12 may include the earth's natural electromagnetic field. In certain example embodiments, passive electromagnetic source 12 may include one or more man-made sources of electromagnetic or seismic energy that are generally not created for the purpose of surveying of subterranean formations. The man made sources of electromagnetic energy for passive surveying may include electromagnetic energy from power lines or other sources of electromagnetic energy. Passive electromagnetic source 12 propagates electromagnetic energy into the subsurface of the earth as electromagnetic signal 14. Electromagnetic signal 14 may represent, for example, an electromagnetic plane wave 14. As electromagnetic signal 14 propagates into the earth, it may encounter various subsurface earth formations 16. The interaction of electromagnetic signal 14 and subsurface earth formation 16 may cause an electroseismic conversion to take place at an edge and/or boundary 18 of subsurface formation 16. As a result, one or more seismic waves 20 may propagate towards the surface of the earth. Electromagnetic signal 22 may be generated as a result of a seismoelectric conversion as seismic signals 20a propagate towards the surface. Electromagnetic sensors 26 may detect electromagnetic signals 22. Seismic sensors 28 may detect seismic signals 20b.

Passive electromagnetic source 12 may represent earth's naturally occurring electromagnetic field. Earth's naturally occurring electromagnetic field may include a broad spectrum of frequencies, from sub-hertz frequencies to tens of thousands of hertz frequencies, having a broad coverage over the surface of the earth. This broad spectrum allows for a broad range of penetration depths of electromagnetic signal 14 from tens of meters to tens of kilometers. This broad spectrum further may permit detection of subsurface structures with high spatial and depth resolution. The corresponding frequencies of electromagnetic signal 14 in the earth may result from variations in passive electromagnetic source 12 due to various natural events such as electromagnetic fluctuations in the ionosphere, naturally occurring electromagnetic discharges in the atmosphere such as lightning, and/or other electromagnetic events. In some embodiments, passive electromagnetic source 12 of electromagnetic signals 14 may include natural sources of electromagnetic radiation, which may have sufficiently low frequencies to reach and interact with subterranean formation 16. As another example, passive electromagnetic source 12 may include power transmission lines, which may generate electromagnetic signals 14 of appropriate strength and/or frequency to interact with subterranean formation 16.

Electromagnetic signal 14 represents an electromagnetic wave, electromagnetic plane wave, or other appropriate electromagnetic signal that propagates into the Earth from passive electromagnetic source 12. For example, in response to Earth's electromagnetic field, electromagnetic signal 14 may propagate into the Earth as an electromagnetic modulation that, unlike an acoustic wave, travels at the speed of an electromagnetic wave in the subsurface. The speed of an electromagnetic wave in the subsurface may generally be less than the speed of an electromagnetic wave in a vacuum or air. Electromagnetic signal 14 may typically travel in the subsurface of the earth at a speed of about one hundred times greater than the speed of propagation of an acoustic wave in the seismic frequency band of about 1-100 Hz. Due to the relative speed of electromagnetic signal 14 when compared to a seismic signal, the travel time of the electromagnetic signal 14 into the subsurface earth formation may, in some embodiments, be ignored when processing the detected electromagnetic field 22 and/or detected seismic signals 20. Although illustrated as a static field, it should be noted that electromagnetic signal 14 may be a time-varying field.

Electromagnetic signal 14 may propagate into the subsurface of the earth as an approximate plane wave modulation, including over subsurface formation 16 of interest. The term "plane wave" may refer to a wave with substantially uniform amplitude on a plane normal to a velocity vector of electromagnetic signal 14. The velocity vector may be generally vertical, although not necessarily perpendicular to the surface of the Earth above subsurface earth formation 16. For example, a velocity vector may be substantially vertical but may appear inclined relative to a vertical axis at the surface where the surface is on an incline, such as on a hillside or other incline. As a result of the electroseismic effect and/or seismoelectric effect, the seismic signals 20 and/or electromagnetic signals 22 resulting from electromagnetic signals 14 may be generated substantially uniformly across subsurface formation 16. As a result, seismic signals 20 and/or electromagnetic signals 22 may each form a substantially vertical plane wave traveling to the surface of the Earth.

Subsurface earth formation 16 represents any subsurface earth formation of interest for the purposes of geophysical surveying. Subsurface earth formation 16 may represent a geologic formation that holds one or more fluids. In some embodiments, subsurface earth formation 16 represents a porous rock formation able to hold fluids. A porous rock formation may, for example, include solid rock portion interspersed with channel-like porous spaces. A porous rock formation may, for example, include an earth substance containing non-earthen volume or pore space, and may include, but is not limited to, consolidated, poorly consolidated, or unconsolidated earthen materials. Fluids held by subsurface earth formation 16 may be hydrocarbons such as oil and gas, water (including fresh, salt, potable, or briny water), helium, carbon dioxide, minerals, or other earth fluids. In some embodiments, subsurface earth formation 16 may represent a formation holding pollutants, magma, or molten material. Subsurface earth formation 16 may represent a geologic layer, a stratigraphic trap, a fault, a fold-thrust belt, or other geographic formation of interest. Subsurface earth formation 16 may represent a prospective or potential area of interest for exploration operations, drilling operations, production enhancement operations, or fluid production.

Subsurface earth formation 16 may include a polarizable fluid including one or more fluid dipoles 114 associated with a fluid in subsurface earth formation 16. As a result, an electrochemical interaction may form between the polarizable fluid and the solid rock portions at boundary 18. The electrochemical interaction is represented by the "+" symbol in the fluid portion and the "−" symbol in the solid rock portion. Electromagnetic signals 14 may encounter and/or interact with fluid dipoles 114 of subsurface earth formation 16. In particular, the electromagnetic signals 14 may cause a change in the polarization of dipoles 114 in the pore fluid, which in turn may cause a pressure pulse 118 to be generated. For example, electromagnetic signals 14 may modify the electrochemical bonds or move the charges of fluid dipoles 114, thereby effectively creating pressure pulse 118 where the interactions are distorted. Pressure pulse 118 may represent a change in pressure and/or fluid flow that produces a time-varying pressure gradient, which may then propagate and/or be transmitted into the earth formation (or rock) at boundary 18 of subsurface earth formation 16. Electromagnetic signals 14 exist throughout the fluid area and may primarily affect the charges of the dipoles 114 which are at or near boundary 18 of the rock. The pressure gradient produced by pressure pulse 118 may propagate towards the surface as seismic signal 20. In should be noted that the solid rock portion may have an existing natural surface charge over at least a portion of the rock surface. The electrochemical interaction may result in a local pore fluid dipole 114 that causes a local background electromagnetic field. Moreover, the sign of the background electromagnetic field or field polarity direction depends on the surface charge on the solid and the way the fluid screens out that charge. For example, for clay layers, the charge is typically as shown as illustrated. In other materials such as carbonates, however, the charge may be reversed. Thus, an appropriate subsurface formation 16 may be a subsurface source of seismic energy.

Boundary 18 may represent an appropriate edge, boundary, fluid surface, or interface between subsurface earth formation 16 and other portions of the subsurface. Boundary 18 may represent the boundary of a hydrocarbon reservoir, stratigraphic trap, fold thrust belt, geologic rock layer, or other geological formation holding or likely to hold fluids and other minerals of interest. Boundary 18 may represent a boundary between any two types of subsurface materials.

Electroseismic energy conversion may occur at the boundary 18 between two types of rock. For example, the electroseismic energy conversion may occur at the boundary 18 between reservoir rock and the sealing and/or confining rock. Alternatively, electroseismic energy conversion may occur at an interface 18 between pore fluids, for example, between oil and water. At the rock and/or fluid interfaces 18 there may be a gradient in the chemical potential. For example, at the boundary 18 between a silicate rock and a carbonate rock, a chemical reaction may occur in the comingled pore fluids. For example, the silicate may dissolve the carbonate, and the silicate ions in solution may react with the carbonate ions in solution. The overall reaction may be driven by a gradient in the chemical potential at the interface 18. The reaction product between positive and negative ions in solution is electrically neutral and may precipitate out of solution. When a precipitate is formed, the resulting deposition of the precipitate strengthens the rock, increases its hardness, and increases the electrical resistivity of the interface. During the reactions in pore spaces, concentration gradients of charged ions may be created within the pore fluids. These concentration gradients may produce an electrochemical-potential gradient which may manifest itself as a macroscopic electrical potential gradient. The internal electrical potential gradients at the interfaces may create internal stresses, and the interaction of the earth's background electromagnetic field 14 with the electrochemical-potential gradient may change these internal stresses. Due to the natural modulations in the earth's background electromagnetic field 14, the internal stresses may be modulated, accounting for the nonlinear electroseismic conversions that may be measured and used by system 10.

Seismic signals 20 represent any seismic signals and/or seismic waves generated by the electroseismic effect in response to electromagnetic signal 14. As noted above, seismic signals 20 may represent a substantially vertical plane wave that travels towards the surface of the Earth. Seismic signals 20 may generate subsequent secondary electromagnetic fields and seismic waves through various combinations of the electroseismic and seismoelectric effects as seismic signals 20 propagate to the surface. For example, as illustrated, seismic wave 20a may be converted by the seismoelectric effect to an electromagnetic signal 22 at a near surface formation 24. In some embodiments, seismic signals 20 may represent secondary seismic signals generated as a result of various seismoelectric and/or electroseismic conversions of seismic signals 20 as they propagate towards the surface. Seismic signals 20 may represent any mechanical seismic wave that propagates in the subsurface of the earth and may include, but is not limited to, P- and S-waves.

Electromagnetic signals 22 represent any electromagnetic signals, electromagnetic fields, or electromagnetic waves generated by the seismoelectric effect in response to seismic signals 20. As noted above, electromagnetic signals 22 may represent a substantially vertical plane wave traveling to the surface of the Earth. Electromagnetic signals 22 may generate subsequent secondary seismic signals and electromagnetic signals as electromagnetic signals 22 propagate to the surface. Electromagnetic signals 22 may represent secondary electromagnetic signals generated as a result of various seismoelectric and/or electroseismic conversions of seismic signals 20 as they propagate towards the surface. In some embodiments, electromagnetic signals 22 may be detectable in the near-surface of the Earth and/or at some distance above the surface of the Earth. In addition, electromagnetic signals 22 may represent a time-variant electromagnetic field resulting from the seismoelectric effect. Electromagnetic signals 22 may modulate an electromagnetic field within the Earth, such as in the near surface 24 and may thus be referred to as a modulating signal. "Modulation," or "modulating," may refer to frequency modulation, phase modulation, and/or amplitude modulation. For example, seismic signals 20 may travel to the near-surface 24 and directly modulate an electromagnetic field within the near-surface 24. Seismic signals 20 may cause a change in the electrical impedance in near-surface 24, which may result in a time-dependent variation of electromagnetic signals 22 and/or the passage of seismic signals 20 may interact with a fluid or rock boundary at near surface 20 to produce electromagnetic signals 20.

Electroseismic conversions may also produce nonlinear electromagnetic conversions. Seismoelectric and electroseismic effects generate harmonic responses where the coupling of electromagnetic signals 22 and seismic signals 20 create new modulations at frequencies that are harmonics of the electromagnetic signals 22 and seismic signals 20. Accordingly, electromagnetic signals 22 and seismic signals 20 may represent one or more non-linear electromagnetic responses. Nonlinear electroseismic conversions may produce signals useful during processing. In some embodiments, nonlinear, harmonic signals having frequency components at higher frequency harmonics of the passive electromagnetic source 12's fundamental frequency, such as those frequencies present in the earth's background electromagnetic field, may be detected as a result of distortions of electromagnetic signals 14 interacting with subsurface earth formation 16 when it contains at least one fluid. The harmonic signals may be processed alone or in conjunction with the fundamental frequencies of the seismic signals 20 and/or the electromagnetic signals 22 to determine one or more properties of the subsurface earth formation. In some embodiments, system 10 may be utilized to detect and/or isolate the harmonic signals that may be present in both electromagnetic signals 22 and seismic signals 20.

Subsurface formation 16 may generate seismic signals 20 and/or electromagnetic signals 22 particularly when fluid is present in a porous formation, such as formations of high permeability. Accordingly, seismic signals 20 and/or electromagnetic signals 22 may indicate the presence of that fluid and/or may be utilized by system 10 to locate and/or potentially locate particular fluids, such as hydrocarbons, Helium, carbon dioxide, or water, water, or other types of fluids as described above. In addition, when conventional seismic reflection boundaries 18 exist between subsurface formation 16 and the surface, seismic reflections may occur and may be detected by seismic sensors 20.

Near-surface formation 24 represents a subsurface formation at or near the surface of the Earth. Near-surface formation 24 may, for example, represent a water table or other porous rock layer. Seismic signals 20 may interact with fluid in pores of near-surface formation 24. As a result, charges within the pore may be modified. The pore may, for example, contain fresh water as is present in the water table. The resulting modification of the charges may generate an alternating current field, which may lead to the emission of electromagnetic signals 22 through the seismoelectric effect.

Electromagnetic sensors 26 represent any suitable combination of sensing elements capable of detecting and/or measuring at least some portion of electromagnetic signals 22. Electromagnetic sensors 26 may be communicatively coupled to computing system 30 and/or configured to output detected signals to computing system 30. In some embodiments, sensors 26 may be configured to detect and/or isolate the vertical component of the electromagnetic signals 22. As noted above, electromagnetic signals 22 may be emitted above the surface of the earth as a detectable electromagnetic field. It should also be noted that an electromagnetic field generally includes an electric field and a magnetic field. Accordingly, electromagnetic sensor 26 may be capable of detecting electromagnetic signals 22, an electric portion of electromagnetic signals 22, and/or a magnetic portion of electromagnetic signals 22. In some embodiments, electromagnetic sensor 26 may represent a magnetic field detector capable of detecting a magnetic field. In some embodiments, electromagnetic sensors 26 may be configured to attenuate and/or reject horizontal or vertical electromagnetic signals.

Electromagnetic sensors 26 may be arranged in an array and/or in a variety of patterns. Any appropriate number of electromagnetic sensors 26 may be arranged in the array or pattern. For example, an array of electromagnetic sensors 26 may include anywhere from two to thousands of sensors. In some embodiments, electromagnetic sensors 26 may represent a set of sensors that includes one or more magnetic field detectors, one or more electric field detectors, and one or more electromagnetic field detectors, which may be used in particular locations for passive surveying. The array may be configured of one or more disposed electromagnetic sensors, such as sensor 26a and 26b, separated by an appropriate lateral distance. For example, sensor 26a and 26b may be located anywhere between several inches to several miles apart.

Sensors 26 may comprise any type of sensor capable of measuring the vertical electric field component of electromagnetic signals 22 in the near surface 24 of the Earth. In some embodiments, additional or alternative signals may also be measured including the background vertical portion of electromagnetic signals 14, the passive electromagnetic source 12 of electromagnetic radiation, one or more components of the magnetic field, one or more horizontal components of the electromagnetic signal and/or one or more components of the seismic amplitude. In some embodiments, one or more electromagnetic field detectors may be configured to measure a horizontal component of the earth's electromagnetic field in one or more dimensions. For example, sensors 26 may include electrode pairs disposed in a horizontal alignment to measure one or more horizontal components of electromagnetic signals 22 and/or electromagnetic signals 14. In some embodiments, sensor 26 may be configured to measure multiple components of electromagnetic signals 22 and/or 14. For example, sensor 26 may represent a two-axis electromagnetic field detector and/or a three-axis electromagnetic field detector.

Sensors 26 may be disposed above the surface of the Earth and/or within the Earth. In some embodiments, sensor 26 may be placed at or on the surface of the Earth or at any distance above the surface of the Earth. For example, electromagnetic sensors 26 may be disposed anywhere from one to one hundred feet above the Earth, depending on the relative amplification capabilities of sensors 26 and the attenuation of electromagnetic signals 22. Sensors 26 may also be placed in aircraft. In certain example embodiments, the aircraft fly low. In some embodiments, sensors 26 may be disposed above and/or below the water table, above and/or below subsurface earth formation 16, and/or any appropriate combinations of locations and depths. Sensors 26 may be maintained in one location during a detection period of particular electromagnetic signals 22 and/or may be subsequently moved to provide another detection period. Additionally or alternatively, a plurality of sensors 26, such as an array, may be used to provide multiple simultaneous measurements at multiple locations. For example, electromagnetic sensors 26 may be disposed within a wellbore. Alternatively or in addition, an array of electromagnetic sensors 26 may be disposed in the area above and/or surrounding the wellbore to facilitate drilling operations and/or exploration of drilled fields. A more detailed discussion of an example operation of such embodiments is discussed below with respect to FIG. 7. More detailed examples of sensors 26 are illustrated in FIGS. 2A, 2B, and 2C.

Seismic sensors 28 represent any suitable combination of sensing elements capable of detecting and/or measuring at least some portion of seismic signals 20. For example, sensors 28 may be configured to detect the vertical component of seismic signals 20. Seismic sensors 28 may be communicatively coupled to computing system 30 and/or configured to output detected signals to computing system 30. Seismic sensors 28 may include, but are not limited to, geophones, hydrophones, and/or accelerometers, including digital accelerometers. Sensors 28 may represent a single-component geophone, a two-component geophone, or a three-component geophone. Sensors 28 may also represent a single-axis accelerometer, a two-axis accelerometer, or a three-axis accelerometer. In some embodiments, seismic sensors 28 may represent one or more three-component accelerometers. Additionally or alternatively, sensors 28 may represent any appropriate combinations of these types of seismic sensors. For example, multiple types of sensors 28 may be utilized by system 10 to detect seismic signals 20. Seismic sensors 28 may measure a seismic wave in multiple directions, for example in one or two directions parallel to the surface of the earth, in a direction perpendicular to the surface of the earth, and/or in a vertical direction. Seismic sensors 28 may measure rotational seismic energy where earth motion is circular around a horizontal or vertical axis. Rotational sensors may advantageously be used to identify surface seismic waves.

Seismic sensors 28 may be arranged in an array and/or in a variety of patterns. For example, seismic sensors 28 may be arranged and/or located in similar manners and locations as discussed above with respect to sensors 26. Any appropriate number of seismic sensors 28 may be arranged in the array or pattern. As another example, a grid pattern may be used. Seismic sensors 28 may be laterally spaced apart by a distance related to the wavelength of the highest frequency surface seismic waves expected to be detected. That may include higher frequencies than those expected to be produced by the electroseismic effect within the subsurface earth formation. Seismic sensors 28 may be configured to attenuate and/or reject surface and/or horizontal seismic signals. Such signals may be caused by various sources including heavy equipment, vehicular traffic, and/or natural sources such as earthquakes and/or thunder.

In some embodiments, a pattern and/or array of electromagnetic sensors 26 may overlap with a pattern or array of seismic sensors 28. Signals detected by sensors 26 and/or 28 may be transmitted to computing system 30. In some embodiments, the signals may be suitably recorded, for example, using a conventional seismic field recorder. Additionally or alternatively, each sensor may have its own recording device, and each recording device may be internal or external to the seismic sensor. It should be noted that while illustrated as including sensors 26 and 28, system 10 may include only sensors 26 or only sensors 28 as appropriate for particular embodiments. Accordingly, any appropriate combination of sensors 26 and/or sensors 28 may be utilized.

Sensors 26 and/or 28 may be placed in a wellbore. For example, in some implementations one or more contacts are provided down-hole on the inside of a casing to measure electric potential. With such a configuration, the arrival of an electroseismic signal may be measured for locations along the wellbore. In other implementations, one or more seismic sensors 28 may be positioned down-hole.

Sensors 26 and/or 28 may form all or a portion of a long-term installation, which may be utilized for long-term passive surveying. Signals 20 and/or 22 may be detected at multiple times over a period of time, which may be periods of days, weeks, months, or years. Long-term surveys may provide a time-based indication of various properties of subsurface earth formation 16, including any changes in the formation over the time period in which the signals are detected. System 10 may thus be used to monitor the development and/or depletion of a hydrocarbon field and/or water well or aquifer over periods of production.

Computing system 30 represents any suitable combination of hardware, software, signal processors, and controlling logic to process, store, and/or analyze electromagnetic signals 22 and/or seismic signals 20 received from sensors 26 and/or 28. Computing system 30 may include one or more processors, memory, and/or interfaces. Computing system 30 may, for example, include an interface operable to communicatively couple with and/or receive information from sensors 26 and/or 28. Computing system may be operable to receive and/or process passive survey data from sensors 26 and 28. Passive survey data may include, for example, data representative of signals 20 and/or 22. Computing system 30 may include one or more appropriate analog-to-digital converters to digitize signals 20 and/or 22 for digital signal processing. Alternatively or in addition, sensors 26 and/or 28 may include appropriate analog-to-digital converters. Computing system 30 may include a recording and/or storage device operable to receive and store data received from sensors 26 and 28. Computing system 30 may include, for example, digital and/or analog recording devices and/or non-transitory media. In some embodiments, computing system 30 may be capable of processing detected seismic signal 20 and the detected electromagnetic signal 22 in real-time without first recording the signals on a non-transitory medium.

Computing system 30 may form all or a portion of a recording vehicle, a housing structure, or a weather resistant enclosure located proximate sensors 26 and/or 28. In some embodiments, computing system 30 may be at least partially enclosed in a weather-resistant enclosure. Accordingly, computing system 30 may be capable of recording passive survey data over days to weeks without human intervention. Moreover, while illustrated as external to sensors 26 and/or 28, computing system 30 may be internal or external to a housing of one or more sensors 26 and/or 28. Moreover, computing device 30 may be one of a plurality of computing devices 30 used to record one or more electric and/or seismic signals. Computing device 30 may be capable of communicating with other computing devices 30 or other data processing servers over a network (not illustrated). The network may be a wired or wireless communications network. Thus, any of the data processing techniques described herein may be performed by one or more computing devices 30 and/or may be performed by a remote data processing server, which may be capable of processing and correlating data from various computing devices 30. An example embodiment of computing system 30 is discussed in more detail below with respect to FIG. 4.

As illustrated in FIG. 2, passive seismic source 40 represents any appropriate passive source of seismic energy. For example, passive source 40 may represent the earth's natural seismic energy. Passive source 40 propagates seismic energy into the subsurface of the earth as seismic signal 42. Seismic signal 42 may represent, for example, a seismic plane wave 42. As seismic signal 42 propagates into the earth, it may encounter various subsurface earth formations 16. The interaction of seismic signal 42 and subsurface earth formation 16 may cause a seismoelectric conversion to take place at an edge and/or boundary 18 of subsurface formation 16. As a result, one or more electromagnetic signals 22 and/or seismic signals 20 may propagate towards the surface of the earth. Electromagnetic signal 22 may be generated as a result of a seismoelectric conversion as seismic signals 20 propagate towards the surface. Electromagnetic sensors 26 may detect electromagnetic signals 22. Seismic sensors 28 may detect seismic signals 20. In some embodiments, seismic sensors 28 may detect seismic signals 40, which may be used as a reference to detect a modulation of signals 20 and/or 22 by subsurface earth formation 16.

Passive seismic source 40 may represent earth's naturally occurring seismic energy. Earth's naturally occurring seismic energy may include a broad spectrum of frequencies, from sub-hertz frequencies to tens of thousands of hertz frequencies, having a broad coverage over the surface of the earth. This broad spectrum allows for a broad range of penetration depths of seismic signal 42 from tens of meters to tens of kilometers. This broad spectrum further may permit detection of subsurface structures with high spatial and depth resolution. The corresponding frequencies of seismic signal 42 in the earth may result from variations in passive source 40 due to various natural events such as Earth quakes, tides, tectonic events, volcano activity, thunder, and atmospheric pressure fluctuations. In some embodiments, passive source 40 of seismic signals 42 may include cultural sources of seismic waves, which may have sufficiently low frequencies to reach and interact with subterranean formation 16. As another example, passive source 40 may include well-drilling activities, pumping fluids, automobile noise, compressor noise, farming noise, and manufacturing noise, which may generate seismic signals 42 of appropriate strength and/or frequency to interact with subterranean formation 16.

FIG. 2 includes several examples of passive seismic source 40, including passive seismic sources 40a-40e. Passive seismic source 40a may represent a source of seismic energy resulting from a drilling operation. Passive seismic source 40a may represent a localized drilling event at a particular depth (such as, for example, the head of a drill bit or drilling apparatus interacting with the subsurface) and/or may represent vibrations from drilling activities along a length of the hole and/or casing. Passive seismic source 40b may represent a source of seismic energy resulting from horizontal drilling activities such as fracturing, hydrofracturing, or other drilling operations. Additionally or alternatively, passive seismic source 40b may represent seismic energy caused by fluid is moving through rock pore spaces (which may be the result of hydrofracturing). Passive seismic sources 40c and 40d may represent sources of seismic energy resulting from the Earth's natural seismic activity and/or a microseismic or other natural event, as described above. Passive seismic source 40b may represent a source of seismic energy resulting from a near-surface or surface event. Accordingly, passive seismic source 40 may include any appropriate source of seismic energy and/or may be located in any appropriate relationship to subsurface earth formation 16, including above, below, beside, or in subsurface earth formation 16. Additionally or alternatively passive seismic source 40 may include seismic energy caused by a drill bit, fracturing rock, fluid moving through rock pore spaces, wells where drilling or pumping activity occurs, and/or by pollutant fluids migrating through the subsurface.

Seismic signal 42 represents a seismic wave, seismic plane wave, or other appropriate seismic signal that propagates into the Earth from passive source 40. Accordingly, seismic signal 42 may emanate from any appropriate passive seismic source 40, including those originating at the Earth's surface and/or located at some appropriate depth below the surface. For example, seismic signals 42a-42e may respectively originate from passive seismic sources 40a-40e. It should be understood that the various signals illustrated in FIGS. 1 and 2 are depicted in different figures for the sake of clarity only. Accordingly, particular embodiments of system 10 may be capable of utilizing signals 20 and/or 22 propagated by passive electromagnetic source 12 and/or passive seismic source 40. Moreover, system 10 may be configured to utilize signals 20 and/or 22 from passive electromagnetic source 12 at particular times while utilizing signals 20 and/or 22 from passive seismic source 40 at particular other times and/or may utilize the signals at the same time. For example, passive electroseismic/seismoelectric surveying utilizing passive seismic sources 40 and/or passive electromagnetic sources 12 may be collected during drilling or fracturing or enhanced oil recovery to acquire information about hydrocarbons and/or other fluids. Survey data from passive electromagnetic sources 12 may be collected, for instance, when passive seismic sources 40 are attenuated. For example, the drilling operation may be paused and/or finished. As another example, computing system 30 may perform passive surveying during drilling, fracturing, and/or enhanced oil recovery to acquire information about hydrocarbons and/or other fluids.

In operation, system 10 detects, stores, and/or analyzes electromagnetic signals 22 and/or seismic signals 20. Sensors 26 and 28 respectively may detect electromagnetic signals 22 and seismic signals 20. Each sensor may transmit the detected signals to computing device 30 for storage and/or processing. Computing device 30 may record the resulting electromagnetic signals 22 and/or seismic signals 20. Computing device 30 may process electromagnetic signals 22 and/or seismic signals 20 to identify various properties associated with subsurface formation 16. Sensors 26 and/or 28 may additionally or alternatively detect signals generated by subsurface earth formation 16 in response to a electromagnetic signal 42 propagated from passive seismic source 40. Computing system 30 may then process detected signals using various signal processing techniques to identify properties and/or features of subsurface earth formation 16. Thus, the techniques discussed in the present disclosure may be utilized to analyze signals 20 and/or 22 generated as a result of passive electromagnetic source 12 and/or passive seismic source 40. Certain examples of the operation of system 10 provided below may be discussed with respect to a passive electromagnetic source 12, but it should be noted that the teachings of the present disclosure apply similarly and/or the same to signals generated by passive seismic source 40.

Certain embodiments of system 10 monitor one or more drilling operations, production enhancement operations (e.g., fracturing), or fluid production operations by processing signals from a set of sensors, including one or more electromagnetic sensors 26 and one or more seismic sensors 28. Sensors may include but are not restricted to: geophones that may detect seismic and/or electromagnetic signals; accelerometers that may or may not include an electromagnetic sensor; a capacitive electric field sensor that may or may not include a seismic accelerometer and or a geophone and or a magnetic field sensor; a coil electromagnetic sensor that may or may not include a geophone or accelerometer for seismic detection and may or may not include a magnetic field sensor; an electromagnetic field antenna that may or may not include a seismic sensor and may or may not include an electric field and/or a magnetic field sensor, said antenna being a dipole antenna, a monopole antenna or other electromagnetic field antenna as well-known to those skilled in the art; a magnetic sensor that may or may not include an electric field sensor and may or may not include a seismic sensor.

Figure 4:
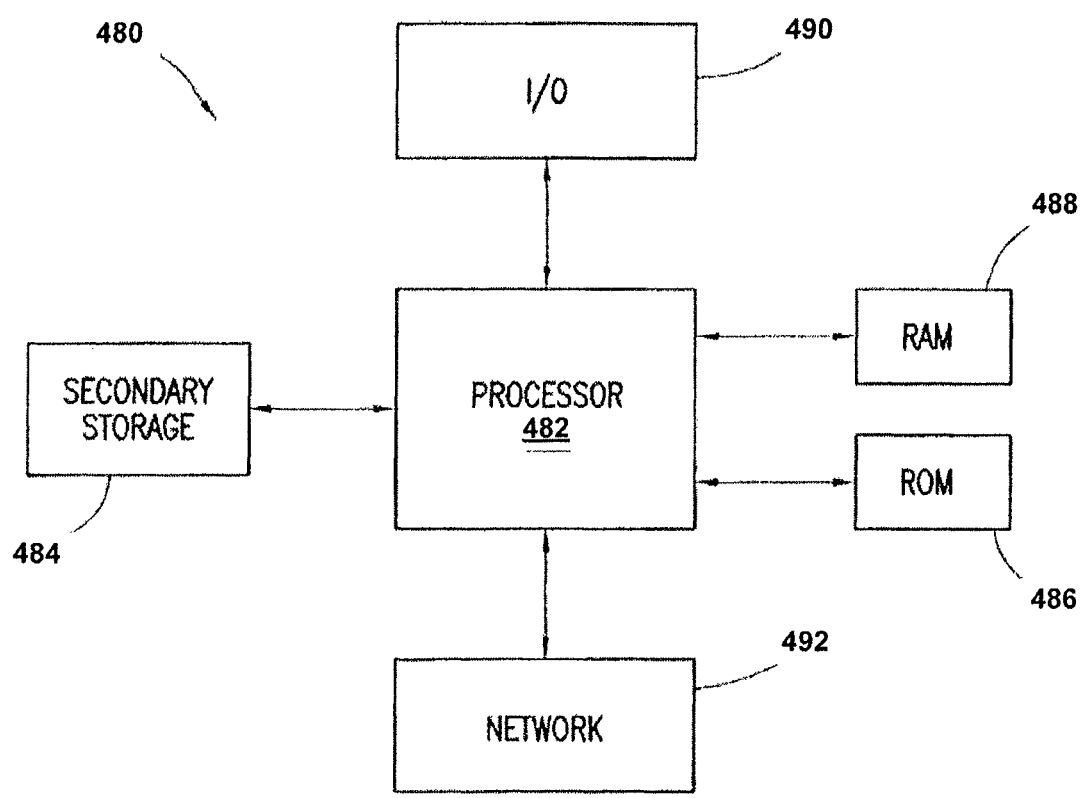
FIG. 4 is a block diagram of a computing system according to the present disclosure.

FIG. 4 illustrates an example computer system 30 suitable for implementing one or more embodiments disclosed herein. The computer system 30 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

It is understood that by programming and/or loading executable instructions onto the computing system 30, at least one of the CPU 482, the RAM 488, and the ROM 486 are changed, transforming the computing system 30 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In some embodiments, computing system 30 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing system 30 to provide the functionality of a number of servers that is not directly bound to the number of computers in the computing system 30. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In some embodiments, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computing system 30, at least portions of the contents of the computer program product to the secondary storage 484, to the ROM 486, to the RAM 488, and/or to other non-volatile memory and volatile memory of the computing system 30. The processor 482 may process the executable instructions and/or data structures in part by directly accessing the computer program product, for example by reading from a CD-ROM disk inserted into a disk drive peripheral of the computing system 30. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computing system 30.

In some contexts, a baseband signal and/or a signal embodied in a carrier wave may be referred to as a transitory signal. In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

Example Electromagnetic Sensors and Sensor Arrangements

Figure 15A:
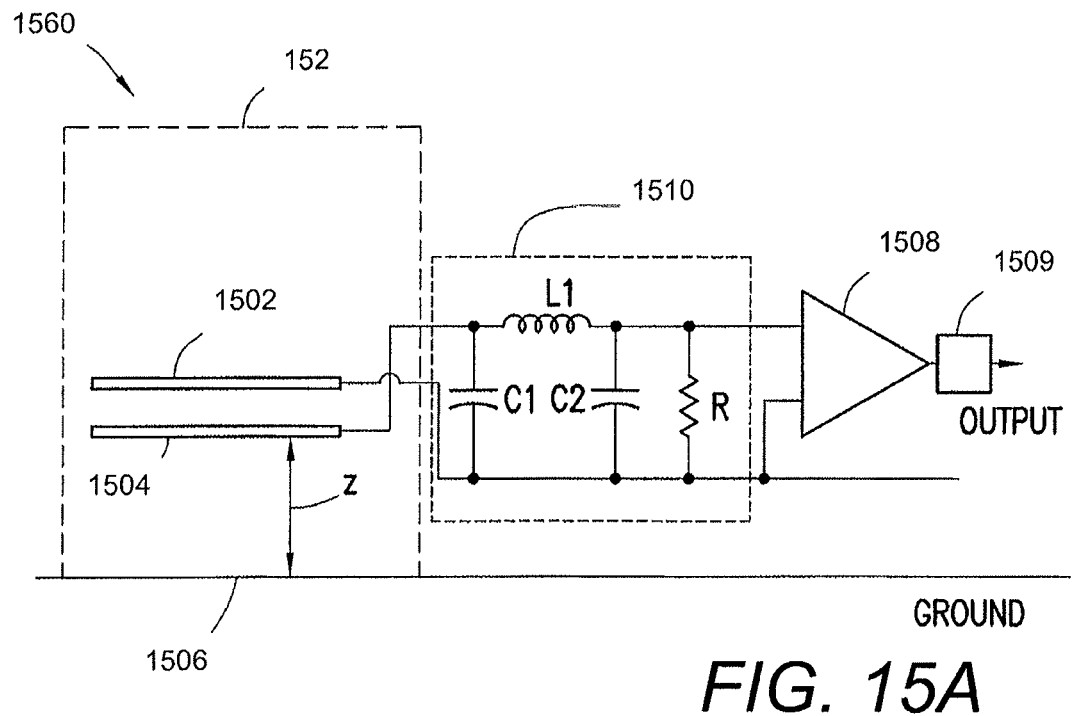
FIGS. 15A, 15B, and 15C are schematic diagrams of sensors according to the present disclosure.
Figure 15B:
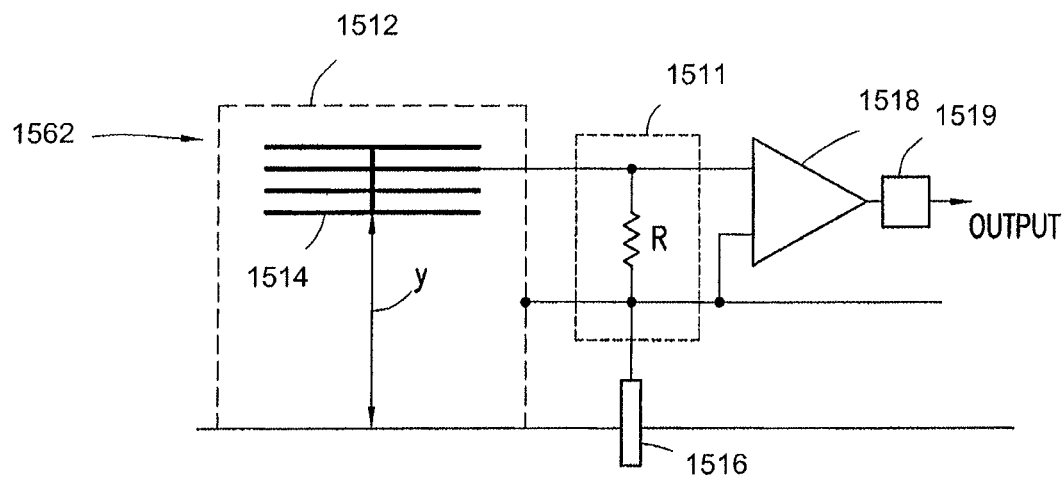
Figure 15C:
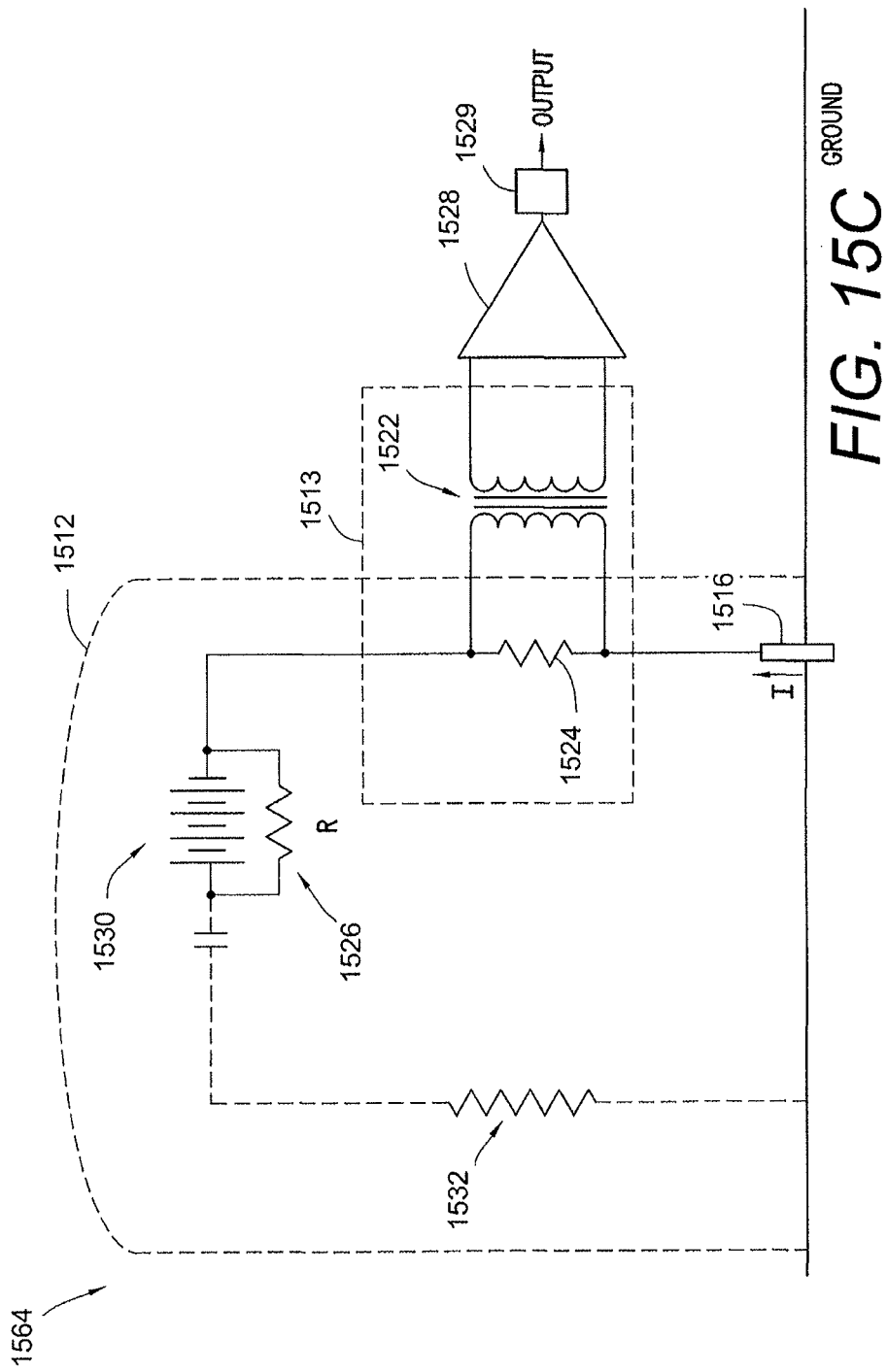

FIGS. 15A, 15B, and 15C are block diagrams illustrating example sensors 26 for passive electroseismic and seismo-electric surveying. As illustrated in the FIG. 15A, sensor 1560 may be a particular embodiment of sensor 26 that includes one or more conductive elements 1502 and 1504, coupling network 1510, amplifier 1508, and signal processing unit 1509. Sensor 1560 may be capable of detecting electroseismic signals 22, as previously discussed above with respect to sensor 26. Sensor 1560 may output a signal representing detected electromagnetic signals 22. Sensor 1560 may be installed and/or disposed in any appropriate housing, including weather-resistant housing, movable vehicles, and/or permanent installations, as is discussed above with respect to sensor 26. Sensor 1560 generally operates by comparing a stable reference voltage to a voltage measurement responsive to electromagnetic signals radiated from the ground. Accordingly, sensor 1560 may be configured to sense variations in the ground signal, which may be wholly or partially comprised of electromagnetic signals 22, as compared to a reference voltage.

Conductive elements 1502 and 1504 are generally capable of measuring electromagnetic signals radiated from the ground. As illustrated conductive element 1502 measures a stable reference voltage, while conductive element 1504 is generally capable of measuring the vertical component of electromagnetic signals 22. Conductive elements 1502, 1504 may represent any appropriate capacitive and/or conductive plates or other sensing elements. As illustrated, conductive elements 1502 and 1504 are capacitive plates that are arranged parallel to the surface of the Earth. A generally parallel arrangement to the surface of the Earth may allow conductive element 1504 to respond to and/or measure the vertical component of electromagnetic signals 22, which may represent a vertical electric field. Similarly, conductive element 1502 may be shielded from and/or configured not to measure the vertical component of electromagnetic signals 22. In some embodiments, conductive elements 1502, 1504 may form a capacitor. Conductive elements 1502, 1504 may be a conductive metal such as copper, aluminum, or stainless steel. Particular embodiments of conductive elements 1502, 1504 may have an area of several square inches to about several square feet. As illustrated, conductive elements 1502, 1504 may be separated from the Earth by a distance x. Distance x may be any appropriate distance in which conductive elements 1502, 1504 may be capable of responding to electromagnetic signals 22 transmitted into the air as a vertical electric field. Conductive elements 1502, 1504 may be configured relatively close to the ground. For example, capacitive plates 1502, 1504 may be separated from the Earth by about 10-12 inches in particular embodiments. It should be noted, however, that while particular distances are discussed as example, any distance may be used in which conductive elements 1502, 1504 are capable of detecting electromagnetic signals 22. Conductive elements 1502, 1504 may each be connected to inputs of amplifier 1508. Conductive element 1502 or conductive element 1504 may also be connected to ground. It should be understood, however, that while a particular embodiment of conductive elements 1502 and 1504 is discussed herein, any appropriate conductive elements may be used. For example, conductive element 1502 may represent a flat conductive plate disposed next to conductive element 1504, which may be an antenna. Appropriate antennas may include flat conductive plates at predetermined and/or fixed distances from the ground, concave conductive plates above the ground, multiple conductive plates with geometry to concentrate the signal, metal screen or grid of wire in any appropriate shape and/or geometry, monopole wire extending upwards from the ground, wire looped around a ferrite or steel core, or any other appropriate structure capable of being used as an antenna. Moreover, conductive elements 1502 and 1504 may represent any appropriate conductive elements arranged with geometry to maximize self-capacitance. Also, while illustrated as two components conductive elements 1502 and 1504 may be implemented as a single component. For example, conductive elements 1502 and 1504 may be implemented using a monopole wire extending upward from the ground and/or a battery arrangement. In some embodiments, conductive elements 1502 and/or 1504 may represent a conductive sphere.

Amplifier 1508 represents any appropriate amplification circuit operable to compare signals generated by capacitive plate 1504 to reference signals generated by capacitive plate 1502. Amplifier 1508 may, for example, represent an operational amplifier. In some embodiments, amplifier 1508 may include any appropriate signal conditioning circuits and/or components. For example, amplifier 1508 may be capable of performing any one or more of the pre-processing and/or processing steps discussed above with respect to FIG. 1. Amplifier 1508 may include appropriate inputs and outputs. As illustrated, capacitive plates 1502, 1504 are connected to the inputs. The output may be connected to computing system 30. For example, amplifier 1508 may be capable of outputting detected electromagnetic signals 22 to computing system 30. Amplifier 1508 may, in some embodiments, include appropriate analog-to-digital converters for digitizing detected electromagnetic signals 22.

Signal processing unit 1509 represents any appropriate combination of hardware, software, and other components operable to process the output of amplifier 1508. For example, signal processing unit 1509 may be capable of implementing any one or more of the pre-processing steps discussed herein. Signal processing unit 1509 may be hardware-implemented portion of sensor 1560 and/or may form a portion of computing system 30. Signal processing unit 1509 may include one or more notch filters, low pass filters, high pass filters, clamping circuits, sample and hold circuits, or any other appropriate signal conditioning circuits.

Coupling network 1510 represents any appropriate network of components operable to couple conductive elements 1502, 1504 to amplifier 1508. As illustrated, coupling network 1510 includes a capacitor C1, inductor L1, capacitor C2 and a resistor R arranged as a pi filter. The pi filter generally is operable to select a desired frequency band for amplifier 1508 and to exclude frequencies that may otherwise saturate amplifier 1508. The resistor may be any appropriate resistance, and in some embodiments may be selected to set the time constant of the input circuitry of electromagnetic signals 22. Resistor R may be connected across the inputs to amplifier 1508 in parallel. Moreover, while a particular embodiment of coupling network 1510 is illustrated, any appropriate network components may be used. For example, coupling network 1510 may include a matching resistor, a pi filter, a transformer, a resonant network, or any combination and number of these components.

Shielding 1512 represents any suitable electromagnetic shielding. Shielding 1512 may be configured to attenuate and/or prevent horizontal components of electromagnetic fields from reaching conducting element 1514. Shielding 1512 may be configured to surround all or a portion of conductive elements 1502 and 1504. For example, as illustrated, shielding 1512 may comprise a structure that surrounds the top and sides of conductive elements 1502 and 1504. Shielding 1512 may, for instance, be a cylindrical structure disposed vertically and that may be closed on at least one end, such as the top end. Alternatively, shielding 1512 may represent a box or other appropriate enclosure. Shielding 1512 may be made of any appropriate material operable to attenuate and/or prevent electromagnetic signals from propagating through the material. For example, shielding 1512 may be made of mu-metal, conductive plates or foil, wire mesh, aluminized Mylar, insulating plates with supplied static charge, and/or conductive plastic. Mu-metal may refer to one or more classes of nickel-iron alloys that are characterized by a high-magnetic permeability. Shielding 1512 may shield against static or slowly varying electromagnetic fields that may otherwise interfere with the detection of electromagnetic signals 22. Shielding 1512 may be electrically connected and/or coupled to an input to amplifier 1508. It should also be understood that in particular embodiments, shielding 1512 may or may not be appropriate and/or necessary.

In operation, electromagnetic signals 22 may be a time varying, vertical electric field. The interaction of electromagnetic signals 22 with capacitive plate 1504 may produce a charge on conductive elements 1504. The other plate 1502 may be shielded from electromagnetic signals 22. Accordingly, signals generate by plate 1502 may be interpreted as the reference voltage. Accordingly, a capacitive charge across conductive elements 1502 and 1504 may result that corresponds to electromagnetic signals 22. In some embodiments, a resistor may be coupled in series with the charged conductive element 1502. At appropriate times, the charged conductive plate 1502 may be discharged and thereby allow a time-varying field representative of electromagnetic signals 22 to be measured, processed, and/or recorded by computing system 30. By using parallel conductive elements 1502, 1504, sensor 1560 may detect only the vertical components of electromagnetic signals 22 or other electromagnetic signals. Accordingly, the parallel plate design may be configured not to respond to the horizontal components of electromagnetic signals 22. While two conductive elements 1502, 1504 are shown, sensor 1560 may include a single plate appropriately grounded through one or more resistive devices and coupled to computing system 30.

FIG. 15B illustrates sensor 1562, which may be a particular embodiment of sensor 26 that includes coupling network 1511, shielding 1512, conductive element 1514, electrode 1516, amplifier 1518, and signal processing unit 1519. Like sensor 1560, sensor 1562 may be capable of detecting electroseismic signals 22, as previously discussed above with respect to sensor 26. Sensor 1560 may also output a signal representing detected electromagnetic signals 22. Sensor 1560 may be installed and/or disposed in any appropriate housing, including weather-resistant housing, movable vehicles, and/or permanent installations, as is discussed above with respect to sensor 26.

Coupling network 1511 represents any appropriate network of components operable to couple conductive elements 1502, 1504 to amplifier 1508. As illustrated, coupling network includes a resistor R of an appropriate resistance, which may be selected to set the time constant of the input circuitry of electromagnetic signals 22. Resistor R may be connected across the inputs to amplifier 1508 in parallel. Moreover, while a particular embodiment of coupling network 1511 is illustrated, any appropriate network components may be used. For example, coupling network 1511 may include a matching resistor, a pi filter, a transformer, a resonant network, or any combination and number of these components.

Shielding 1512 represents any suitable electromagnetic shielding, as discussed above with respect to FIG. 15A. Shielding 1512 may be configured to surround all or a portion of conducting element 1514. For example, as illustrated, shielding 1512 may comprise a structure that surrounds the top and sides of conducting element 1514. Shielding 1512 may be electrically connected and/or coupled to an input to amplifier 1518. As noted above, it should be understood that in particular embodiments, shielding 1512 may or may not be appropriate and/or necessary.

Conductive element 1514 represents any appropriate conductive element operable to generate a stable reference signal shielded from one or more vertical and/or horizontal components of electromagnetic signals 22. Conductive element 1514 may represent a conductive plate. As illustrated, conducting element 1514 is a conductive plate that includes multiple folds that form multiple parallel portions of conductive element 1514. Folding conductive element 1514 into multiple folded portions may allow conductive element 1514 to fit within a much smaller volume while also having a sufficiently large surface area to detect electromagnetic signals 22. Additionally or alternatively, conductive element 1514 may include a conductive spine portion that forms a backbone or connection to multiple conductive fins. Conductive element 1514 may be electrically connected and/or coupled to an input to amplifier 1518. Distance y represents any appropriate distance separating conductive element 1514 from the surface of the Earth. For example, in a particular embodiment, the distance may be about 24 inches. In some embodiments, distance y may be relatively larger than distance z.

Electrode 1516 represents any appropriate electrical component configurable to form a connection with the Earth and/or detect one or more vertical portions of electromagnetic signals 22. Electrode 1516 is configured to form an electrical contact with the Earth and may be disposed within the Earth. For example, electrode 1516 may be disposed in a hole drilled into the Earth ranging from several inches to about 10 feet to about 15 feet. Additionally or alternatively, electrode 1516 may be disposed within the Earth at varying depths as needed to form an electrical coupling with the Earth. In some embodiments, electrode 1516 represents a porous pot electrode. Porous pot electrodes may include an appropriate salt and/or aqueous solution to form an electrical coupling with the Earth. Suitable salts useful with the electrodes may include, but are not limited to, copper sulfate, silver chloride, cadmium chloride, mercury chloride, lead chloride, and any combination thereof. In some embodiments, electrode 1516 may include a conductive electrode such as rods that are driven into the ground and/or sheets of metal, mesh sheets, and/or wires buried in trenches or in shallow pits. Electrode 1516 may be made of a variety of conductive materials including, but not limited to, copper, stainless steel, aluminum, gold, galvanized metal, iron, lead, brass, graphite, steel, alloys thereof, and combinations thereof. Electrode 1516 may be electrically connected and/or coupled to shielding 1512 and an input to amplifier 1518. Electrode 1516 may represent a porous pot, a conductive stake, a buried length of wire, a buried wire mesh, and/or a group of or combination of the aforementioned components.

Amplifier 1518 and signal processing unit 1519 may be similar to amplifier 1508 and signal processing unit 1509. As illustrated, an input to amplifier 1518 is connected to shielding 1512 and another input is connected to conductive element 1514. Coupling network 1511 includes a resistor R connected across the inputs to amplifier 1518. Electrode 1516 is also connected to the input connected to shielding 1512.

In operation, electromagnetic signals 22 may be a time varying, vertical electric field. The interaction of electromagnetic signals 22 with conductive element 1516 may cause and/or induce an electric response to be conducted and/or transmitted to the input to amplifier 1518. Shielding 1512 may attenuate and/or prevent horizontal electromagnetic signals from reaching conductive element 1514. Accordingly, the signals detected by conductive element 1514 may represent a stable reference voltage while the signals detected by conductive element 1516 may represent may correspond to electromagnetic signals 22. Amplifier 1518 may perform appropriate signal processing and output detected electromagnetic signals 22 to computing system 30. By using conductive element 1514 and shielding 1512, sensor 1562 may detect only the vertical components of electromagnetic signals 22. Accordingly, the design of sensor 1562 may be such that sensor 1562 does not respond to horizontal components of electromagnetic signals 22 or other electromagnetic signals.

FIG. 15C illustrates current sensor 1564, which may be a particular embodiment of sensor 26 that includes shielding 1512, electrode 1516, coupling network 1513, resistor 1526, amplifier 1528, signal conditioning unit 1529, and battery 1530. Sensor 1564 may be capable of detecting electroseismic signals 22 may be capable of sensing signals 22 as a current across a sense resistor 1526. Sensor 1560 may also output a signal representing detected electromagnetic signals 22. Sensor 1560 may be installed and/or disposed in any appropriate housing, including weather-resistant housing, movable vehicles, and/or permanent installations, as is discussed above with respect to sensor 26.

Shielding 1512 represents any suitable electromagnetic shielding, as discussed above with respect to FIG. 15A. Shielding 1512 may be configured to surround all or a portion of battery 1530. For example, as illustrated, shielding 1512 may comprise a structure that surrounds the top and sides of battery 1530. Shielding 1512 may be electrically connected and/or coupled to an input to amplifier 1528. In particular embodiments, shielding 1512 may additionally or alternatively surround all or a portion of coupling network 1513. As illustrated, shielding 1512 surrounds sense resistor 1524 of coupling network 1513. As noted above, it should be understood that in particular embodiments, shielding 1512 may or may not be appropriate and/or necessary.

Coupling network 1513 may include any appropriate components operable to couple battery 1530 to amplifier 1518. Coupling network 1513 may include similar components as discussed above with respect to FIGS. 15A and 15B. As illustrated, coupling network 1513 includes current sensor 1522 and sense resistor 1524. Current sensor 1522 represents any appropriate current sensor operable to detect a current I generated by electrode 1516. As illustrated, current sensor 1522 is a current transformer that senses current as a voltage drop across a sense resistor 1524. The current transformer may be a step-up transformer with, for example, up to 1000 times gain or more. Current sensor 1522 may represent any appropriate current sensing technologies, including Hall effect sensors, a senseFET, or other appropriate current sensor.

Battery 1530 represents any appropriate voltage source operable to allow current to flow from ground across sense resistor 1524. Battery 1530 may have a large self-capacitance. Charge may leak from ground and attempt to charge battery 1530. Battery 1530 may have a capacitance and/or resistance between the battery and ground, which may represent the capacitance and/or resistance of air. Electrode 1516 may be connected to a terminal of resistor 1524. Resistor 1524 may be connected between the terminals of current sensor 1522. One terminal of resistor 1524 may be connected to a terminal of battery 1530. Resistor 1526 may be connected in parallel with battery 1530. The outputs of current sensor 1522 may be connected to the inputs of amplifier 1528, which may provide an output representing electromagnetic signals 22. Amplifier 1528 and signal conditioning unit 1529 may be similar to amplifier 1508 and signal processing unit 1509. It should be noted that, in some embodiments, battery 1530 may additionally or alternatively comprise a capacitor. It should also be noted that in some embodiments, a current amplifier may additionally or alternatively perform the functions of current sensor 1522, sense resister 1524, and amplifier 1528.

In operation, variations in ground potential caused by electromagnetic signals 22 and Earth's background electromagnetic field 14 may induce a current I across sense resistor 1524 that may be detected by current sensor 1522. Amplifier 1528 and/or signal conditioning unit 1529 may perform appropriate signal processing and output detected electromagnetic signals 22 to computing system 30.

It should be noted, however, that while FIGS. 15A, 15B, and 15C illustrate particular embodiments of sensors 26, sensors 26 may include any appropriate number and combination of components operable to detect portions of electromagnetic signals 22, such as various antennas or other sensing elements. Suitable antennas may include, but are not limited to, a parallel-plate capacitor antenna comprising two or more parallel conducting plates; a single-plate capacitor antenna comprising one electrode electrically coupled to the earth; a monopole antenna comprising a conducting element, a dipole antenna comprising two conducting elements; a multi-pole antenna comprising a plurality of conducting elements; a directional antenna comprising conducting elements arranged to augment a signal amplitude in a particular direction, and a coil antenna comprising one or more coils of wire, and/or any combination of suitable antennas. In some embodiments, sensor 26 may represent a concentric electric dipole (CED). The CED may include two electrodes in a concentric configuration. For example, the electrodes may be generally circular dipoles with an inner circular electrode disposed concentrically within an outer circular electrode. The electrodes may generally be aligned in a plane that is parallel with the plane of the surface of the earth. The CED may then preferentially detect the vertical portion of electromagnetic signals 22 that are substantially perpendicular to the plane of the CED. The vertical portion of electromagnetic signals 22 may create a detectable potential difference between the two electrodes.

In some embodiments, the electromagnetic sensor 26 may comprise a pair of electrodes in contact with the earth and disposed within the earth. For example, a first electrode may be disposed in a hole drilled into the earth ranging from about 10 feet to about 15 feet. A second electrode may be disposed within about 1 foot to about 3 feet of the surface of the earth, and the pair of electrodes may be electrically coupled. In some embodiments, the pair of electrodes may be disposed within the earth at varying depths as needed to form an electrical coupling with the earth. In some embodiments, the electrodes may take the form of porous pot electrodes or other electrodes, such electrode 1516. In some embodiments, the electrodes may comprise a conductive electrode in contact with the earth and electrically coupled to a porous pot electrode.

Monitoring Drilling Operations

Figure 3A:
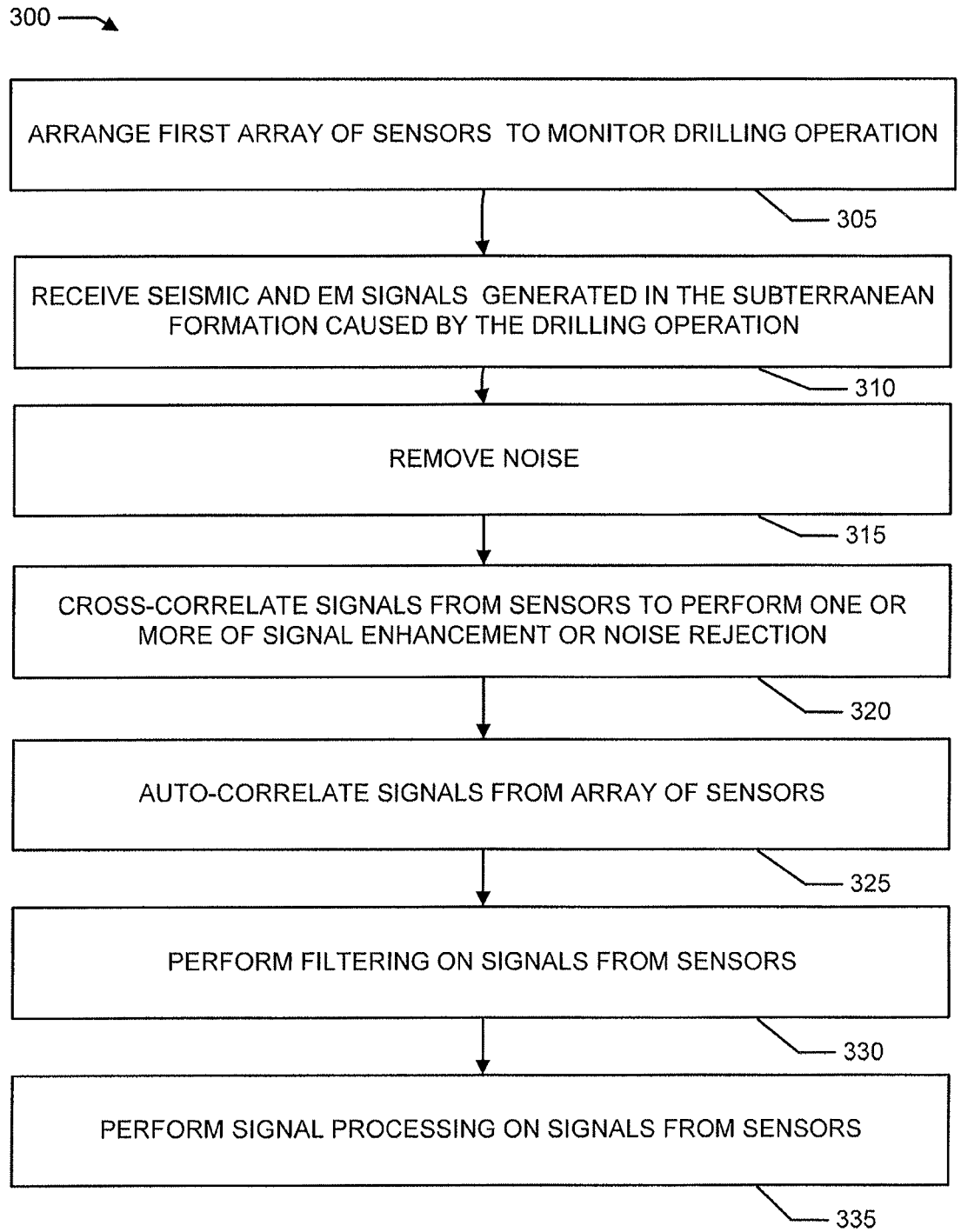
FIGS. 3A and 3B are flow charts of an example method of monitoring drilling operations using techniques of the present disclosure.
Figure 3B:
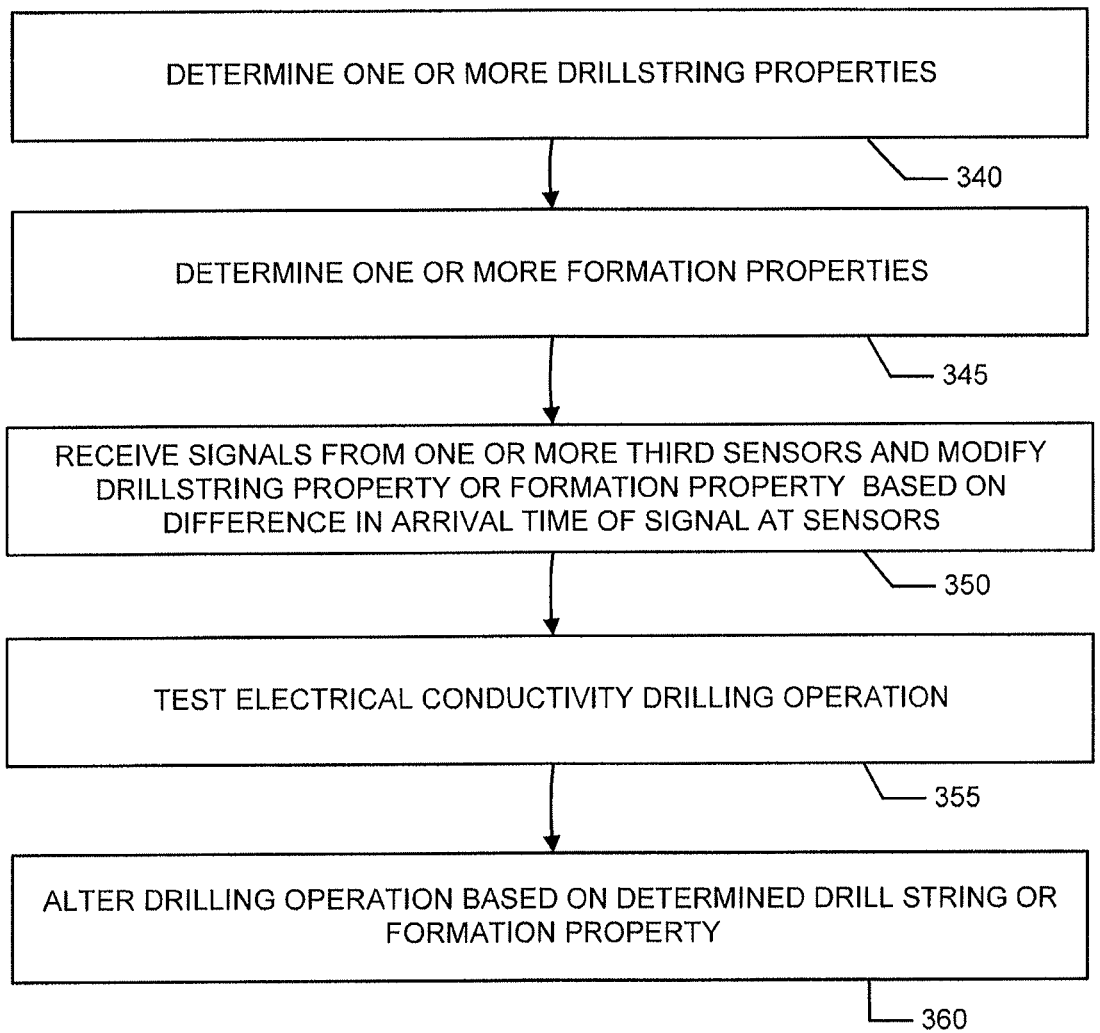

FIGS. 3A and 3B are a flow chart of an example method according to the present disclosure for monitoring and controlling a drilling operation based on electroseismic sensing while performing a drilling operation, which is designated generally by the numeral 300. The method of FIGS. 3A and 3B may, for example, be used to determine the location of the drill bit or other portions of a drillstring in a wellbore at a time. Example implementations may omit one or more of blocks 305-355, while in other implementations additional steps not specifically shown in FIGS. 3A and 3B may be added. Still other implementations may perform one of more of blocks 305-355 in an alternate order from the order shown in FIGS. 3A and 3B.

A wellbore may be a horizontal deviated wellbore, such as the one shown in FIG. 2. In other implementations, the wellbore is vertical or substantially vertical. In still other implementations, the wellbore one or more deviated segments include deviations between vertical and horizontal.

In block 305, a first sensor array, including one or more electromagnetic sensors 26 and one more seismic sensors 28, are arranged to monitor the drilling operation. In some implementations, the array of sensors is located on or near the surface of the earth. In other implementations, one or more of the sensors are placed, at least in part, just beneath the surface of the earth. In still other implementations, one or more of the sensors are located in the borehole. The placement of the first sensor array is discussed in greater detail below with respect to FIGS. 5-12. Example arrays of sensors include one or more seismic sensors and one or more electromagnetic sensors. In certain embodiments, the one or more seismic sensors and one or more electromagnetic sensors may be combined into a single unit. A example single unit includes a geophone.

After the array of sensors are arranged according to the expected drill path, and once drilling operations are under way, in block 310, the first sensor array receive seismic and electromagnetic signals generated in the subterranean formation caused, at least in part, by the drilling operation. In particular, the first sensor array receives electromagnetic signals that are caused by the electroseismic or seismoelectric conversion of the seismic signals generated by the drilling operation. A drill bit generates seismic and electromagnetic noise as it penetrates the earth to form a wellbore. Both the seismic and electromagnetic signals caused by the drilling operation travel to the first sensor array. The electromagnetic noise from the drill bit will travel to the electromagnetic sensors 26 in the first sensor array at the speed of light in the formation. By contrast, the seismic noise from the drill bit will travel to the seismic sensors 28 at the speed of sound in the formation. As will be discussed in greater detail below, the difference in detection time of the seismic and electromagnetic signals caused by the drilling operation is indicative of the location of that drilling operation.

In some implementations, system 10 includes a second sensor array located apart from the first sensor array. The second sensor array may include one or more the electromagnetic sensors 26 and one or more seismic sensors 28. In some implementations, the second sensor array is located distant to the first sensor array, so that the effects of the drilling operation will be minimized in the second sensor array. The second sensor array may be placed apart from the first set of sensor at a distance substantially equal to or greater than a distance corresponding to the depth of the drilling operation. The second sensor array may be used by computing system 30 to, for example, remove background noise from signals received at the first sensor array (block 315). In other implementations, the signals from the second sensor array are used to determine one or more properties of the subsurface formation away from the region where drilling is taking place. In certain example embodiments, this determination of properties of the subsurface formation is further based on signals from the first sensor array.

In some implementations, a seismic sensor 28, placed at substantial distance from the drilling operations, generates a time-dependent signal reflective of the electric field generated in the Earth/air environment. In other implementations, an electromagnetic sensor 26 placed at elevation above the surveyed field detects the electric field in the air, distinct from that emanating from the earth. That time-dependent amplitude can be correlated by computing system 30 with the signals detected over a hydrocarbon field operation to model the subsurface. Alternatively, the time-dependence of the signal from the second set of sensors may be used by computing system 30 to filter the data from the first sensor array to remove the background portion of the signal.

In still other implementations, the second set of sensors are placed near, but still removed from, the first sensor array and used to remove, for example, infrastructure noise. The second set of sensors may be placed between the first set of sensors and the source of infrastructure noise. Alternatively, the second set of sensors may be placed at a location where the infrastructure noise generates any additional signal that interferes with the first set of sensors. In one example implementation, the second set of sensors is located near a road to monitor and record the characteristic noises generated by the road. These characteristic noises of the infrastructure are then removed from the signals detected by the first sensor array by computing system 30.

Returning to FIG. 3, in block 320, computing system 30 may perform one or more cross-correlations of signals from sensors. In certain example embodiments, the cross correlation is performed between sensors in the first sensor array. In certain example embodiments, the cross correlation is performed between sensors in the second sensor array. In certain example embodiments, the cross correlation is performed between sensors in the third sensor array, discussed below. In certain example embodiments, the cross correlation is performed between one sensor in the first sensor array and a second sensor in the second sensor array. In certain example embodiments, the cross correlation is performed between one sensor in the first sensor array and a second sensor in the third sensor array. In certain example embodiments, the cross correlation is performed between two sensors from two of the first sensor array, the second sensor array, and the third sensor array Certain implementations perform a cross correlation between time trace signals from two seismic sensors 28 in the first sensor array to reject noise. This cross-correlation may be used to determine the noise that may be dominated by surface waves. The result of the cross correlation is a measure of surface noise that is of minimal value to determine the behavior of the subsurface formation. In some implementations, the result of this cross-correlation may be removed from the signal from the first sensor array by the computing system 30.

The computing system 30 may further compute one or more cross correlations of signals from the electromagnetic sensors to enhance those signals. In certain implementations, the difference in electrical potential measured between two electromagnetic sensors 26 is proportional to the horizontal electric field, while the potential measured at a single electromagnetic sensor 26 is proportional to the vertical electric field. The horizontal electric field contains information that is characteristic of the source of electromagnetic energy, while the vertical electric field contains information that is characteristic of the signal from the returned electroseismic conversion. Then, if the difference in potential between two electromagnetic sensors 26 is cross-correlated with the sum of the signals from two electromagnetic sensors 26, then the result will be the crosscorrelation between the source signal and the returned electroseismic conversion. This crosscorrelation may suppress both the common noise between electromagnetic sensors 26 and the noise unique to one electromagnetic sensor 26. In some implementations, the resultant crosscorrelation provides the travel time to the target.

Where implementations of system 10 include the first sensor array, the seismic or electromagnetic events that move progressively across the array can be suppressed. These systematic events might be surface seismic waves propagating from great distance or localized sources from infrastructure. Once those systematic surface noises are removed, the noise on all sensors will be more symmetrical in the horizontal plane. The sum and difference of neighboring sensors in the first sensor array will then yield an even larger signal-to-noise ratio that is less directionally dependent.

Returning to FIG. 3, in block 325, computing system 30 performs an autocorrelation of one or more signals from sensors in one or more of the first sensor array, the second sensor array, and the third sensor array. In some implementations, this auto correlation may determine a time to synchronize the seismic sensors 28 in the first sensor array. The drill bit generates seismic noise as it cuts into the subsurface formation. That seismic noise also generates an electromagnetic response through several mechanisms, including by electrokinetic coupling. The generated electromagnetic wave travels to the surface at the speed of light in the formation, which is much faster than the speed of the seismic wave generated by the drill bit. The computing system 30 performs an autocorrelation of the time trace of the signal received at an electromagnetic sensor 26 in the first sensor array to determine a time lag between the arrival of the electromagnetic signal and the subsequent arrival of the seismic response associated with the same drilling event below the surface. The autocorrelation may be performed on any sensor sensitive to the source and the return signal. For example, a geophone detects both electromagnetic and seismic energy. An autocorrelation on a geophone may detect the initial source EM signal and the subsequent return of the seismic wave. Example embodiments include one or more capacitive sensors that, in turn, include an accelerometer. A capacitive sensor that also contains an accelerometer can detect the source and the return signals on both the capacitive sensor and the accelerometer.

When the computing system 30 then applies the autocorrelation operation to each time trace generated by each seismic sensor 28 or electromagnetic sensor 26 in the first sensor array, the resultant time traces have the properties of conventional active-source seismic signals. That is, the source electromagnetic signal in electroseismic surveying sets the time for the start of a signal recording in the same manner as a seismic source is synchronized with an array of geophones in conventional seismic surveying to set the start of the source signal. The autocorrelation of the electroseismic signal then has all the properties of a single seismic time trace. Example embodiments feature the simultaneous processing of the electromagnetic and seismic portion of the electroseismic and/or seismoelectric signals. The measured electric field is used as the reference for the subsequent arrival of a seismic wave.

The resulting pseudo-seismic time traces generated, at each electroseismic detector can be processed by all the methods known to those skilled in the art of seismic processing. Such signal processing might include one or more of velocity filtering, dip filtering, common-source-point stacking, static corrections, and migration to determine the true location of a source.

Returning to FIG. 3, in block 330, in certain implementations the computing system 30 applies one or more filters to the signals from one or more of the first sensor array, the second sensor array, and the third sensors array. In certain example embodiments, the computing system 30 applies one or more velocity filters. In certain example embodiments, the computing system 30 applies one or more spatial filters.

Certain example velocity filters are performed in the f-k domain. The f-k domain is a plot of the frequency (f) versus wavenumber (k). The wavenumber is the reciprocal of the spatial wavelength. The frequency is reciprocal of the arrival time at a seismic sensor 28 or electromagnetic sensor 26. So a plot in f-k domain displays constant velocities as straight lines.

Example spatial filter make use of the symmetry around the center line of the lines of constant electromagnetic field, for example as shown in FIGS. 5-12. Example spatial filters make use of the vertical or horizontal components of the electric field and seismic polarization that reverse sign on opposite sides of the center line. In certain example embodiments, the vertical or horizontal components of the electric field and seismic polarization are to stack data from multiple electromagnetic sensor 26 or multiple seismic sensors 28. The difference in arrival time of the seismic signal as a function of distance from the center line can be used to determine downhole properties, such as the location of the drill bit or the location of the borehole. The difference in arrival time of the seismic signal as a function of distance from the center line, along with the arrival time of a seismic sensor 28 that is located directly over the well may be used to determine the a three-dimensional location of the drill bit or formation property.

Example spatial filter may be used in certain example embodiments to distinguish between fractures propagating in the horizontal or vertical directions when those fractures create predominantly horizontal or vertical dipolar structures.

In certain example embodiments the electromagnetic signal, directly propagating from the well source, arrives at electromagnetic sensors 26 in the sensor arrays at the same time. The seismic signal form the well source is received by the seismic sensors 28 at times related to the distance from the center line. Filtering can be performed based on the difference in arrival time between the electromagnetic and seismic signals. To the extent that there are paired electromagnetic sensors 26 and seismic sensors 28 at the same location (for example, a geophone), then each set of paired detectors has its own time mark at zero time, based on the arrival time of the electromagnetic signal at the electromagnetic sensors 26. Such a detector with paired electromagnetic sensors 26 and seismic sensors 28 does not need to be synchronized with the other detectors in order to detect the "moveout" progression in arrival times. In certain example embodiments, each paired electromagnetic sensors 26 and seismic sensors 28 is used to produce an autocorrelation. The coputing system 30 may determine a systematic moveout, based, at least in part, on the autocorrelation lag shifts between paired electromagnetic sensors 26 and seismic sensors 28. In certain example embodiments, the peak in the autocorrelation corresponds to the arrival of the drill bit. This peak in the autocorrelation will arrive at longer lags for electromagnetic sensors 26 and seismic sensors 28 placed further from the center line.

In certain example embodiments the computing system 30 stacks the detector signals from electromagnetic sensors 26 and seismic sensors 28 directly. In certain example embodiments, after such stacking, the only remaining signal is the arrival of the electromagnetic pulse from depth. In certain example embodiments, the amplitude of this pulse from depth is a measure of the electrical resistivity of the formation.

As discussed above, the signal generated by the drill bit has both seismic and electromagnetic components. The electromagnetic components travel to the earth's surface at the speed of light. That speed is much greater than the speed of travel for a seismic wave. Depending on the distance between the sensors in the first sensor array, the electromagnetic modulation caused by the drill bit penetrating the earth will appear at the electromagnetic sensors 26 in the first sensor array at approximately the same time. Adding the autocorrelated time traces from the electromagnetic sensors 26 in the first sensor array emphasizes the signals arriving simultaneously. The assumption that electromagnetic events arrive substantially simultaneously is equivalent to saying that the electromagnetic modulation has near infinite velocity, which is much larger than the velocity of seismic events. The sum of all recorded electromagnetic signals then discriminates against seismic events that do not arrive simultaneously at all detectors.

In certain implementations, detection of seismic arrivals is further refined by applying a filter to the observed seismic wave (block 330). In certain example embodiments, the filter is a velocity-specific filter. For example, seismic waves traveling on the earth's surface have particularly slow velocities. A surface seismic wave manifests as a signal systematically crossing the array of detectors with relatively large time delays between the arrivals of surface waves at detectors. Two types of surface waves with different velocities are Rayleigh waves and Love waves. Another type of near-surface wave is the so called Lamb waves. These waves travel in the subsurface, propagating parallel to the surface, in a depth of about 30 meters. Such waves are compressional waves, p-waves, which are guided by large seismic impedance contrasts near the Earth's surface. Such waves are often detected after an earthquake. These waves travel at a velocity faster than Rayleigh waves but slower than bulk seismic waves. Seismic waves traveling in the bulk of the earth, "body waves," have higher velocities. Such waves will arrive at the seismic detectors 26 with systematic time shifts that are smaller than the times shifts associated with surface waves and Lamb waves. Two types of body waves are the so called p-waves or compressional waves and the so called s-waves or shear waves.

In certain implementations, seismic signals traveling at different velocities are separated by applying a "dip" filter. This filter is applied in the frequency/wavenumber domain. The frequency/wavenumber domain applies to the seismic sensors 26. The wavenumber is proportional to the reciprocal of the spacing between detectors on the array. It is further known that surface and body seismic waves have certain characteristic velocities specific to each geological environment. Knowledge of these velocities is used to define velocities that will preferentially distinguish between waves traveling on the surface from those traveling in the subsurface. For example, the velocity filters at infinite velocity for the EM waves, at Rayleigh and Love velocities for surface waves, at Lamb velocities for near-surface waves, and at p-wave and s-wave velocities for the body waves, and the filter thereby effectively isolates the various types of waves.

Returning to FIG. 3, in block 335, in certain implementations the computing system 30 performs signal processing on signals from one or more of the first sensor array, the second sensor array, and the third sensor array.

In one example embodiments, the computing system performs common-source-point processing. "Common-source-point" refers to the relevant signals that originate at the drill bit and then travel to seismic sensors 28. Here, the geometry of the expected signal from the drill bit is illustrated in FIGS. 5-8. Certain example signals also include spherically symmetric components. The signals detected by the first array can therefore be processed as vertical and horizontal components of the seismic response to yield the depth and horizontal location of the drill bit.

Figure 5:
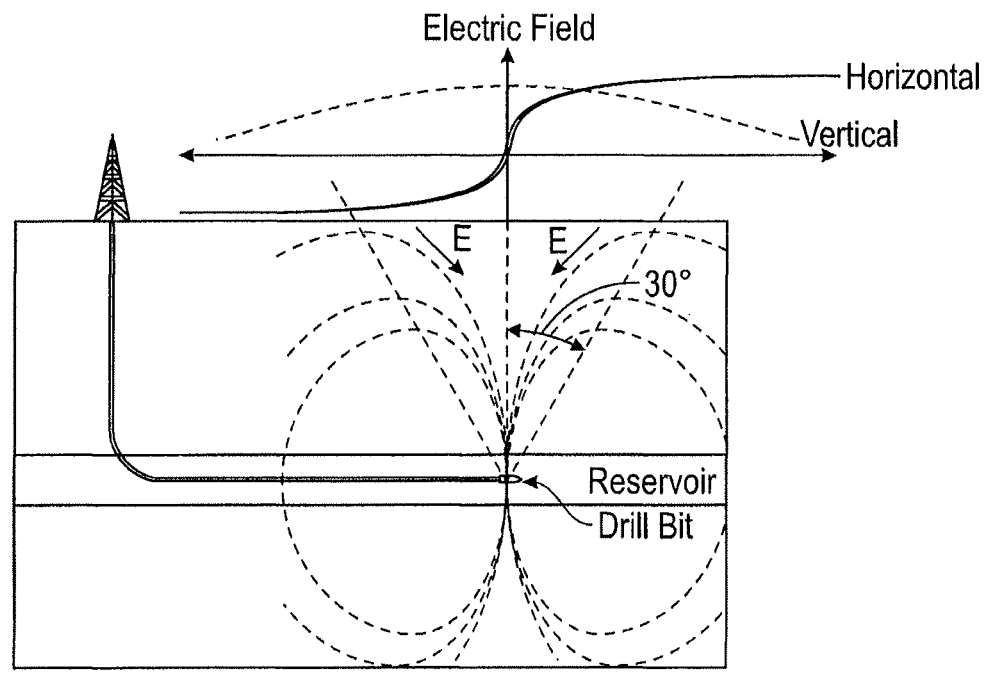
FIG. 5 is a cross-sectional view of an example well and reservoir.

For example, FIG. 5 shows that the vertical component of the seismic response changes sign on opposite sides of the symmetry point, which, in this case is the location of the drill bit. The separation between the maximum amplitudes on the two sides of the symmetry point is equal to the depth of the drill bit. The point of zero crossing locates the horizontal position of the drill bit.

Processing the autocorrelation time traces provides the needed information. After velocity filtering and retaining the vertical displacement signal, the seismic arrival times and amplitudes at each detector are determined. A plot of amplitude-versus-horizontal distance determines the point of zero amplitude in both the x and y horizontal directions. In FIG. 5, Z is the vertical coordinate. The signals from sensors that are symmetrically located on opposite sides of this zero amplitude location are then summed to suppress noise. The result is a curve passing through zero at the origin and displaying a maximum at a distance equal to one half of the depth of the drill bit. Such curves are shown at the top of FIG. 5.

Figure 7:
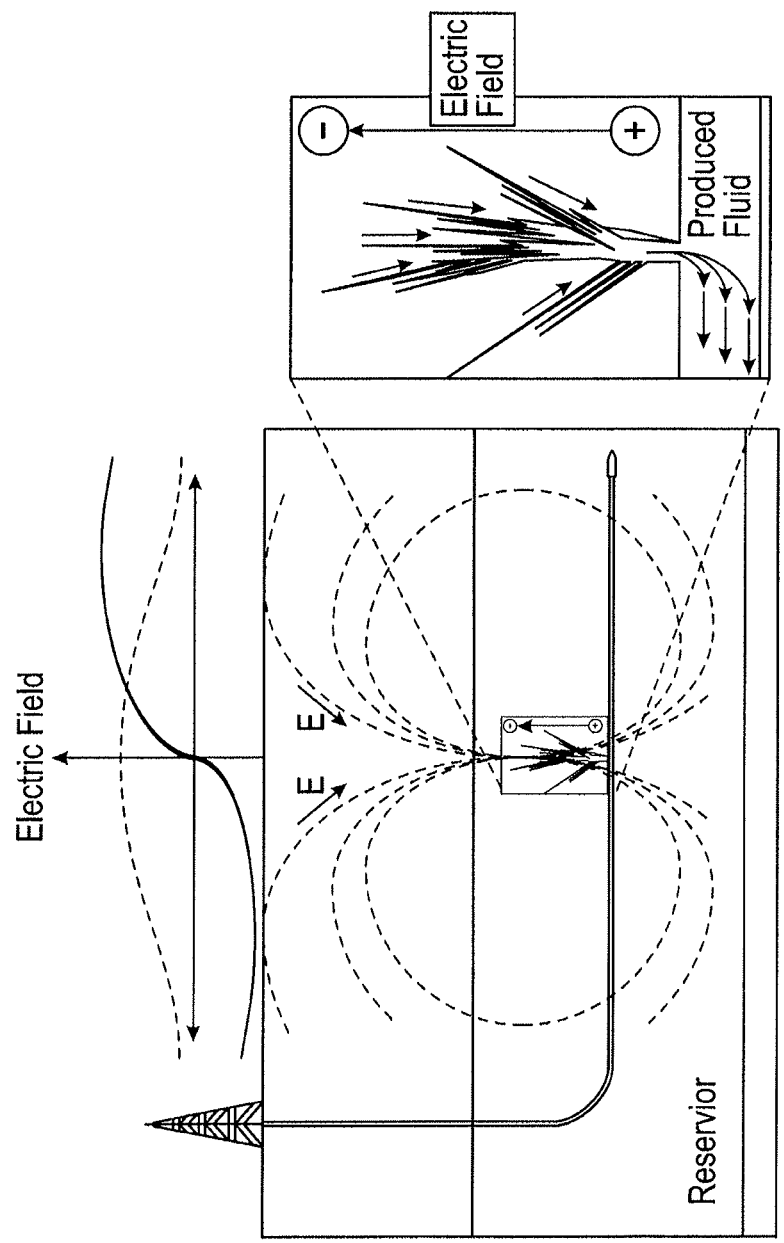
FIGS. 7 and 8 are cross-sectional views in a plane containing a well in a reservoir and the resulting electric field.
Figure 8:
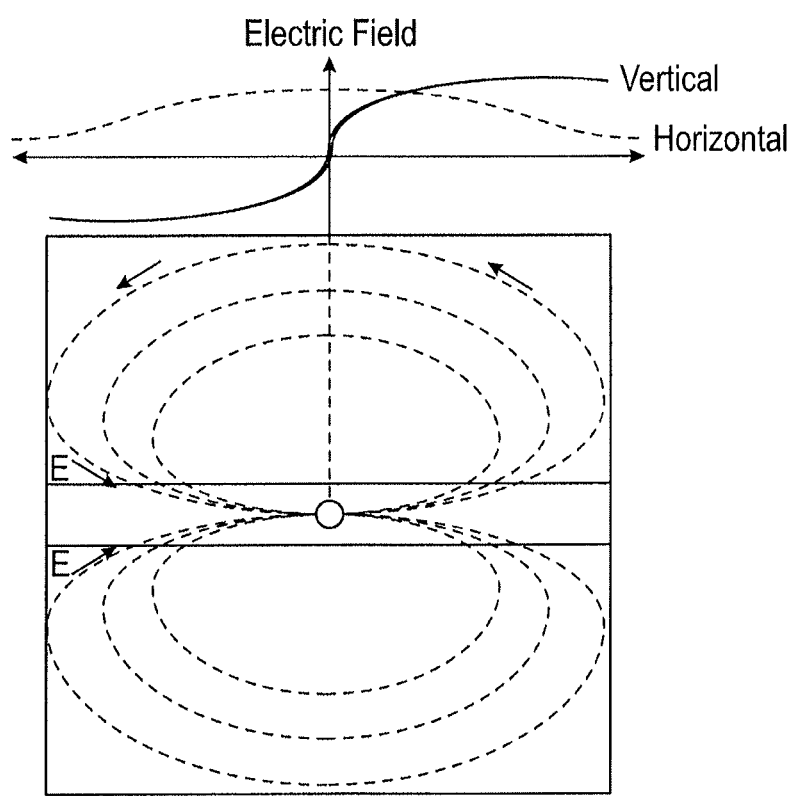

This geometrical calculation can be repeated for the horizontal component of the seismic wave. As shown in FIG. 8, the horizontal component of the seismic wave passes through zero above the location of the drill bit and the distance between the maxima is approximately equal to the depth. In one implementation, the horizontal amplitude of the seismic response is measured directly using a three component seismic sensor 28. In another implementation the horizontal amplitude of the seismic response is measured by computing the difference between the amplitudes detected on neighboring electromagnetic sensors 26. Similar processing can be applied to spherically symmetric components as illustrated in FIGS. 7 and 8, as discussed below.

Other example embodiments perform one or more other types of signal processing at block 335. For example, signal processing of block 335 may include seismic processing may include time series analysis by Fourier methods that include one or more of auto and cross correlation, convolution and deconvolution, Wiener filtering, multi-spectral analysis, and Hilbert transforms.

Other example signal processing method may be used in the time series analysis are also applied to the data collected from one or more sensors of one or more of the first sensor array, the second sensor array, and the third sensor array. In certain example embodiments, one or more of the first sensor array, the second sensor array, and the third sensor array include a two-dimensional array of geophones or accelerometers. In certain example embodiments featuring such an arrangement of sensors, two-dimensional Fourier transforms and velocity filtering may be performed.

In certain example embodiments, arrays of seismic sensors 26 are employed to stack data in various ways to enhance particular signal properties. In certain example embodiments, For example, processing might be done to add signals from one or more of the first sensor array, the second sensor array, and the third sensors that come from a particular location between source and receiver, such as midway between source and receivers. This may be referred to as common midpoint stacking processing (CMP). In other example embodiments, signal processing includes one or more of stacking with regard to a common source (CSP), a common receiver location (CRP), with respect to a fixed depth, or common depth point stacking (CDP).

Seismic signals arrive at the various seismic sensors 28 in one or more of the first sensor array, the second sensor array, or the third sensor array at different times. This difference in time between the arrival of seismic signals may be referred to as "moveout." Example signal processing methods such as f-k filtering and moveout time-shift corrections are used for this purpose. In certain example embodiments, certain seismic velocities are observed. These seismic velocities may include one or more of the velocity between two adjacent subterranean layers, the interval velocity, the effective velocity for a wave traveling outward to successive receivers, the moveout velocity, and the velocity used after all velocity corrections are used, which may be referred to as the stacking velocity. Additionally, surface seismic waves include Rayleigh and Love waves to designate the wave polarization. These waves travel slowly compared to bulk waves. Analysis of signals from one or more of the first sensor array, the second sensor array, and the third sensor array may be used to separate the arrival times for surface waves relative to bulk waves. In other example embodiments, sensor arrays that includes one or more accelerometers or geophones that measure three orthogonal components of vibration, may separate surface waves from bulk shear and compressional waves based on a wave's polarization and velocity.

When multiple seismic waves arrive at multiple detectors, the non-linear nature of the propagation path might lead to an inaccurate location of a structure in the subsurface. In certain example embodiments, the signal processing (block 335) includes migration to attempt to correct for this non-linear propogation.

Example processing methods that may be performed at block 335 rely on the wave nature of a seismic wave. Seismic waves are reflected, transmitted, and refracted by the well-known Snell's laws. Waveform processing differs from much of electroseismic processing in that the wavelengths in the electromagnetic portion of an electroseismic signal is much larger than any structures of interest. In this case it may be appropriate to think of the electroseismic propagation problem in a low-frequency limit where there are no well-defined interface reflections.

Based on the signal received from one or more of the first sensor array, the second sensor array, and the third sensor array, and subsequent processing, as described above with respect to blocks 315-335, the computer system 30 determines one or more drillstring properties. One example drillstring property is the location of the drill bit. In certain example embodiments the location of the drill bit relative to a location at the surface or to a location within the subsurface formation. Other example drillstring properties include flexing or corkscrewing of drill pipe. In certain example embodiments, the computer system 30 monitors the changes in drillstring properties over time. Changes in the drillstring properties over time may indicate whether or not drillstring components are functioning properly, or not. For example, change in drillstring properties over time may indicate that a portion of the drillstring has failed.

Based on the signal received from one or more of the first sensor array, the second sensor array, and the third sensor array, and subsequent processing, as described above with respect to blocks 315-335, the computer system 30 determines one or more formation properties (block 340). These formation properties may include one or more formation properties above, below, or in front of the drill bit. One example formation property is the presence of fluids in the subsurface formation. Another example formation property is the presence of a fault in the subsurface formation. Another example formation property is a location of a change in formation layers. Other example formation properties include one or more of the hardness of the rock in the subsurface formation and the permeability or porosity of the subsurface formation. Other example formation properties include the proe pressure of the formation.

In certain example embodiments, the computing system 30 determines the location of the drill bit in the formation based, at least in part, on the one or both of the first, second, and third arrays of sensors and the results of one or more of blocks 325-335. For example, during directional drilling the commuting system 30 may initially determine the location of the drill bit based on one or more surveys performed before the drilling operation and based on signals from one or more survey sensors located along the drill path. In certain embodiments, the computing system 30 modifies the calculated drill bit location based, at least in part, on the signals from one or both of the first and second sensor array or the results of one or more of blocks 325-335.

In certain example embodiments, the computing system 30 images the formation above, below, or beside the drill bit based, at least in part, on the signals from one or more of the first sensor array and second sensor array and the results of one or more of blocks 325-335.

In certain example embodiments, the computing system 30 identifies the locations of fluids, such as hydrocarbons, Helium, carbon dioxide, or water, in the formation based, at least in part, on the or more of signals from one or more of the first sensor array and second sensor array and the results of one or more of blocks 325-335.

In certain example embodiments, the computing system 30 identifies the locations of faults based, at least in part, on signals from one or more of the first sensor array and second sensor array and the results of one or more of blocks 325-335. The identification of the location of these faults may then be used to alter the drill path or otherwise alter the drilling operation. In still other implementations, the computing system 30 determines where to initiate a completion or well enhancement procedure, such as a fracturing stage based, at least in part, on the signals from one or both of the first sensor array and second sensor array and the results of one or more of blocks 325-335.

In certain example embodiments, the computing system 30 monitors the progress of an enhanced oil recovery operation based, at least in part, on the signals from one or both of the first sensor array and second sensor array and the results of one or more of blocks 325-335.

In certain example embodiments, the computing system 30 monitors other wells operations based, at least in part, on the signals from one or both of the first sensor array and second sensor array and the results of one or more of blocks 325-335.

In certain example embodiments, the computing system 30 performs quality control by identify fractures or damage created by well operations operation based, at least in part, on the signals from one or both of the first sensor array and second sensor array and the results of one or more of blocks 325-335.

In certain example embodiments, the determination of one or more formation properties includes determining an image of the subsurface formation above, in front of, behind, or below the drill bit.

In still other example implementations, the computer system 30 determines one or more properties of an adjacent or distant well in the subsurface formation. This may include the path of the adjacent or distant well in the subsurface formation. Other example embodiments may determine one or more properties of the subsurface formation around the adjacent or distant well, such as the presence, location, or amount of one or more fluids, such as hydrocarbons, Helium, carbon dioxide, or water, in the formation around the adjacent or distant well based, at least in part, on the signals from one or more of the first sensor array and second sensor array and the results of one or more of blocks 325-335.

In block 350, the computing system 30 may receive signals from a set of one or more third sensors. In certain example embodiments the signals from the third sensor array include electromagnetic signals, which may be cause by the electroseismic or seismoelectric conversion of seismic signals caused by the drilling operation. In some example implementations, at block 350 the computing system 30 determines or updates one or more of a drillstring property and a formation property based, at least in part, on the one or both of the first, second, and third arrays of sensors and the results of one or more of blocks 325-335. In one example embodiment, the computing system updates one or more drillstring properties or formation properties based on a difference in time between electromagnetic signals received at one or more of the first sensors array, the second sensor array, and the third sensor array.

In block 355, in certain example embodiments the computing system 30 further tests the electrical conductivity during the drilling operation. In general, the electrical conductivity is another way to detect changes in fluid content and lithology. In certain implementations, the electrical conductivity is correlated with a seismic response of one more seismic sensors 28 in the first sensor array. In one example implementation, in combination with an electroseismic survey during drilling, an electrical voltage is applied between the well and a distant electrode. In certain example implementations, one electrical contact is made to one or more of the well head, the drillpipe, and the drill bit. A second electrode may be located such that a current is created through a region of interest. The second electrode may be located at a second position on the drilling equipment, and/or on a neighboring well casing or drilling equipment, and/or on infrastructure such as pipes and/or fences, and/or the second electrode may be an electrode placed on the surface of the Earth. In certain example embodiments, the surface electrode is located between approximately 10 feet and 20,000 feet from the well location. One or more electroseismic sensors 26 in the first sensor array are configured to detect an electrical voltage contemporaneously with and/or at a time different from the seismic data collection. Alternatively, the electromagnetic sensor may be separate from the seismic sensor 26. When the drill bit encounters a region of high electrical conductivity, such as a water pocket, the resistivity will decrease along with the electroseismic response in the electroseismic sensors 26 in the first sensor array. The combined effect favors the change in fluid conductivity.

In block 360, the computing system 30 alters the drilling operation based on the determined drill bit location from the previous steps. In some example implementations, the computing system 30 causes the change in weight-on-bit of the drilling. In other implementations, the computing system 30 actives a mud motor in the drillstring to alter the direction of the drillstring. In still other implementations, the computing system 30 causes the drillstring to come off bottoms and trip to a location. In other example embodiment the computing system 30 alters the rate of penetration of the drilling operation.

The placement of the first sensor array will be discussed with respect to FIGS. 5-12. FIG. 5 is a cross-section view in a plane containing a well 505 with both vertical and horizontal sections. The drill bit 510 is in a horizontal portion of the wellbore 505 within reservoir 515. As the drill bit 510 drills in the subsurface formation, the acoustic noise from a drill bit 515 generates seismic and electromagnetic noise. In one implementation, the noise may take the form of dipolar radiation. In certain implementations, these noise signals travel to the surface in such a way that the symmetries of the noise signals, as received at the surface, determine the depth of the drill bit 515. In FIG. 5, the maximum horizontal electric field and seismic amplitudes occur at 30 degrees from the head of drill bit 515, as shown. In this implementation, the distance between maxima is equal to the depth. The difference between the signals recorded at +/−30 degrees is the sum of the maximum amplitudes and removes common signals from both detectors. The depth of the drill bit 515 can also be determined based on the travel time of the seismic signal to the surface. The seismic travel time increases with offset, i.e., with distance from the center line over the drill bit. Although the wellbore 505 of FIG. 5 has a horizontal section, other wellbores 505 will be vertical or substantially vertical. Still other wellbores 505 will include one or more deviated sections with deviations between vertical and horizontal.

Figure 6:
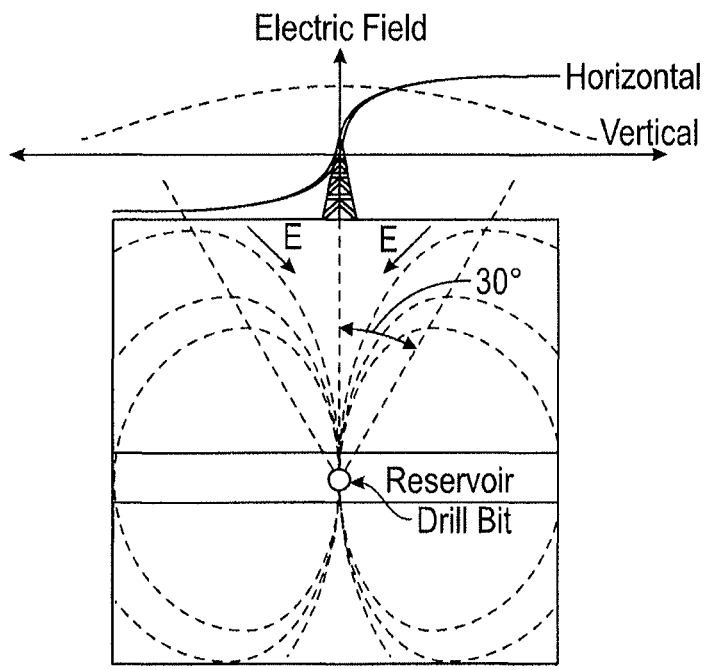
FIG. 6 is a cross-sectional view of an example well and reservoir where the plane-of-view is perpendicular to that of FIG. 5.

FIG. 6 is a cross-section view in a plane containing a well 505 where the plane of view is perpendicular to the plane of FIG. 5. Note that the electric field and seismic amplitudes exhibit an identical behavior as in FIG. 5. The first sensor array can therefore be arranged to capture a three-dimensional image of a point source of seismic or electromagnetic noise. The third dimension location of the drill bit 510 is determined by symmetrically placed sensors in a plane perpendicular to the horizontal well. These geometrical relationships apply to any acoustic/seismic dipolar disturbance generated at a point in the subsurface, for a "point" with a radius smaller than the first seismic Fresnel zone of a seismic wave at the measured frequency and depth.

Example arrangements of sensors take many forms, including, for example, arrays on a rectangular grid and other arrangements that are commonly used in seismic imaging. Additionally, an array may be formed by linear arrangements of sensors parallel and/or perpendicular and/or at an angle to the path of the drilling operation. Additionally, sensors may be placed at random locations of known position.

FIG. 7 is a cross-section view in a plane containing a well 505 that has been drilled into reservoir 515 and fractures 705 have been induced in the reservoir 515. The top of FIG. 7 illustrates the electric field caused by fluid flowing out of fracture 705 and through a production casing. In certain implementations, fluid flowing out of a fracture 705 creates a streaming potential by electrokinetic coupling. In the case of fracture generation, the seismic and electrical amplitudes are expected to be substantially larger than amplitudes generated by the flow of fluid in production. In the fracturing process, fluid flows into the reservoir 515 to form fracture 705. The fracture generation process results in substantial energy being applied to the reservoir 515 to fracture the rock. This applied energy creates both a seismic and electroseismic response that can be detected by the array of sensors.

The situations described in FIGS. 5-7 assume vertical mechanical or fluid motion, which is equivalent to a vertical dipole source. The drill bit 510, however, also has horizontal motion similar to the vertical motion. Likewise, the fracture 705 has horizontal amplitudes that may as large as, or larger than, the vertical displacement of the fracture 705. This might occur because the expansion of a fracture in the direction of minimum stress generates more rock movement, a larger volume of rock movement, than does the vertical propagation of a fracture 705. This is also the case in fluid flow in fractures that connect subterranean structures with extensive horizontal branches.

A mechanical disturbance with horizontal and vertical components can be split into orthogonal horizontal and vertical polarizations, if it is not spherically symmetrical. Equivalently, in certain example implementations the signal can be separated into horizontal and vertical dipoles.

As shown in FIG. 8, for horizontal polarizations, the signal geometry is the same as for the vertical polarization; however, the signal geometric signatures are reversed. For horizontal source polarizations, the vertical components of the electric field and seismic amplitude on the surface flip signs on opposite sides of the symmetry line or point. The horizontal components of the electromagnetic and seismic signals at the surface are continuous with a maximum at the symmetry point. The time of arrival of a seismic response, combined with the signal geometry, define the location of the drill bit 510 for either or both polarizations.

In certain implementations, changes of sign on opposite sides of the symmetry point can be measured, as shown in FIGS. 6-8. The geometrical properties of the signal can therefore be determined by deploying an array of sensors on the surface. These sensors may include one or more electric-field sensors, magnetic-field sensors, one-component seismic sensors, two-component seismic sensors, or three component seismic sensors.

Figure 9:
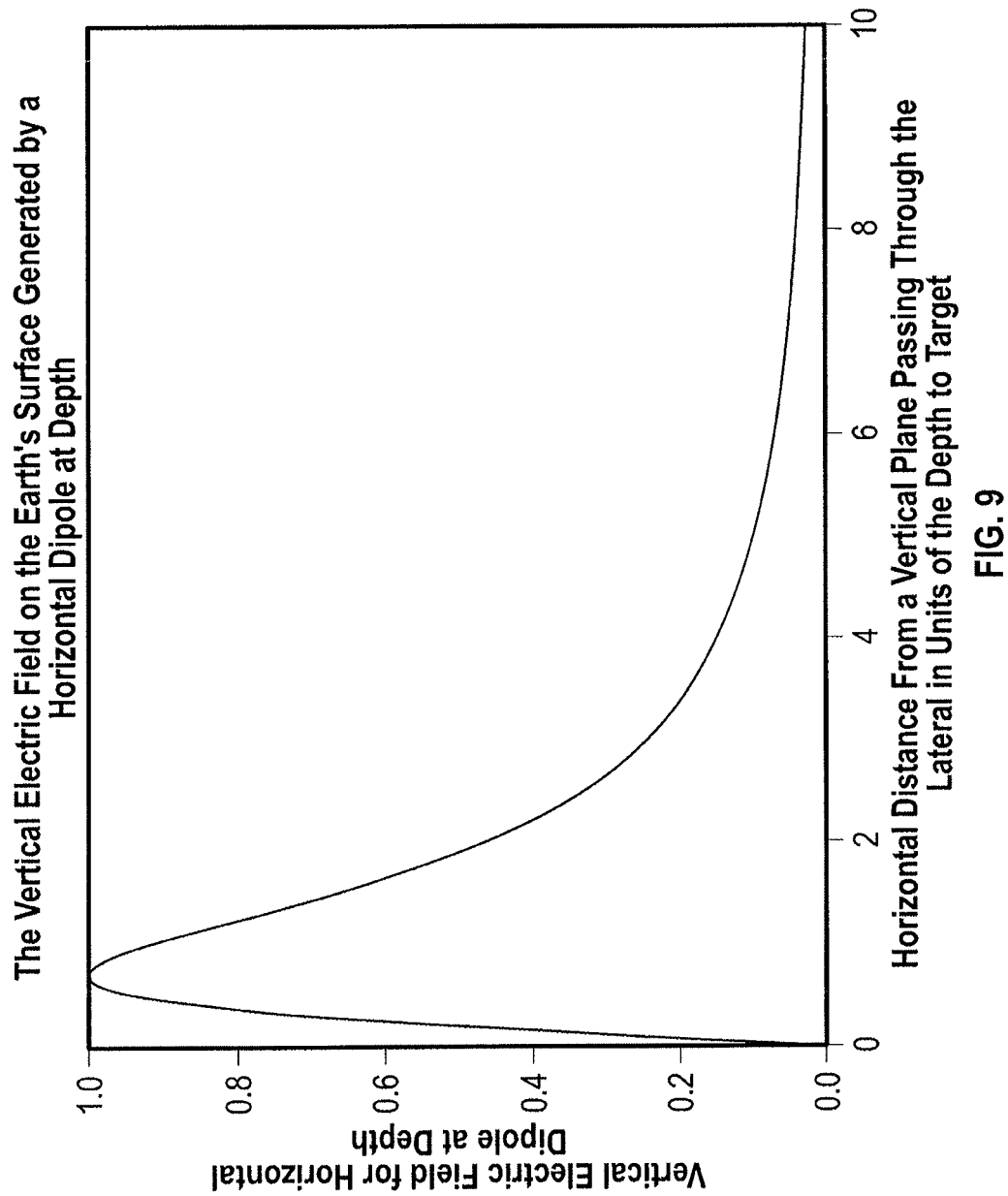
FIGS. 9 and 10 are graphs charting the vertical electric field for a horizontal dipole at depth versus horizontal distance from a vertical plane passing though the lateral.
Figure 10:
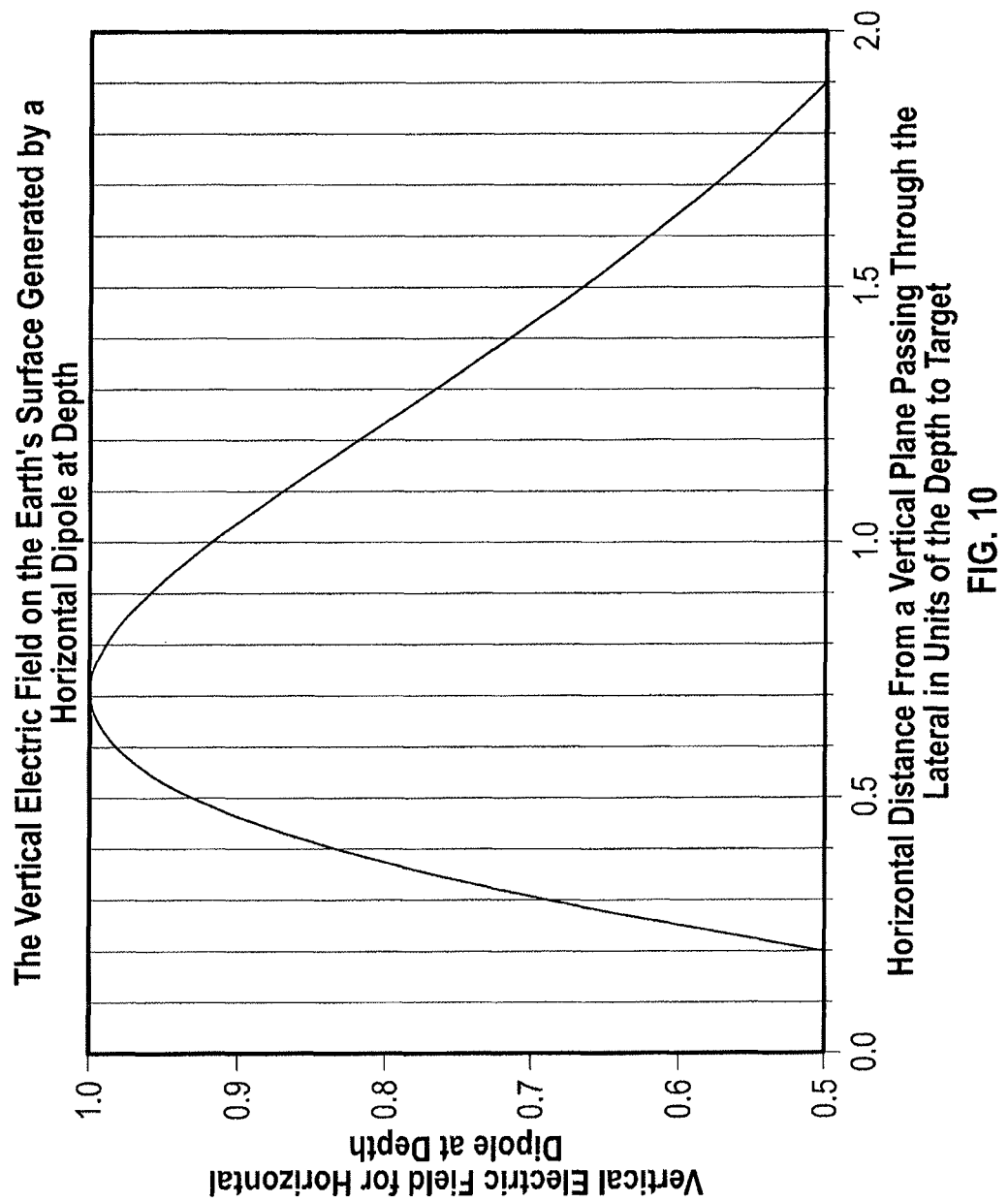

FIGS. 9 and 10 show example expected vertical electric field amplitudes generated by a horizontal electric dipole at depth. The horizontal distance is expressed in units of the depth to the target. FIG. 10 shows the offset distance over which the electric field is at least one half of the maximum electric field. The electric field changes sign at negative offsets, i.e., on the other side of the point or line of origin of the dipole.

Based on the expected results shown in FIG. 10, for a 10,000 foot deep target, example sensors may be placed at 2,000 feet (depth to target) to 19,000 feet (depth to target) from a vertical plane passing thought the later. In this range of distances, the signal amplitude at the sensors will be at least half the peak amplitude. The peak amplitude of this example is at 7,000 feet.

In certain example implementations, for the horizontal electric dipole at depth, the peak amplitude of the vertical electric field occurs at a distance of 0.7 times the depth of the target. This corresponds to an angle of 44 degrees between the vertical direction and the direction of maximum amplitude. For a vertical dipole at depth, the horizontal electric field on the surface is similar in appearance. The position of maximum amplitude for the vertical dipole occurs at a distance of 0.5 times the depth to target, which corresponds to an angle of 30 degrees. The case of the vertical dipole is illustrated in FIGS. 1 and 2.

Figure 11:
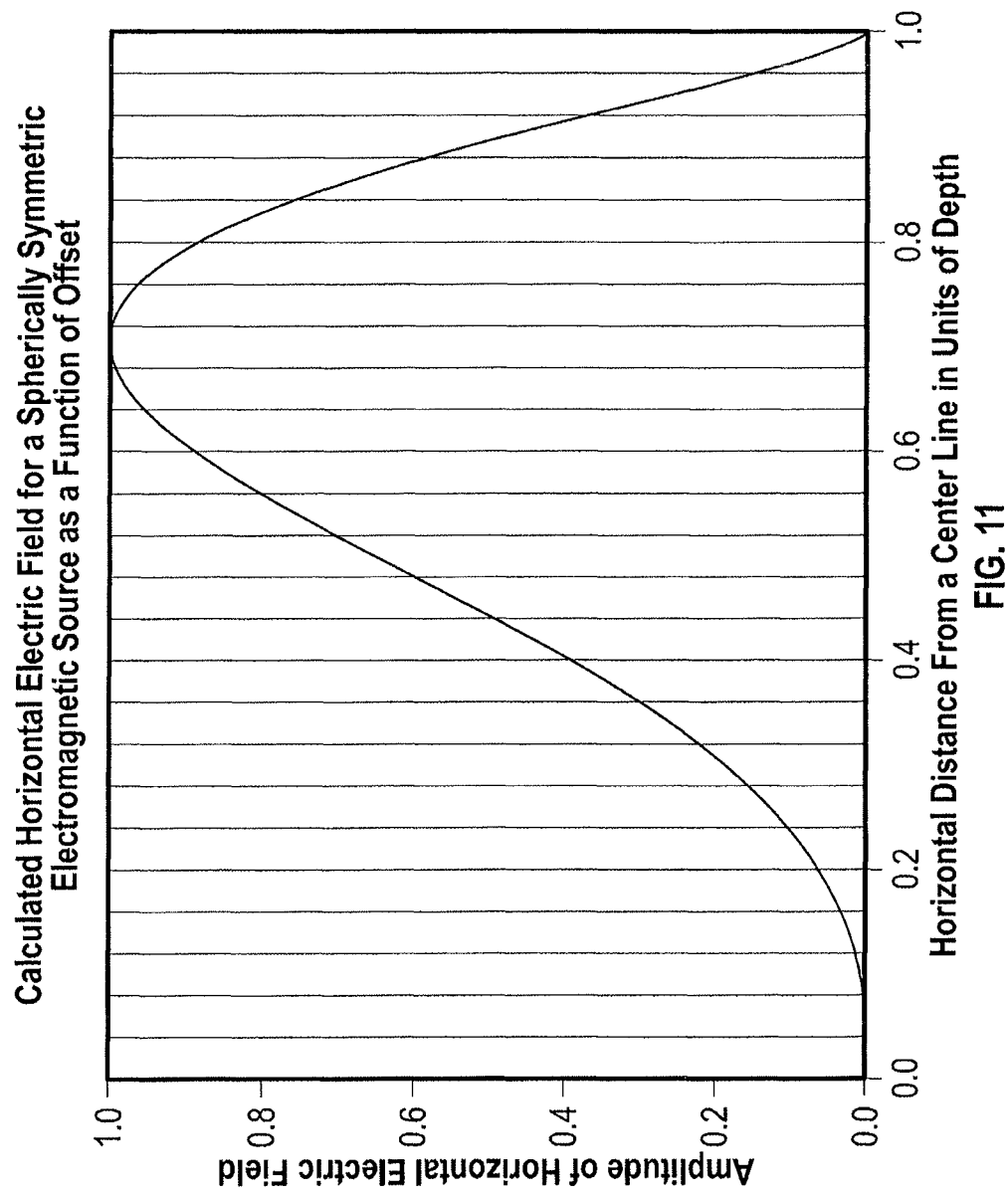
FIGS. 11 and 12 are graphs charting the amplitude of a horizontal electric field versus horizontal distance from the center line.
Figure 12:
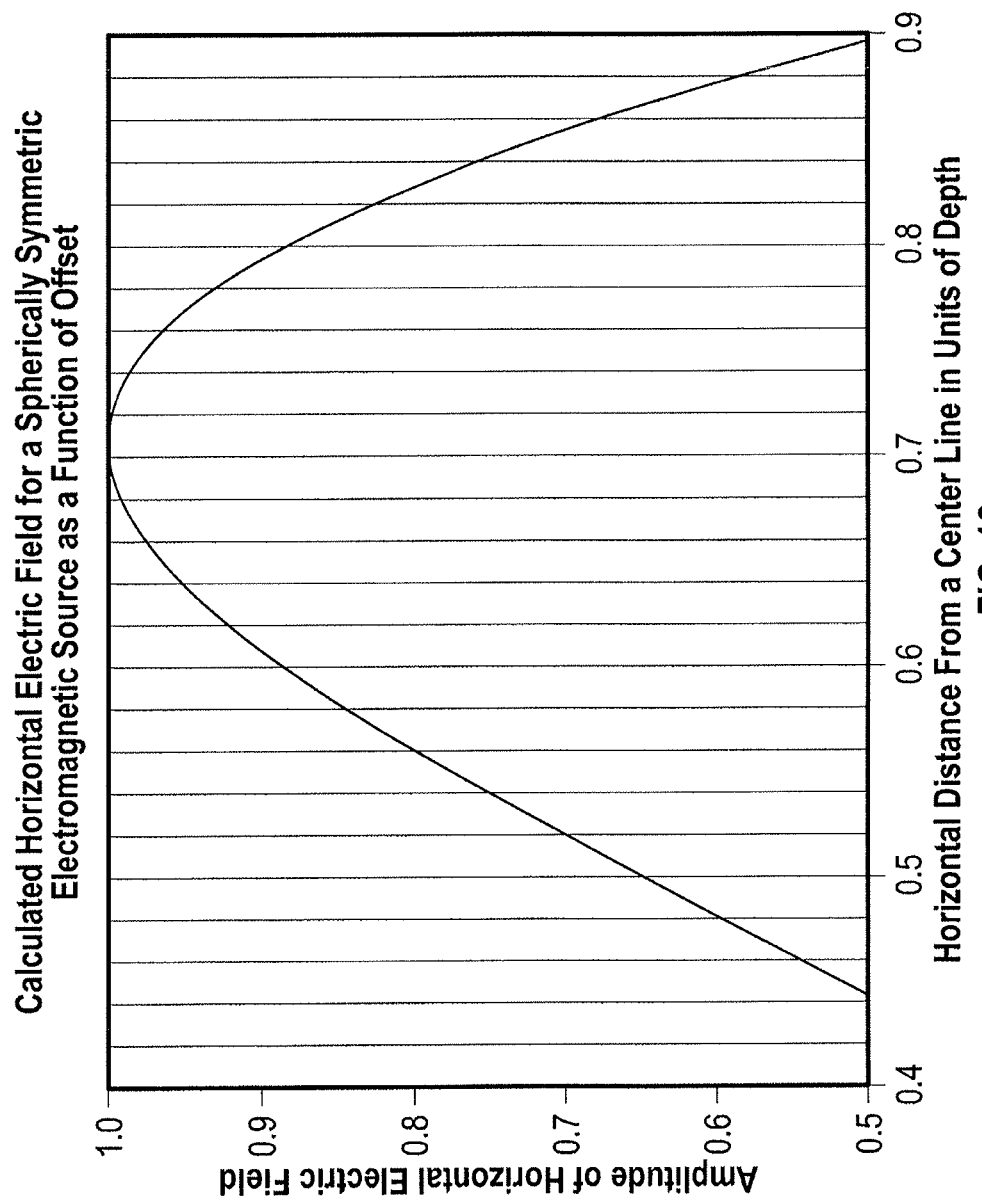

FIGS. 11 and 12 are similar to FIGS. 9 and 10, but are for an example spherically symmetric source of electromagnetic energy at depth. The horizontal electric field reverses sign on the opposite side of the symmetry point. The figures show that the offset dependence has a different shape for the dipole and spherical cases. The difference in shape is important. If the source is a vertical or horizontal dipole, the electric field is large at smaller offsets. In this case, a smaller footprint of the first sensor array on the surface will enable signal detection if the source has a dipole configuration.

Monitoring and Controlling Drilling Operations Using Percussive Drilling

In certain example embodiments, the drill bit is controlled to produce a detectable pattern in the resultant seismic energy received at seismic sensors 28. For example, the drilling operation (block 310) may be a percussive drilling operation in which a controlled vibration is imparted to the drillstring during the drilling operation. An example of such a percussive drilling operation is discussed in U.S. Pat. No. 8,517,093, entitled "System and Method for Drilling Hammer Communication, Formation Evaluation and Drilling Optimization," by Todd W. Benson, the contents of which are incorporated by reference herein. In certain example embodiment of the controlled-vibration percussive drilling, the vibration is controlled to occur at a known sequence. Example sequences are in the family of sequences known as Golay complementary sequences. Other example sequences are Barker sequences. In other example embodiments, the percussive drill bit is programmed to provide an impulse to the drill bit in a controlled sequence. In certain example embodiments, the drill bit is programmed to provide a quasi-periodic or pseudo-random sequence of pulses. In certain example embodiments, the drill bit is programmed to provide a sequence with varying amplitude. In certain example embodiments, the drill bit is programmed to provide a sequence with varying frequency.

The frequency of the vibrations induced in the drillstring may be controlled to, for example, enhance the signal-to-noise ratio of a resulting signal at a seismic sensor 28. In certain implementations of the controlled-vibration percussive drilling, the amplitudes of the vibration induced in the drillstring are also controlled. This may be used for example, to increase the signal-to-noise ratio in signals received at seismic sensors 28. Vibrations resulting from the controlled-vibration percussive drilling are received at one or more of the seismic sensors 28. The computer system 30 performs correlation of the series of signals that were imparted to the drillstring during the controlled-vibration percussive drilling with the signals received at the seismic sensors 28. In some example implementations, the result of this correlation is used to determine the location of the drill bit in the formation. The result of this correlation may further be used to image the formation above, below, or beside the drill bit. The result of this correlation may further be used to identify the locations of fluids, such as hydrocarbons, Helium, carbon dioxide, or water, in the formation. The result of this correlation may further be used to monitor the progress of an enhanced oil recovery operation. The result of this correlation may further be used to monitor other wells. The result of this correlation may further be used to perform quality control by identify fractures or damage created by well operations.

The result of this correlation may further be used for geosteering of the drill bit to a location in the formation that is likely to produce greater amounts of fluid. In other example embodiments, the determination of the drill bit location is used for geosteering around faults.

Figure 16:
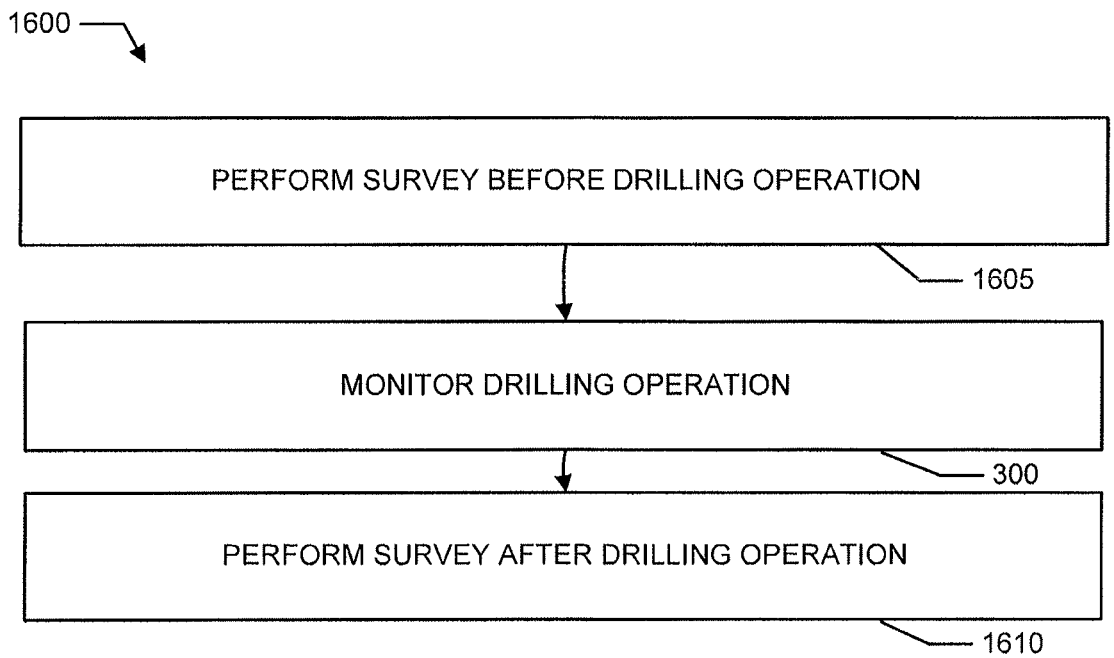
FIG. 16 is a flow chart of an example method of performing electroseismic and seismoelectric surveying for a drilling operation.

FIG. 16 is a flow chart of an example method according to the present disclosure for surveying a formation. In block 1605, the system performs a survey of subsurface earth formation 16 before the drilling operation. In certain example embodiments, the survey of block 1605 is a passive-source electromagnetic survey, as described above with respect to FIGS. 1 and 2. Thereafter, the system monitors the drilling operation (block 300), as discussed with respect to FIGS. 3A and 3B. In certain example embodiments, the system further performs a survey after the drilling operation (block 1610). In some embodiments, blocks 1605, 300, and 1610 are performed using a common set of electroseismic sensors 26 and seismic sensors 28, such as one or more of the first sensor array, the second sensor array, and third sensor array, as discussed above.

In certain example embodiments, the survey of block 1610 is a passive-source electromagnetic survey, as described above with respect to FIGS. 1 and 2. In certain example embodiments, further drilling operations may be performed after block 1610. For example, corrections to the drill path may be made based on the results of the survey after the drilling operation.

Monitoring and Controlling Fracturing Operations

Figure 13A:
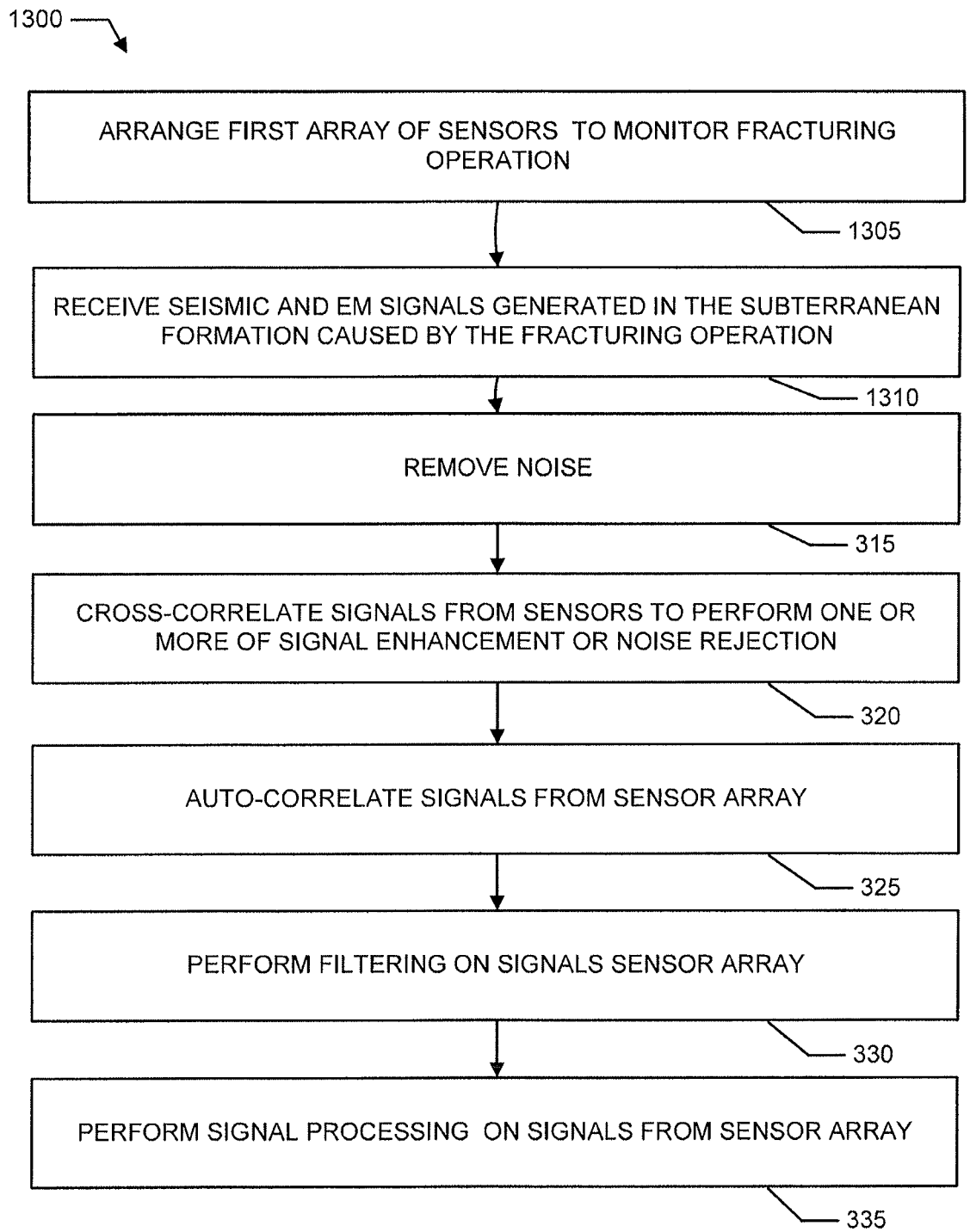
FIGS. 13A and 13B are flow charts of an example method of monitoring fracturing operations using techniques of the present disclosure.
Figure 13B:
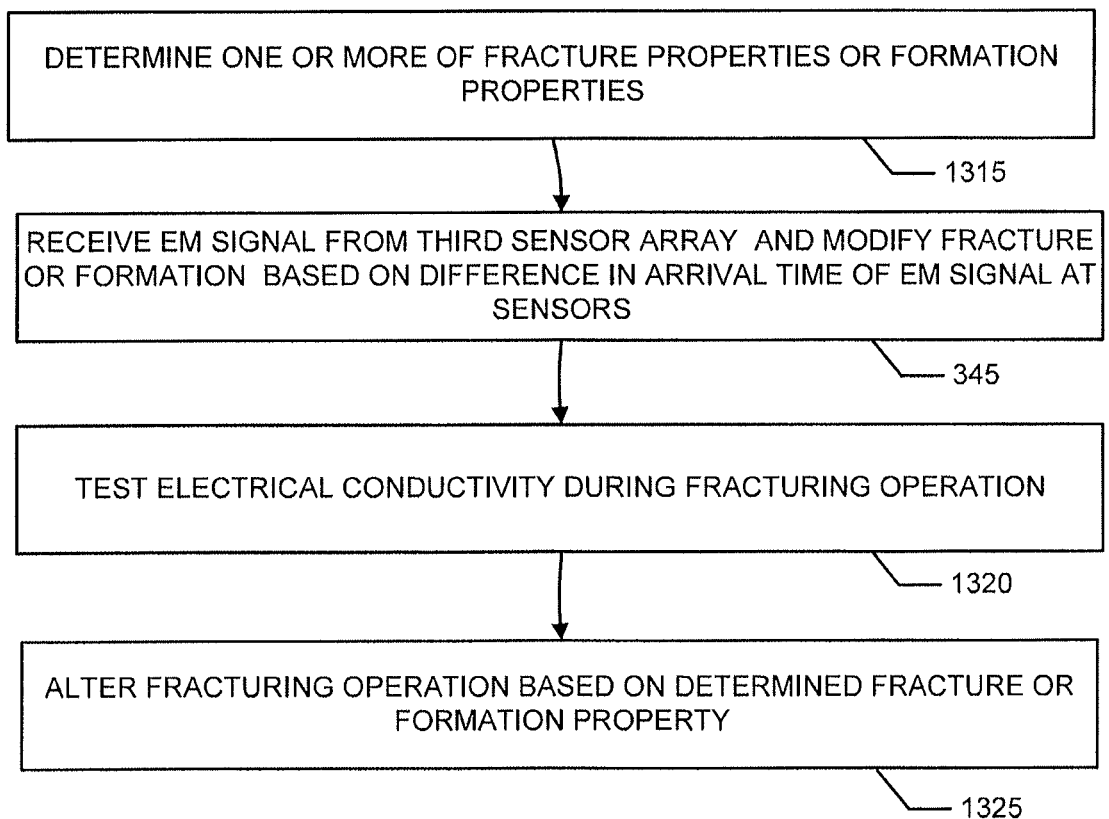

FIGS. 13A and 13B are flow charts of an example method according to the present disclosure for monitoring and controlling a fracturing operation based on electroseismic sensing while performing the fracturing operation. The method is referred to generally by the numeral 1300. The method of FIGS. 13A and 13B may, for example, be used to determine the orientation and progression of fractures in a subterranean formation at a time. Example implementations may omit one or more of the blocks show in 13A and 13B, while other implementations additional steps not shown in FIGS. 13A and 13B. Still other implementations may perform one of more of block in FIGS. 13A and 13B in an alternate order from the order shown in FIGS. 13A and 13B.

The processing described in FIGS. 13A and 13B is similar to the processing described above with respect to FIGS. 3A and 3B, with common elements sharing common numbering with blocks from FIGS. 3A and 3B. The differences between the two will be discussed below.

In block 1305, a first sensor array, including one or more electromagnetic sensors 26 and one more seismic sensors 28 are arranged to monitor the fracturing operation. In certain example implementations, the seismic sensors 28 and electromagnetic sensors 26 may be part of a single unit, such as a geophone. In general, fractures will be initiated over a finite length of cased well. In some implementations the array of sensors are located on or near the surface of the earth. In other implementations, one or more of the sensors are placed, at least in part, just beneath the surface of the earth. In still other implementations, one or more electromagnetic sensors 26 or one more seismic sensors 28 are located at a location in or along the borehole. Example systems include one or more electromagnetic sensors 26 with contact measurement to measure the electrical potential on the inside of a borehole casing to thereby detect an electroseismic signal. The placement of the first sensor array is discussed in greater detail with respect to FIGS. 5-12 and, in particular, FIG. 7.

In block 1310, the computer system 30 receives one or more seismic and electromagnetic signals generated in the subterranean formation during the fracturing operation. The fracturing operation generates seismic and electromagnetic noise as it penetrates the earth to form a wellbore. Both the seismic and electromagnetic signals caused by the fracturing operation travel to the first sensor array. The electromagnetic noise from the drill bit will travel to the electromagnetic sensors 26 in the first sensor array at the speed of light in the formation. The electrometric signal may be cause by the electroseismic or seismoelectric conversion of the seismic signal from the fracturing operation. By contrast, the seismic noise from the drill bit will travel to the seismic sensors 28 at the speed of sound in the formation. In some implementations, processing signals generated by fracturing is similar to processing signals caused by the drilling of the borehole. In some implementations, fractures may occur along a finite length of well casing and the fractures may spread out a substantial distance in volume. The relevant length scale for these issues is the radius of the first seismic Fresnel zone. In some implementations this dimension may be 100 feet or more. Fractures are normally formed over a length of casing that is sealed by packers or plugs. If the casing interval is much longer than the radius of the first Fresnel zone, then the source is interpreted as a finite body, rather than a point source.

In some implementations, for a finite, linear body, the geometry of the signals illustrated in FIGS. 5-12 will no longer be symmetrical in the x-y plane. Instead, in certain implementations, the use of the common-source-point processing will have different dimensions in the x and y directions. In other implementations, however, the fracturing operation may be modeled as a point source, as with the drilling operation.

In block 1315, the computer system 30 determines one or more of a fracture property and a formation property based, at least in part, on signals from one or more of the first array or sensors, the second sensor array, the third sensor array, and one or more processing steps 315-335. In one example embodiments, the computer system 30 determines one or more properties of the formation, such as the presence and location of fluids, including hydrocarbons or Helium in the subsurface formation. In general, the computer system 30 may determine the formation properties as described above with respect to block 345. If a drillstring is present in the formation during fracturing, the computer system 30 may determine drillstring properties, as described above with respect to block 340.

In certain example implementations, the computer system 30 determines one or more properties of the fracture being initiated or other fractures. In one example embodiment, the computer system 30 determines the orientation of the fracture. In one example embodiment, the computer system 30 determines the extent of the fracture. In one example embodiment, the computer system 30 determines the density of the fracture. In one example embodiment, the computer system 30 determines the porosity or permeability of the fracture. In one example embodiment, the computer system 30 determines the connectivity of the fracture. In one example embodiment, the computer system 30 determines the size or shape of the fracture.

In block 1320, the computer system 30 tests electrical conductivity during the fracturing operation. In general, fractures are expected to be complex structures with high surface area and high electrical conductivity. Because the fractures increase the area of the exposed fluid in the formation, the measured conductivity increases as the fracture propagates in the subsurface formation. On the other hand, in some implementations, poor fractures are detectable based on small changes in resistivity while the fracture is initiated or propagated. In some implementations, this conductivity testing will qualitatively assess fracturing as a function of the position in the well. This measurement may also reveal low hydrocarbon saturations when the resistivities are low and the measured electroseismic amplitude is small.

In block 1325, the computer system 30 alters the fracturing operation based on one or more of the determine fracture property and the determine formation property. In one example embodiment, that computer system 30 alters the fracturing operation based, at least in part, on the determined fracture orientation and propagation. In some example implementations, the location or orientation of the fracture is altered. In other implementations, the fracturing pressure is altered. In some implementations, the fracturing fluid or the proppant is altered.

In certain implementations, passive electroseismic sensing is used to image a well environment before and/or after fracturing. The resulting imaging may be used to determine one or more issues involving the quality of the fracturing. For example, the computer system 30 may determine the size of the fractures, the location of one or more bypassed areas, fracturing in unintended formations, or water invasion.

Figure 17:
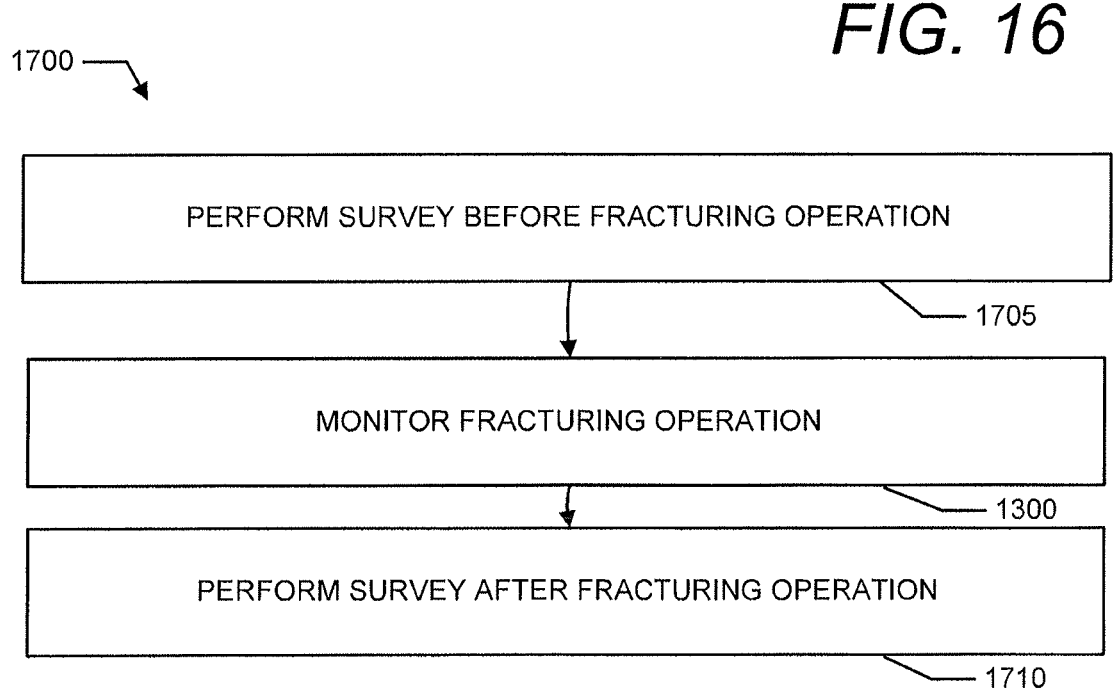
FIG. 17 is a flow chart of an example method of performing electroseismic and seismoelectric surveying for a fracturing operation.

FIG. 17 is a flow chart of an example method according to the present disclosure for surveying a formation. In block 1705, the system performs a survey of subsurface earth formation 16 before the fracturing operation. In certain example embodiments, the survey of block 1705 is a passive-source electromagnetic survey, as described above with respect to FIGS. 1 and 2. Thereafter, the system monitors the fracturing operation (block 1300), as discussed with respect to FIGS. 13A and 13B. In certain example embodiments, the system further performs a survey after the fracturing operation (block 1710). In some embodiments, blocks 1705, 1300, and 1710 are performed using a common set of electroseismic sensors 26 and seismic sensors 28. In certain example embodiments, the survey of block 1710 is a passive-source electromagnetic survey, as described above with respect to FIGS. 1 and 2. In certain example embodiments, further fracturing operations may be performed after block 1710. For example, a new fracture may be initiated at a location based on the results of one or both of blocks 1300 or 1710. In still other embodiments, one or more subsequent surveys are performed to determine the performance of the fracturing operation over time. For example, the subsequent surveys may determine if the induced fractures are closing or altering shape over time. In certain example implementations, the time between the time between surveys may be measured in seconds (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds). In other example implementations, the time between surveys may be measured in minutes (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 minutes). In other example implementations, the time between surveys may be measured in hours (for example, 1, 2, 3, 4, 5, 6, 7, 8, 9, 10, 11, 12, 13, 14, 15, 16, 17, 18, 19, 20, 21, 22, or 23 hours). In other example implementations, the time between surveys may be measured in days (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31 days). In other example implementations, the time between surveys may be measured in months (for example, 1, 2, 3, 4, 5, 6, 7, 8, 9, 10, 11, or 12 months). In still other example implementations, the time between surveys may be measured in years. For example, the computer system 30 may receive regular measurements from the set of electroseismic sensors 26 and seismic sensors 28.

Monitoring and Controlling Production Operations

Figure 14A:
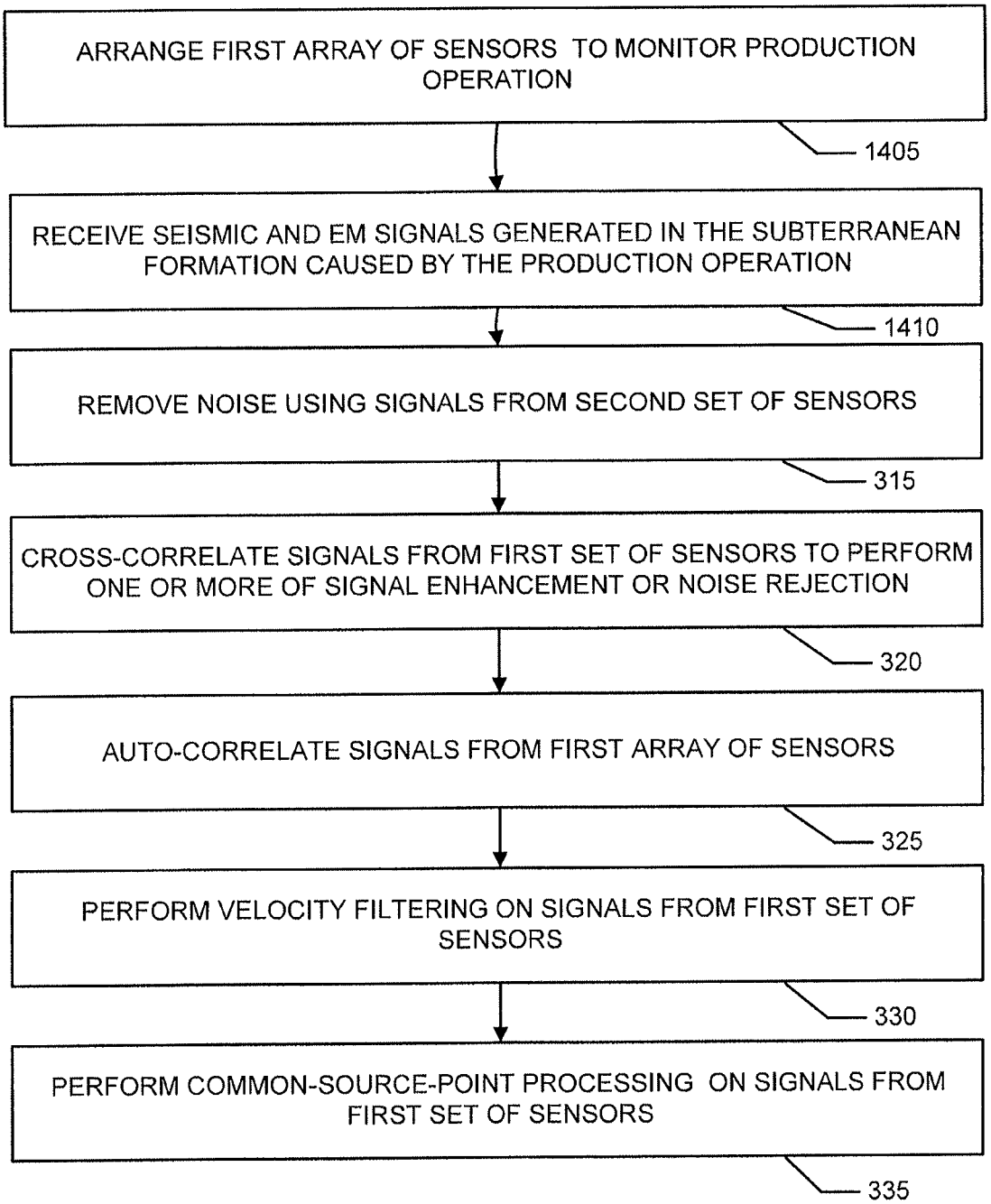
FIGS. 14A and 14B are flow charts of an example method of monitoring production operations using techniques of the present disclosure.
Figure 14B:
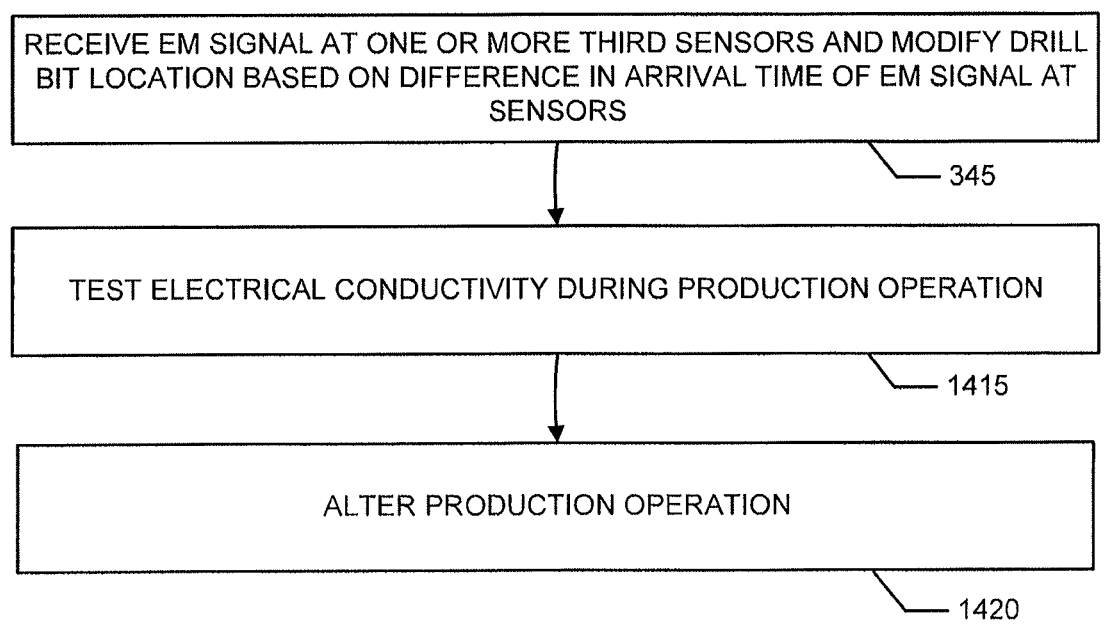

FIGS. 14A and 14B are flow charts of an example method according to the present disclosure for monitoring and controlling the production of fluids, such as hydrocarbons, Helium, carbon dioxide, or water, from a subsurface formation. The method of FIGS. 14A and 14B may, for example, be used to determine the magnitude of production from a subsurface formation and the locations of depletion of that formation. Example implementations may omit one or more of the blocks shown in in 14A and 14B, while other implementations additional steps not shown in FIGS. 14A and 14B. Still other implementations may perform one of more of block in FIGS. 14A and 14B in an alternate order from the order shown in FIGS. 14A and 14B.

The processing described in FIGS. 14A and 14B is similar to the processing described above with respect to FIGS. 3A and 3B, with common elements sharing common numbering with blocks from FIGS. 3A and 3B. The differences between the two will be discussed below.

In block 1405, a first sensor array, including one or more electromagnetic sensors 26 and one more seismic sensors 28 are arranged to monitor the production operation. In some implementations the array of sensors are located on or near the surface of the earth. In other implementations, one or more of the sensors are placed, at least in part, just beneath the surface of the earth. The placement of the first sensor array is discussed in greater detail with respect to FIGS. 5-12 and, in particular, FIG. 7.

In block 1410, the computer system 30 receives one or more seismic and electromagnetic signals generated in the subterranean formation during the production operation. Processing the data from fluid production differs from processing drill-bit and fracturing data. First, the flow of fluids will be distributed over a length of pipe that will not, in general, be a point source. In some example implementations, the flow of fluid out of fractures might create a large electric field without a large seismic response. In some example implementations, the pressure and electric field fluctuations are distributed within the production fluid and over the length of the production casing. A single event, from a single fracture, will be masked by many events, from many producing fractures.

In the case of long horizontal wells, the first sensor array may resolve flow through sections of pipe. In certain implementations, these flow rate changes are shown as changes in electric field with distance.

In certain implementations, the computer system 30 receives one or more seismic and electromagnetic signals generated in the subterranean formation during a pressure test. Due to the nature of such a test, this situation may provide usable electroseismic data to the first sensor array.

In block 1415, the computer system 30 tests electrical conductivity during the production operation. During production the electrical conductivity will systematically change as the reservoir is depleted. In certain implementations, one or more electromagnetic sensors are used to measure the electroseismic response and the electrical conductivity along the production pipe can reveal zones of poor productivity.

In block 1420, the computer system 30 alters production operations based on the measurements from the first sensor array. In some implementations, this includes altering a pumping pressure or shutting in the well. In some implementations, this includes altering a rate of production of the well. In still other example embodiments the system may change from convention production to an enhanced oil recovery method.

Subterranean Reservoir Zone Evaluation

Figure 18:
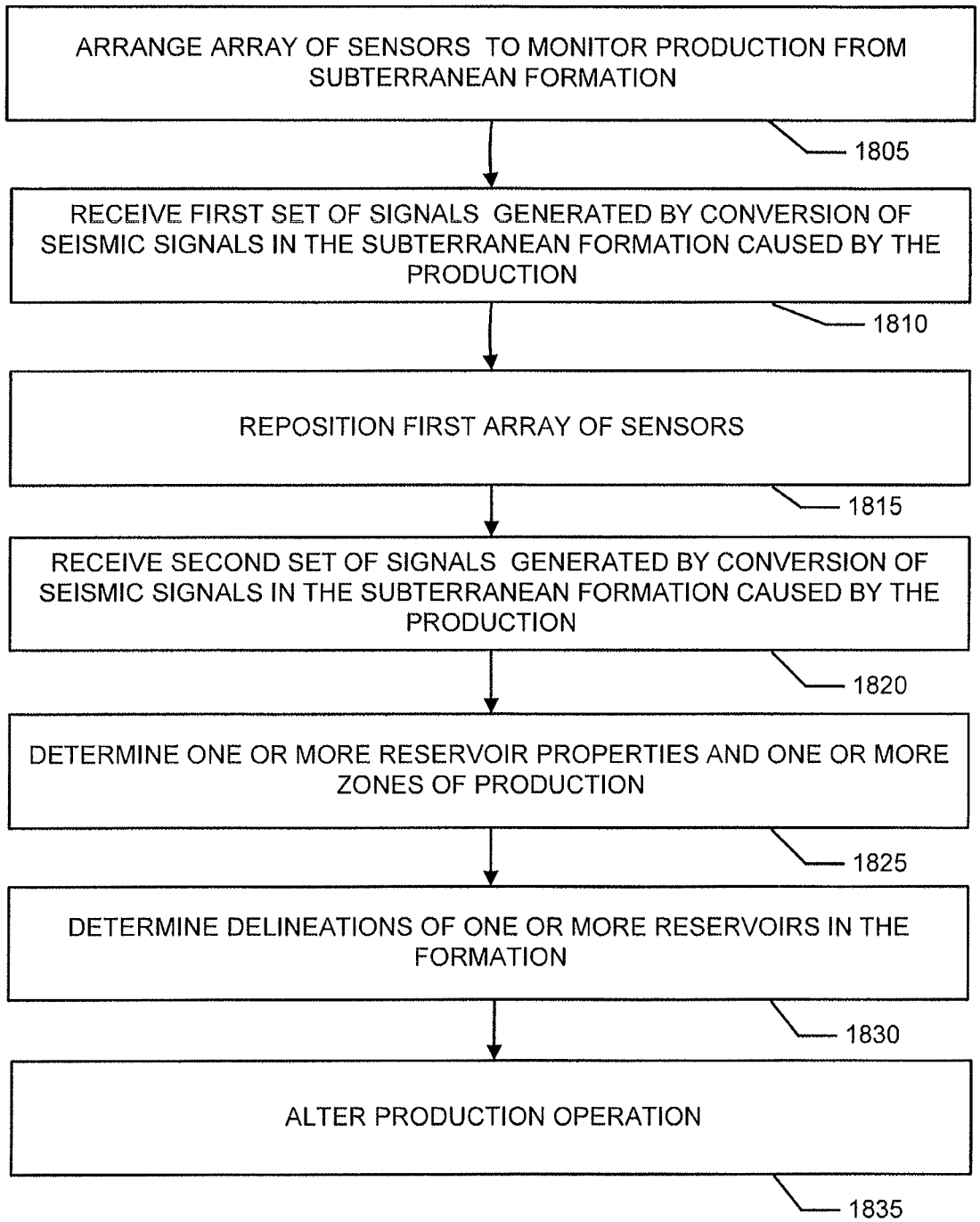
FIGS. 18, 19A, 19B, and 20 are flow charts of an example methods of monitoring production operations using techniques of the present disclosure.

FIG. 18 is a flow chart of an example method according to the present disclosure for evaluating one or more reservoir properties. In certain example embodiments the system may be used to monitor the production of fluids from a subterrenean formation. In still other embodiments, the system may be used for locating areas of fluid production from a subterranean reservoir. The methods of FIG. 18 may, for example, be used to determine one or more properties of a producing reservoir, including determining the delineation (e.g., edges) of one or more reservoirs. Or the method of FIG. 5 may be used to identify a new reservoir for production. Example implementation may omit one or more of blocks 1805-1835, while other implementations may include additional steps not specifically shown in FIG. 18. Still other implementations may perform one of more of blocks 1805-1835 in an alternate order from the order shown in FIG. 18.

In block 1805, a first array of sensors, are arranged to monitor production of fluids, such as hydrocarbons, from a reservoir in the subterranean formation. In certain example embodiments the first array of sensors includes one or more electromagnetic sensors 26. In still other embodiments, the first array of sensors may include one or more seismic sensors 28. In some implementations, the array of sensors is located on or near the surface of the earth. In other implementations, one or more of the sensors are placed, at least in part, just beneath the surface of the earth. Example sensors include a ground portion that is placed in the Earth or that is attached to a grounded element. Certain of the electromagnetic sensors 26 may be permanently installed at desired locations. In still other implementations, one or more of the sensors are located in the borehole.

In block 1810, the electromagnetic sensors 26 receive a set of electromagnetic signals that are generated by the electroseismic or seismoelectric conversion of seismic signals in the subterranean formation. The seismic signals in the subterranean formation include those generated by the movement of fluids from a reservoir in the subterranean formation during production. The seismic signals in the subterranean that are generated by the movement of fluids from a reservoir in the subterranean formation during production may be referred to as type of passive source seismic signals.

In certain example implementations, in block 1815, the first array of sensors is repositioned to new locations. For example, the one or more of the sensors in the array of sensors may be moved as production of the reservoir progresses to more accurately monitor the ongoing production. In other implementations, however, the first array of sensors is not moved between one or more surveys.

Returning to FIG. 18, in block 1820, at a second time, the electromagnetic sensors 26 receive a set of electromagnetic signals that are generated by the electroseismic or seismoelectric conversion of passive source seismic signals in the subterranean formation. Certain implementations receive subsequent sets of electromagnetic signals that are generated by the electroseismic or seismoelectric conversion of passive source seismic signals in the subterranean formation over time. In some implementations, the location of the sensors is changed between subsequent surveys, while in other implementations the sensors are left at the same location. In certain example implementations, the time between the time between surveys may be measured in seconds (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds). In other example implementations, the time between surveys may be measured in minutes (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 minutes). In other example implementations, the time between surveys may be measured in hours (for example, 1, 2, 3, 4, 5, 6, 7, 8, 9, 10, 11, 12, 13, 14, 15, 16, 17, 18, 19, 20, 21, 22, or 23 hours). In other example implementations, the time between surveys may be measured in days (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31 days). In other example implementations, the time between surveys may be measured in months (for example, 1, 2, 3, 4, 5, 6, 7, 8, 9, 10, 11, or 12 months). In still other example implementations, the time between surveys may be measured in years. A person of ordinary skill in the art would further recognize that the time between surveys may be measured in a combination of the above units. In still other example embodiments, the time between surveys may be based on a user requested time.

In block 1825, the computing system 30 uses one or more the received sets of electromagnetic signals to determine one or more reservoir properties. In certain example embodiments, the reservoir properties include the presence, location, and amount of fluids in the reservoir. Example fluids may include one or more of hydrocarbons, water, helium, or carbon dioxide. Other example reservoir properties include one or more of pore pressure or permeability. In certain implementations, the computer system 30 relies on one or more available seismic surveys and production surveys to determine one or more reservoir properties.

In one example embodiment, the computing system 30 determines the locations of one or more zones of production. In other implementations, the computer system 30 further relies on one or more available seismic surveys and production surveys to determine zones of production. In some example implementations, computing system 30 compares the survey results for a zone not currently under production with a zone currently under production to determine an expected production capability of the zone not currently under production.

In block 1830, the computing system 30 uses one or more the received sets of electromagnetic signals to determine one or more delineations (e.g., edges) of the formation.

Based on the determined zone of production (block 1825) and/or the determined locations of reservoir delineations (block 1830), the system may alter production operations (block 1835). For example, the system may determine that one or more infill or step-out wells should be drilled to enhance production. Other enhanced oil recovery (EOR) operations may include chemical flooding, miscible displacement, and thermal recovery. In certain example implementations, the operator will perform hydraulic fracturing and the administration of a proppant to the subterranean formation.

Long-Term Monitoring of Fluid Production from a Reservoir

Figure 19A:
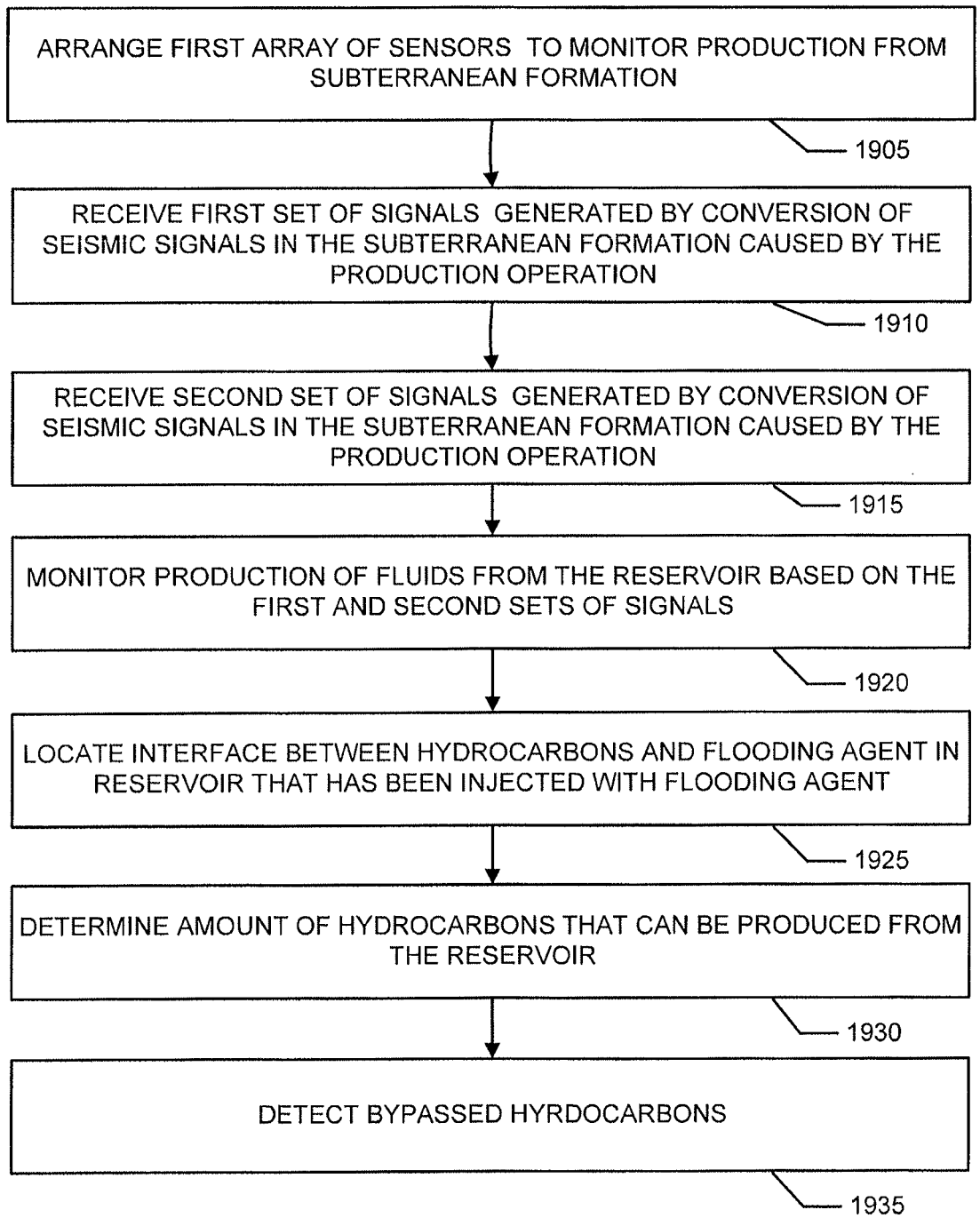
Figure 19B:
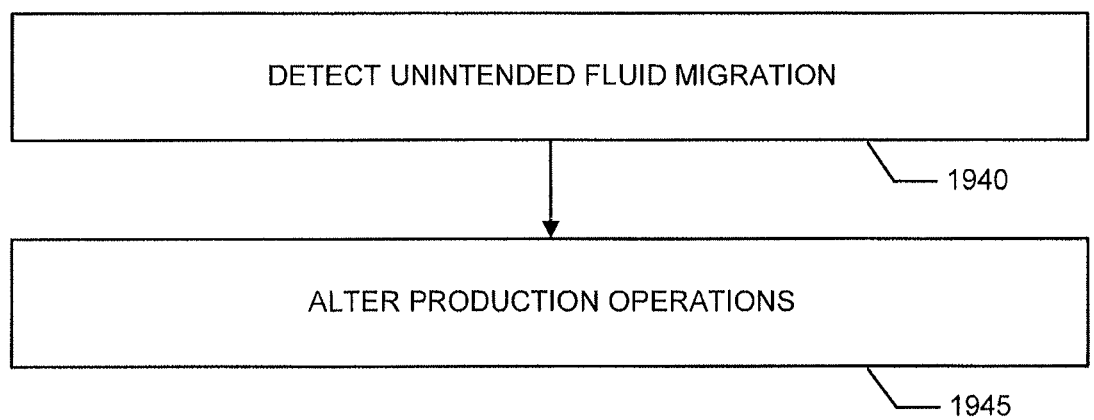

FIGS. 19A and 19B are a flow chart of an example method according to the present disclosure for monitoring the fluid production from a subterranean reservoir. The methods of FIGS. 19A and 19B may, for example, be used to evaluate the sweep efficiency of production operations. Or the methods of FIGS. 19A and 19B may be used to identify candidates for EOR operations. Example implementation may omit one or more of blocks 1905-645, while other implementations may include additional steps not specifically shown in FIGS. 19A and 19B. Still other implementations may perform one of more of blocks 1905-1945 in an alternate order from the order shown in FIGS. 19A and 19B.

In block 1905, a first array one or more sensors, including one or more electromagnetic sensors 26, are arranged to monitor production of fluids, such as one or more of hydrocarbons, water, helium, or carbon dioxide from a reservoir in the subterranean formation. In some implementations, the array of sensors is located on or near the surface of the earth. In other implementations, one or more of the sensors are placed, at least in part, just beneath the surface of the earth. Example sensors include a ground portion that is placed in the Earth or that is attached to a grounded element. The grounded connectors can be installed conveniently by permanently burying electrodes at surveyed locations. Continuous or periodic measurements can be made by connecting the required electronics to these buried electrodes. In other implementations, the grounded connections can also be made to certain infrastructure, such as pipes, fences, and wells. In implementations to monitor the reservoir over a long period of time, it is often advantageous to permanently install the electromagnetic sensors 26 at desired locations. In still other implementations, one or more of the sensors are located in the borehole.

In block 1910, the array of sensors receives a set of electromagnetic signals that are generated by the electroseismic or seismoelectric conversion of passive source seismic signals in the subterranean formation. The array of sensors continues to receive second and subsequent signals over time. In certain example implementations, the time between the time between surveys may be measured in seconds (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds). In other example implementations, the time between surveys may be measured in minutes (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 minutes). In other example implementations, the time between surveys may be measured in hours (for example, 1, 2, 3, 4, 5, 6, 7, 8, 9, 10, 11, 12, 13, 14, 15, 16, 17, 18, 19, 20, 21, 22, or 23 hours). In other example implementations, the time between surveys may be measured in days (for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31 days). In other example implementations, the time between surveys may be measured in months (for example, 1, 2, 3, 4, 5, 6, 7, 8, 9, 10, 11, or 12 months). In still other example implementations, the time between surveys may be measured in years. For example, the computer system 30 may receive regular measurements from the sensor array. Based on the results of these measurements, the computer system 30 monitors the production and movement of fluids from the reservoir (block 1920).

In certain implementations, the formation will undergo EOR to enhance production. This may include flooding the formation with water, steam, or other fluids. In such a situation, the sensor array may be used to track the flood in the formation by comparing signals from the sensor array during the flooding operation with prior sensor measurements. A change in electroseismic amplitude of the signal from the sensor array will correspond to an interface between a hydrocarbon, such as oil, and a flooding agent, such as water, steam, or chemical flood. This is due to the difference in electroseismic response between the hydrocarbon or other fluid, on the first hand, and the flooding agent, on the second hand.

In certain implementations, the method further includes determining an amount of fluid that can be produced from the reservoir based, at least in part, on the signals from the sensor array (block 1930). The electroseismic amplitudes will vary based on the fluid content of the subsurface. In certain implementations, a rock saturated with hydrocarbon has different electroseismic amplitudes than a rock saturated with EOR fluid. These differing amplitudes enable the computer system 30 to track an interface between two fluids in the formation. In certain implementations, the interface progression is correlated with the amount of oil produced. In such an implantation, the interface movement is a measure of the sweep efficiency and of the volume of the reservoir interval.

In block 1935, the method includes detecting bypassed fluids. As discussed above in block 1930, the computer system 30 tracks the progression of the interface between fluids in the formation. In certain example situations, the interface has a complex shape. For example, when the interface between oil and an EOR fluid progresses in a complex geometrical shape, this may indicate the existence of bypassed fluids or complexity in the reservoir. In certain implementations, the bypassed fluids yield large electroseismic amplitudes. In certain implementations, complexity in the reservoir rock that does not contain oil should yield small electroseismic amplitudes.

The method further includes detecting unintended fluid migration in block 1940. In certain implementations, this process is used for quality control. The electroseismic amplitude at the reservoir depth, near drilling operations, and/or producing facilities, may indicate unintended hydrocarbon migration away from a reservoir, production operations, or drilling facilities. In certain implementations, the sensor measurements are useful to track the migration of pollutants near the Earth's surface.

Based, for example, on the detection of bypassed fluid (block 1930), the system may alter production operations (block 1945). For example, when a production front proceeds in an irregular fashion, it may reveal substantial volumes of unswept fluid. In certain implementations, the unwept fluids manifest as areas of high electroseismic amplitude that do not change over time. Comparing the electroseismic properties of these unswept regions with the electroseismic properties known regions of good productivity, the computer system 30 may determine locations where there is high probability for producing additional fluids. The computer system 30 may then determine that one or more infill or step-out wells should be drilled to enhance production. Other enhanced oil recovery (EOR) operations may include chemical flooding, miscible displacement, and thermal recovery. In certain example implementations, the operator will perform hydraulic fracturing and the administration of a proppant to the subterranean formation.

Detection of Reservoir Connectivity

Figure 20:
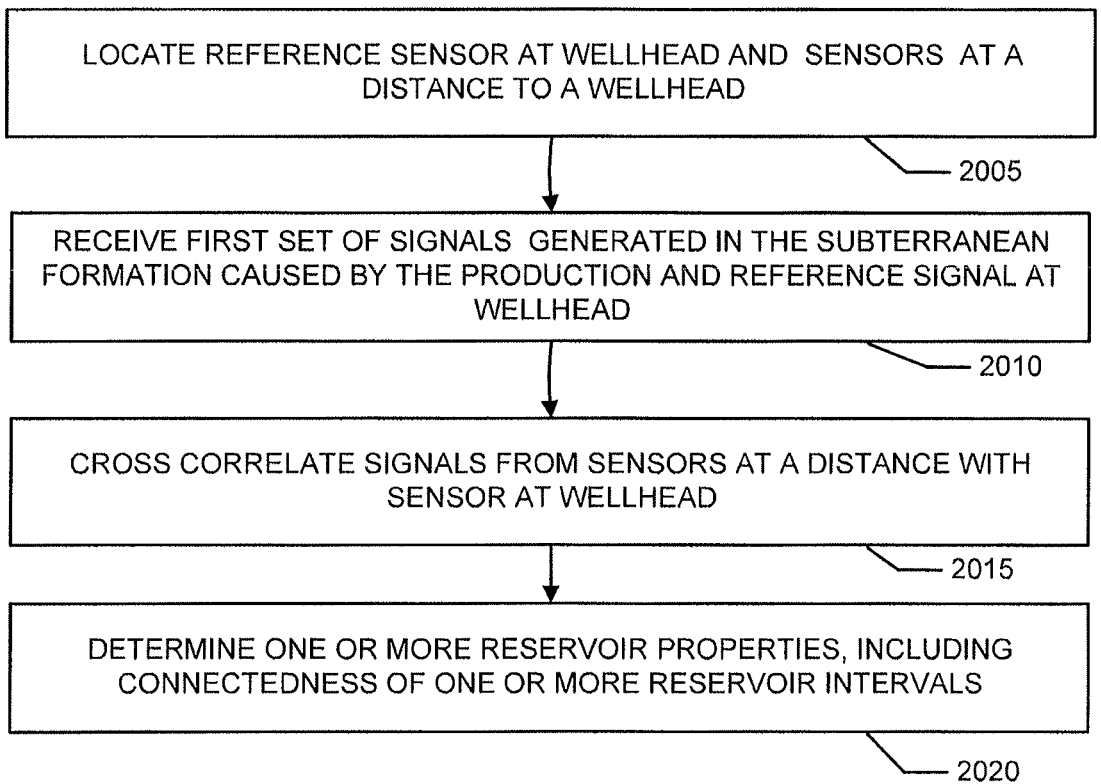

FIG. 20 is a flow chart of an example method according to the present disclosure for determining the connectivity of reservoir segments based on passive electroseismic surveying. The methods of FIG. 20 may, for example, be used to determine the connectedness of a reservoir interval. Example implementation may omit one or more of blocks 2005-2020, while other implementations may include additional steps not specifically shown in FIG. 20. Still other implementations may perform one of more of blocks 2005-2020 in an alternate order from the order shown in FIG. 20.

In block 2005, the method includes placing a reference electromagnetic sensor 26 at or near the wellhead and one or more electromagnetic sensors 26 and seimic sensors 28 at a distance from the wellhead. The reference sensor may be an electromagnetic sensor 26. In other example embodiments, the reference sensor is a seismic sensor 28. In other implementations, electromagnetic or seismoelectric emissions are used as a time zero reference to which the signals from the one or more electromagnetic sensors 26 at a distance from the wellhead are compared by the computer system 30.

In block 2010, the method further includes receiving a first set of electromagnetic signals generated by the electroseismic or seismoelectric conversion of seismic signals in the subterranean formation that are caused, at least in part, by the production operation. These seismic signals may be referred to a passive source seismic signals.

In block 2015, the method includes cross correlating the signals from the reference sensor and the one or more electromagnetic sensors 26 and seismic sensors 28 located away from the wellhead. In certain example embodiment, the signal to noise ratio of monitoring the production operation is enhanced by correlating noisy targets with hydrocarbon production. The fluid pressure in the reservoir interval varies with production time and the number of producing wells. Although all the overburden and basement are influenced by production pressure changes, the pressure changes in the reservoir create first-order electro-osmotic conversions. The mechanical noise from production operations travels at the speed of sound through the rock. The fluid pressure noise travels at the speed of pressure diffusion, which is much slower than the speed of sound.

Based on the results of the cross correlation operation (block 2015), the computer system 30 then determines one or more reservoir properties in block 2020. I one example implementation, the computer system 30 determines the connectedness of reservoir intervals. The pressure diffusion is indicative of the connectedness of the reservoir interval. In certain implementations, if two wells are not connected by a continuous fluid path, then the pressure diffusion is cut off and no streaming potential develops between wells. In certain implementations, a rapid drop of correlation amplitude with offset from the well indicates a disconnected reservoir interval. In some situations, a disconnection might be caused by a fault or change in rock properties. A disconnected interval stops enhanced oil recovery.

In certain implementations, the computer system 30 further accounts for the frequency spectrum of the propagating pressure diffusion. The time lag between an event in a well and its mirror image in a distant part of a reservoir is long. In addition, the frequency is shifted to lower frequencies by the high-frequency filtering of pressure diffusion. At large distances from a well the information is lost. At shorter distances, the frequency dependence is an indicator of permeability and producibility.

Placement of Sensors

The embodiments of the present disclosure shown in FIGS. 3A, 3B, 13A, 13B, 14A, and 14B, 16, 17, 18, 19A, 19B, and 20 may use an array of electromagnetic and seismic sensors. Other implementation may use only one or a small number of electromagnetic or seismic sensors. One example embodiment uses one or a small number of electromagnetic or seismic sensors to perform quality control for drilling a horizontal well. In such an implementation the intended path for the horizontal well is presumably known. One electromagnetic or seismic sensor is placed at the intended well termination. As the drill progresses, the electromagnetic sensor signal or the seismic sensor signal will increase in amplitude and the arrival time will decrease. In some implementation, large changes in amplitude may signify that the drill is passing through a wet zone, a change in lithology, or that it has moved outside of the reservoir. Non-monatomic progress in arrival time may signal deviation from the intended path. In other implementations, two or more electromagnetic or seismic sensors are placed along the prospective route of the well. The data collected in this way will be complementary to standard data collected during drilling.

In another implementation, one or more electromagnetic or seismic sensors are installed at fixed or several locations to indicate when an enhanced recovery operation has crossed a particular point in space. For example, in a water flood, it might be useful to know when the water is approaching a producing well. In some implementations, an electromagnetic or seismic sensor that is monitoring the reservoir will show a rapid change in amplitude when the hydrocarbon/water interface passes beneath it.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A method for monitoring a drilling operation in a subterranean formation, wherein the drilling operation is performed using a drill bit on a drillstring, and wherein the drilling operation generates one or more seismic signals and one or more electromagnetic signals, further wherein the one or more electromagnetic signals are caused by electroseismic or seismoelectric conversion of the one or more seismic signals, the method comprising:
    receiving, from a first sensor array, the one or more seismic signals caused by the drilling operation in the subterranean formation;
    receiving, from the first sensor array, the one or more electromagnetic signals generated by the drilling operation in the subterranean formation;
    determining a property of one or more of the drill string and the subterranean formation based, at least in part, on the seismic signals and the corresponding electromagnetic signals received from the first sensor array;
    wherein the first sensor array is located at or on the surface of the Earth; and
    wherein the drilling operation includes controlled-vibration percussive drilling.

2. The method of claim 1, wherein determining a property one or more of the drillstring and the subterranean formation based, at least in part, on the seismic signals and the corresponding electromagnetic signals received from the first sensor array further comprises:
    determining a drill bit location based, at least in part, on the seismic signals and the corresponding electromagnetic signals received from the first sensor array.

3. The method of claim 2, wherein the capacitive plates are arranged generally parallel to the surface of the Earth.

4. The method of claim 1 wherein the first sensor array comprises a plurality of seismic sensors and a plurality of electromagnetic sensors.

5. The method of claim 4, wherein determining a property one or more of the drillstring and the subterranean formation based, at least in part, on the seismic signals and the corresponding electromagnetic signals received from the first sensor array further comprises:
    stacking seismic signals from one or more of the seismic sensors with electromagnetic signals from one or more of the electromagnetic sensors.

6. The method of claim 1, wherein the first sensor array comprises a plurality of geophones.

7. The method of claim 1, wherein at least one of the electromagnetic sensors comprises a pair of capacitive plates.

8. The method of claim 1, further comprising:
    receiving, from a second sensor array, signals generated by the subterranean formation in response background noise or infrastructure; and
    removing at least some noise from the signals from the first sensor array, based, at least in part on the signals received from the second sensor array.

9. The method of claim 8, wherein removing at least some noise from the signals from the first sensor array, based, at least in part on the signals received from the second sensor array comprises:
    stacking signals from the first sensor array and second sensor array.

10. The method of claim 9, wherein stacking signals from the first sensor array and second sensor array comprises common midpoint stacking.

11. The method of claim 9, wherein stacking signals from the first sensor array and second sensor array comprises common source stacking.

12. The method of claim 9, wherein stacking signals from the first sensor array and second sensor array comprises common receiver location stacking.

13. The method of claim 9, wherein stacking signals from the first sensor array and second sensor array comprises common depth point stacking.

* * * * *